US010247230B2

(12) United States Patent
McCullough

(10) Patent No.: US 10,247,230 B2
(45) Date of Patent: Apr. 2, 2019

(54) HINGE MECHANISMS

(71) Applicant: FLATZEN, INC., Pasadena, CA (US)

(72) Inventor: Barry McCullough, Pasadena, CA (US)

(73) Assignee: FLATZEN, INC., Pasadena, CA (US)

( * ) Notice: Subject to any disclaimer, the term of this patent is extended or adjusted under 35 U.S.C. 154(b) by 112 days.

(21) Appl. No.: 15/478,766

(22) Filed: Apr. 4, 2017

(65) Prior Publication Data

US 2017/0292565 A1    Oct. 12, 2017

Related U.S. Application Data

(60) Provisional application No. 62/318,926, filed on Apr. 6, 2016.

(51) Int. Cl.
*E05D 3/04* (2006.01)
*F16C 11/10* (2006.01)
(Continued)

(52) U.S. Cl.
CPC ............... *F16C 11/10* (2013.01); *A47B 3/08* (2013.01); *A47B 13/00* (2013.01); *A47C 4/04* (2013.01);
(Continued)

(58) Field of Classification Search
CPC .. E05D 1/04; E05D 3/04; E05D 5/128; E05D 5/14; E05D 5/16; E05D 11/1007;
(Continued)

(56) References Cited

U.S. PATENT DOCUMENTS

| 353,007 A | * | 11/1886 | Schubert et al. ...... E05D 7/1005 16/381 |
| 737,360 A | * | 8/1903 | Daly ..................... E05D 7/1016 16/381 |

(Continued)

FOREIGN PATENT DOCUMENTS

| EP | 2451260 | 5/2012 |
| WO | 2015023698 | 2/2015 |

OTHER PUBLICATIONS

U.S. Appl. No. 15/152,217, Notice of Allowance dated May 3, 2017, 17 pages.
(Continued)

*Primary Examiner* — Jeffrey O'Brien
(74) *Attorney, Agent, or Firm* — Kilpatrick Townsend & Stockton LLP

(57) ABSTRACT

Embodiments generally relate to hinge mechanisms. The central cylinder has a rotate channel transverse to the hinge axis. A collar may couple with the central cylinder and may include a pin that protrudes inwardly into the rotate channel. In some embodiments, the central cylinder may include a second rotate channel and the pin may extend through the first and second rotate channels of the central cylinder. In some embodiments, the central cylinder may include a tapered locking channel that extends and tapers in an axial direction from the rotate channel. Optionally, the collar may include an aperture for receiving the pin therethrough. The pin may be repositionable to a plurality of positions relative to the collar about an insertion axis. The pin repositioning may vary an axial position of the collar relative to the central cylinder, a rotational range of motion of the collar about the central cylinder, or both.

12 Claims, 38 Drawing Sheets

(51) Int. Cl.
  *A47B 3/08* (2006.01)
  *A47C 4/04* (2006.01)
  *A47B 13/00* (2006.01)
  *F16C 11/04* (2006.01)

(52) U.S. Cl.
  CPC ........ *E05D 3/04* (2013.01); *A47B 2200/0035* (2013.01); *A47B 2220/0072* (2013.01); *F16C 11/045* (2013.01)

(58) Field of Classification Search
  CPC . E05D 11/1014; E05D 11/1028; Y10T 16/54; Y10T 16/5406; Y10T 16/544; Y10T 16/5443; Y10T 16/5444; Y10T 16/5445; Y10T 16/5535; F16C 11/10
  See application file for complete search history.

(56) References Cited

U.S. PATENT DOCUMENTS

| | | | | |
|---|---|---|---|---|
| 1,106,181 | A * | 8/1914 | Ballou | E05D 5/128 16/259 |
| 1,132,255 | A * | 3/1915 | Getty et al. | E05D 7/105 16/381 |
| 1,142,542 | A * | 6/1915 | Trinkaus | E05D 5/128 16/381 |
| 1,189,201 | A * | 6/1916 | Hurd | E05D 5/128 16/381 |
| 1,200,538 | A * | 10/1916 | Smith et al. | E05D 11/1078 16/303 |
| 1,455,550 | A * | 5/1923 | Rodell | E05D 11/06 16/375 |
| 1,868,342 | A * | 7/1932 | Yurkovitch | E05D 11/1007 16/353 |
| 1,910,102 | A * | 5/1933 | Godfrey | E05D 3/02 16/230 |
| 3,448,486 | A * | 6/1969 | Wright | E05D 11/00 16/324 |
| 3,921,422 | A * | 11/1975 | Walters | E05D 11/1007 70/104 |
| 4,603,452 | A * | 8/1986 | Paciorek | E05D 7/10 16/262 |
| 4,788,746 | A * | 12/1988 | Idler | B64G 1/222 16/297 |
| 5,169,221 | A * | 12/1992 | Wheeler | H05K 7/16 16/358 |
| 5,172,969 | A * | 12/1992 | Reuter | A47B 96/00 16/358 |
| 5,205,015 | A * | 4/1993 | Huang | E05F 1/1215 16/297 |
| 5,809,617 | A * | 9/1998 | Harris | E05D 1/04 16/267 |
| 5,870,281 | A * | 2/1999 | Kim | G06F 1/1616 16/319 |
| 6,163,929 | A * | 12/2000 | Bradley | E05D 5/127 16/380 |
| 6,317,928 | B1 * | 11/2001 | Guillemette | E05D 7/1016 16/353 |
| 7,017,234 | B2 * | 3/2006 | Anderson | E05B 75/00 16/319 |
| 7,513,014 | B2 * | 4/2009 | Lin | E05D 11/06 16/342 |
| 8,307,513 | B1 * | 11/2012 | Fitzgerald | E05D 11/06 16/344 |
| 8,739,366 | B2 * | 6/2014 | Heninger | E05D 5/10 16/374 |
| 8,863,360 | B2 * | 10/2014 | Mukherjee | E05D 1/04 16/269 |
| 9,097,048 | B2 * | 8/2015 | McCullough | A47B 3/08 |
| 9,359,799 | B2 * | 6/2016 | McCullough | A47B 3/08 |
| 9,732,545 | B2 * | 8/2017 | McCullough | A47B 3/08 |
| 2012/0117760 | A1 * | 5/2012 | Corso | E05D 5/12 16/374 |
| 2015/0048656 | A1 | 2/2015 | McCullough | |
| 2015/0284980 | A1 | 10/2015 | McCullough | |
| 2016/0252131 | A1 | 9/2016 | McCullough | |

OTHER PUBLICATIONS

Roy Underhill, Roubo's Folding Bookstand, Popular Woodworking Magazine, No. 188, Feb. 2011, 8 pages.

* cited by examiner

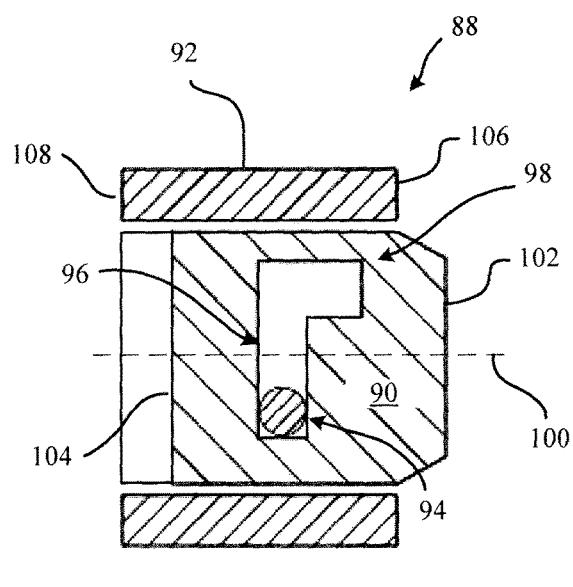
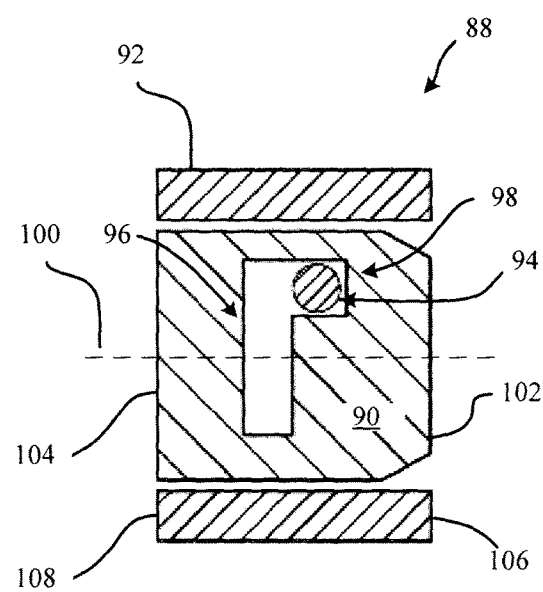
Figure 16    Figure 17
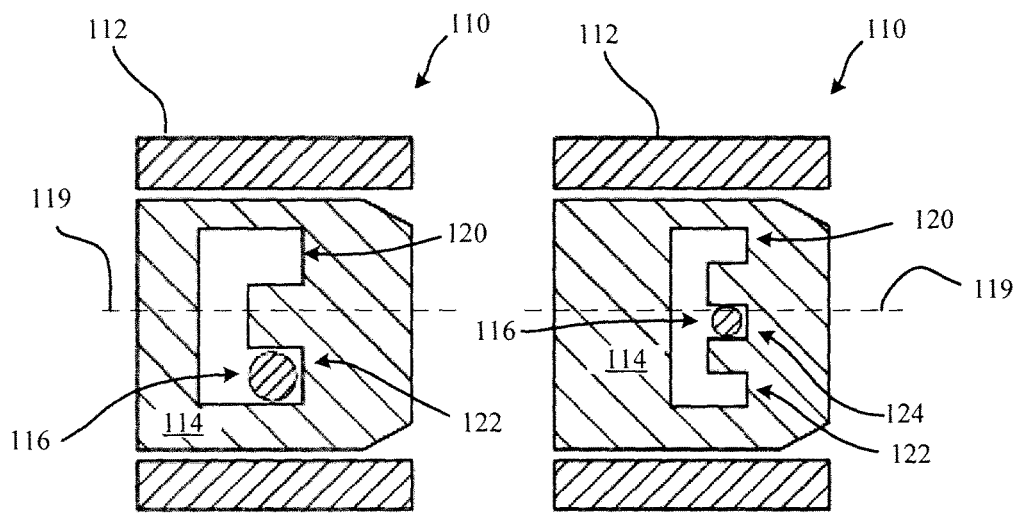
Figure 18    Figure 19

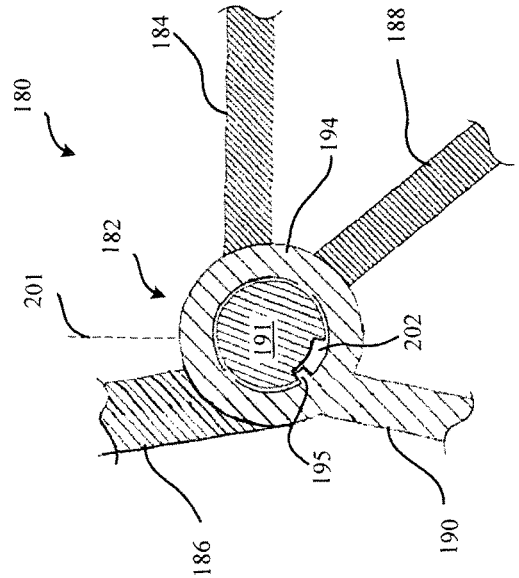
Figure 26
Figure 27
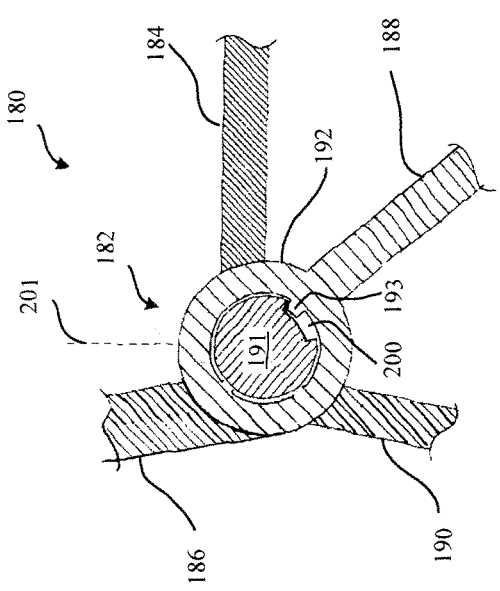
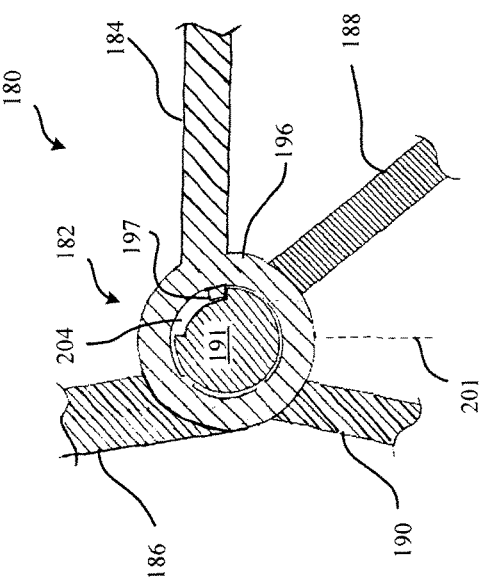
Figure 28
Figure 29

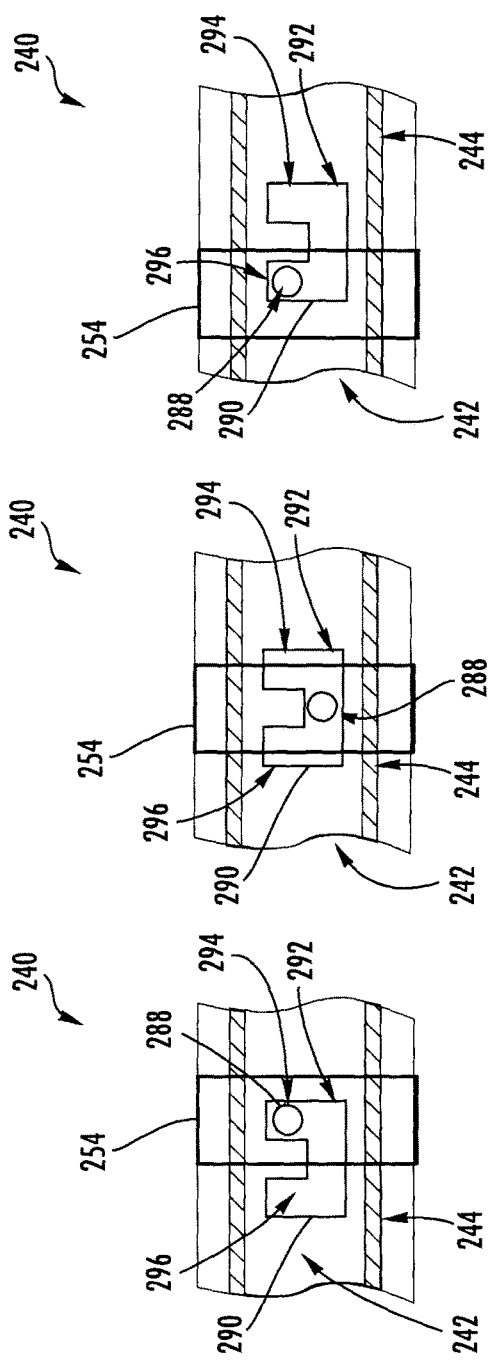

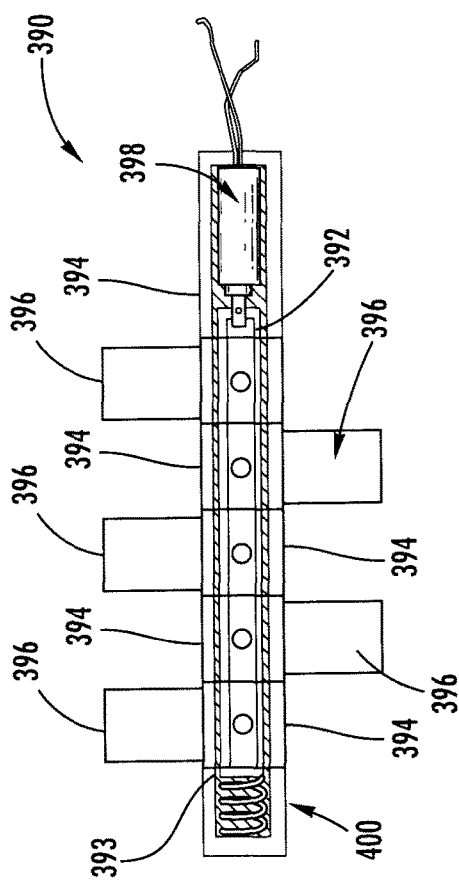
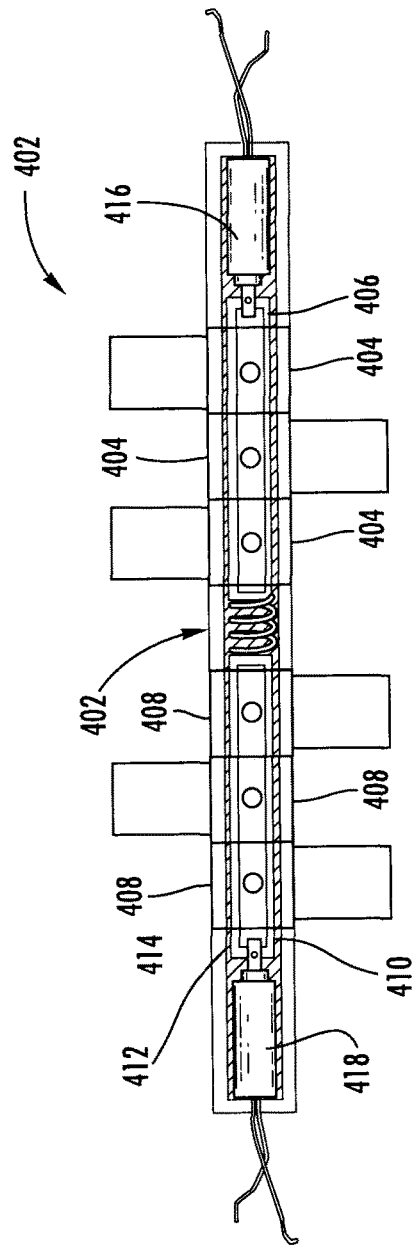
FIGURE 52
FIGURE 53

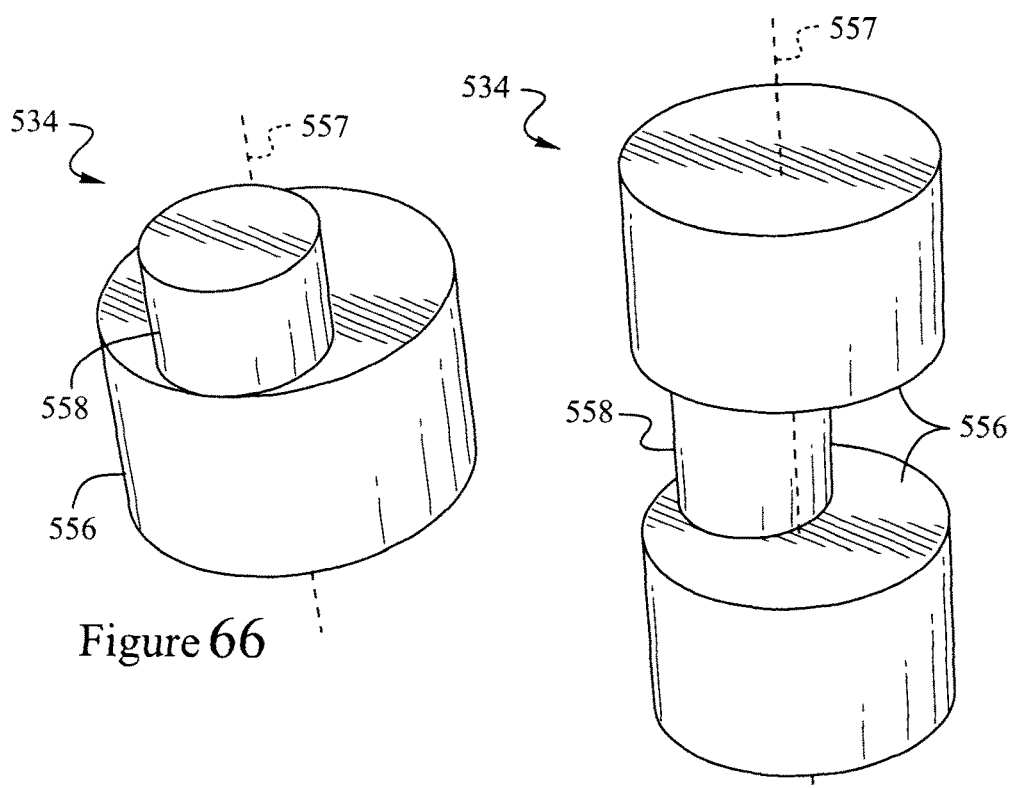
Figure 66
Figure 67
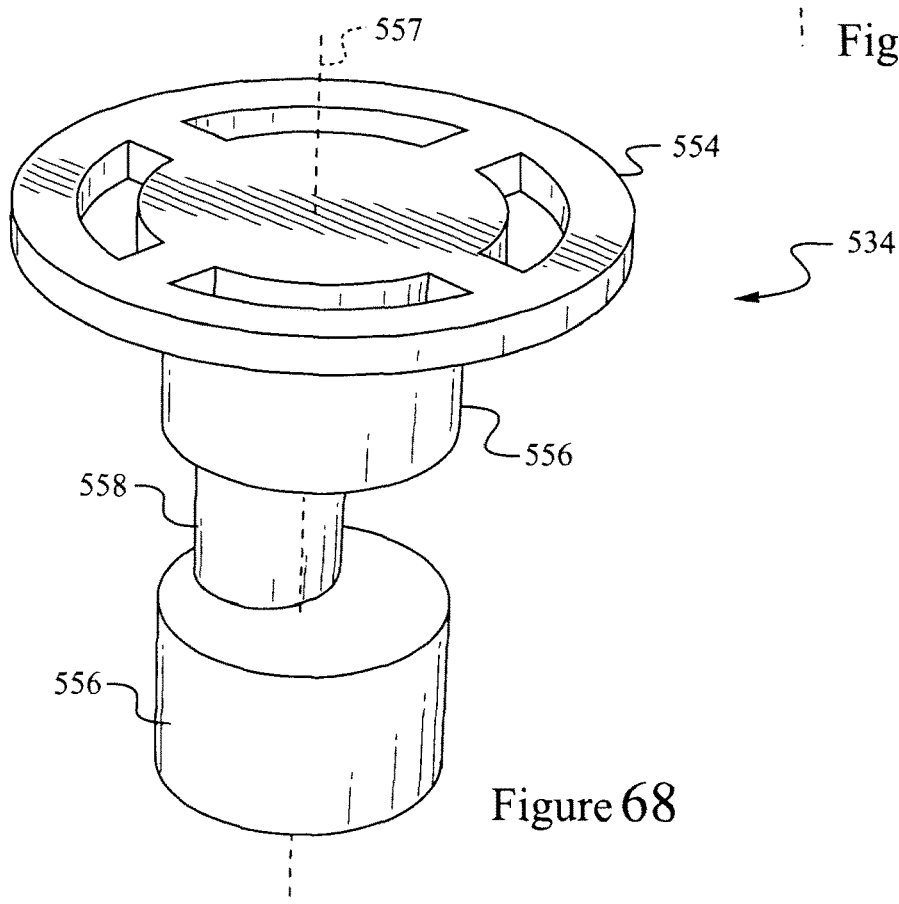
Figure 68

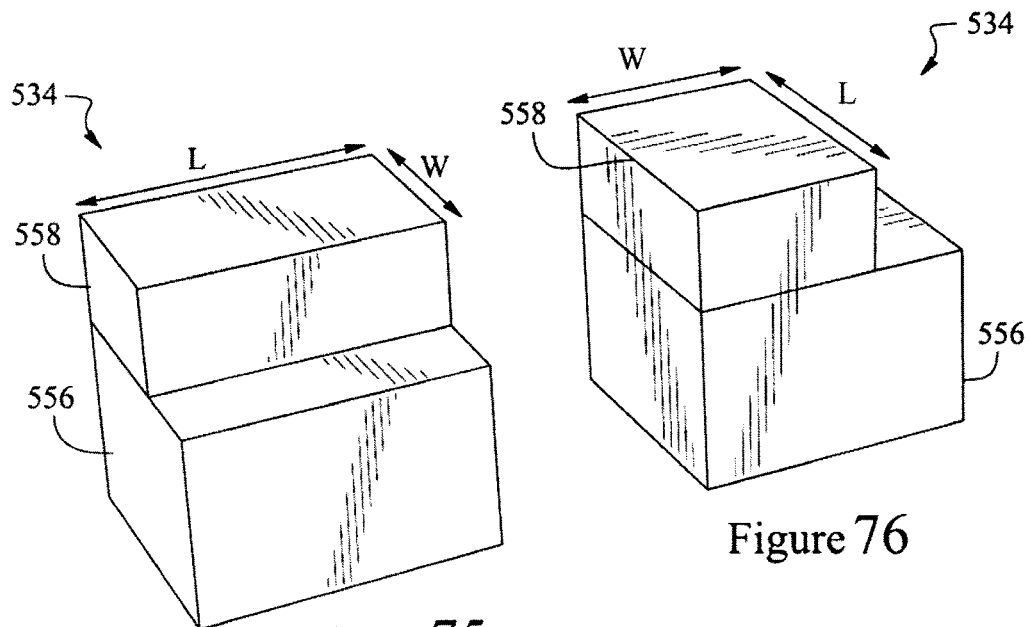
Figure 75
Figure 76
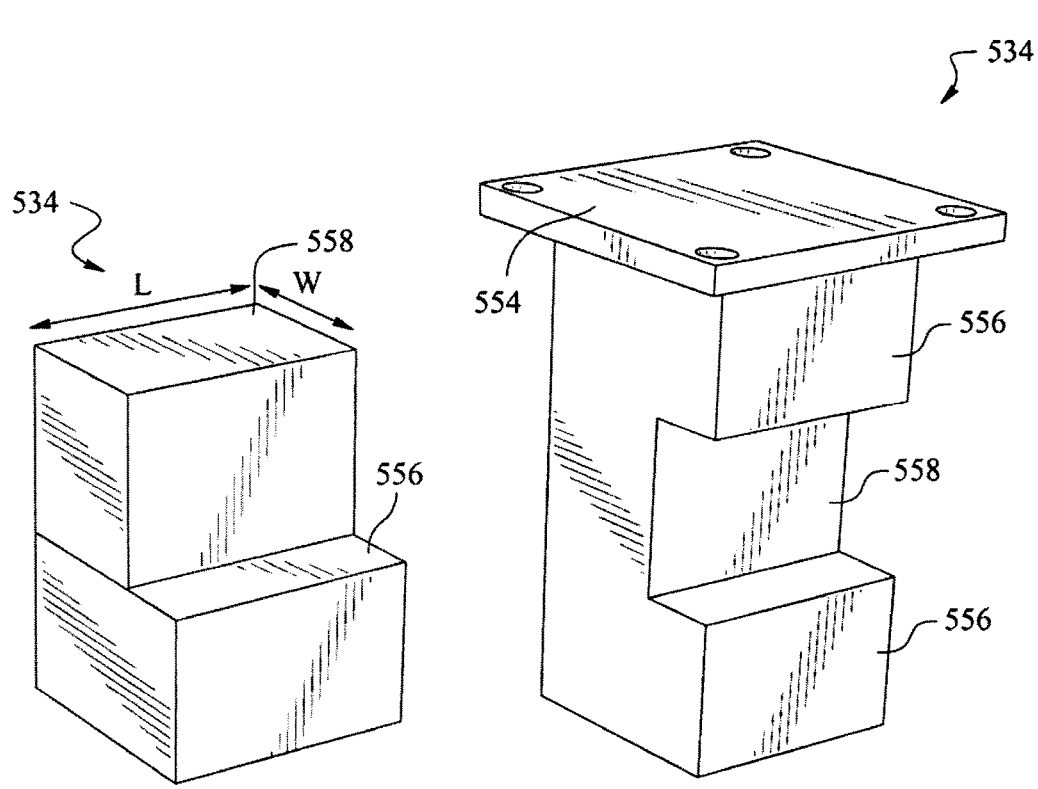
Figure 77
Figure 78

HINGE MECHANISMS

CROSS-REFERENCE TO RELATED APPLICATIONS

This application claims priority to U.S. Provisional Application Ser. No. 62/318,926 filed Apr. 6, 2016, entitled "HINGE MECHANISMS," the disclosure of which is hereby incorporated by reference in its entirety.

BACKGROUND OF THE DISCLOSURE

Embodiments of the present invention generally relate to hinge mechanisms. The hinge mechanisms may be used in any application of interest such as foldable furniture, including but not limited to foldable chairs, tables, stools, work benches, or the like. Some embodiments may generally relate to a method of manufacturing hinge mechanisms.

While a number of hinge designs have been proposed, further improvements, designs, and modularity may be desired.

SUMMARY OF THE DISCLOSURE

In some embodiments, a hinge mechanism is provided. The hinge mechanism may include a central lock cylinder (also referred to as a "locking cylinder" and in some instances as a "floating lock cylinder") having an elongate length defining a hinge axis. The central lock cylinder may include a first rotate channel transverse to the hinge axis. The first rotate channel may have a first end and a second end and an angular length therebetween. The central lock cylinder may further include a first locking channel extending from the first rotate channel in an axial direction. An intermediate hinge cylinder (also referred to as an "arc control cylinder") may be disposed about the central lock cylinder and may be rotatable relative to the central lock cylinder about the hinge axis. The intermediate hinge cylinder may include a first slot axially aligned with the first rotate channel of the central lock cylinder. In many embodiments, the first slot may have an angular length less than or equal to the angular length of the first rotate channel of the central lock cylinder. This may reduce the occurrence of the central lock cylinder binding due to weight, friction, and torque exerted on the hinge mechanism. A first collar may be disposed about the intermediate hinge cylinder. The first collar may include a first collar pin protruding inwardly from the first collar, through the first slot opening of the intermediate hinge cylinder, and into the first rotate channel of the central lock cylinder. The first collar pin of the first collar may cooperate with the first rotate channel to limit an axial range of movement between the first collar and the central lock cylinder in the axial direction. In further aspects, the first collar may have a rotational range of motion about the hinge axis relative to the central lock cylinder when the first collar pin is positioned within the first rotate channel.

When the first collar pin of the first collar is rotationally aligned with the first locking channel, the central lock cylinder may be movable in the axial direction relative to the first collar to transition the hinge mechanism into a first locking configuration where at least a portion the first collar pin of the first collar is positioned within the first locking channel. When at least a portion the first collar pin of the first collar is positioned within the first locking channel, the rotational range of motion of the first collar about the hinge axis relative to the central lock cylinder may be reduced.

Optionally, the first locking channel may extend from the first end of the first rotate channel. In some embodiments, the central lock cylinder further includes a second locking channel extending from the second end of the first rotate channel in the axial direction.

When the first collar pin of the first collar is rotationally aligned with the second locking channel, the central lock cylinder may be movable in the axial direction relative to the first collar to transition the hinge mechanism into a second locking configuration where at least a portion the first collar pin of the first collar is positioned within the second locking channel.

When at least a portion the first collar pin of the first collar is positioned within the second locking channel, the rotational range of motion of the collar about the hinge axis relative to the central lock cylinder may be reduced.

In some embodiments, the first locking channel and the second locking channel may extend from the first rotate channel in opposite directions.

In some embodiments, the first locking channel and the second locking channel extend from the first rotate channel in the same direction.

Optionally, the first locking configuration of the hinge mechanism may be a closed configuration of the hinge mechanism and the second locking configuration may be an open configuration of the hinge mechanism.

In some embodiments, the central lock cylinder may further include a second rotate channel transverse to the hinge axis—the second rotate channel including a first end and a second end and an angular length therebetween. Optionally, the angular length of the second rotate channel is different than the angular length of the first rotate channel. In some embodiments a rotational position of the second rotate channel is different than a rotational position of the first rotate channel. The central lock cylinder may further include a second locking channel extending from the second rotate channel in an axial direction. The intermediate hinge cylinder may also include a second slot axially aligned with the second rotate channel of the central lock cylinder. The second slot may be configured with an angular length less than or equal to the angular length of the second rotate channel of the central lock cylinder. A second collar may be disposed about the intermediate hinge cylinder. The second collar may include a second collar pin protruding inwardly from the second collar, through the second slot of the intermediate hinge cylinder and into the second rotate channel of the central lock cylinder.

The second collar pin of the second collar may cooperate with the rotate channel to limit an axial range of movement between the second collar and the central lock cylinder in the axial direction. The second collar may have a rotational range of motion about the hinge axis relative to the central lock cylinder that is different that the rotational range of motion of the first collar. The central lock cylinder may be movable in the axial direction relative to the first and second collars to transition the hinge mechanism into the first locking configuration—where at least a portion the first collar pin of the first collar is positioned within the first locking channel and at least a portion the second collar pin of the second collar is positioned within the second locking channel—when the first collar pin of the first collar is rotationally aligned with the first locking channel and the second collar pin of the second collar is rotationally aligned with the second locking channel. When at least a portion the first collar pin of the first collar is positioned within the first locking channel and when at least a portion the second collar pin of the second collar is positioned within the second locking channel, a rotational range of motion of the first collar relative to the second collar about the hinge axis may be reduced.

In some embodiments an edge formed between the first rotate channel and the first locking channel may be rounded.

Optionally, the intermediate hinge cylinder may further house a spring that biases the central lock cylinder in the axial direction toward the hinge mechanism locking configuration.

In some embodiments, the central lock cylinder may further include an axial channel extending in the axial direction and an axial lock channel extending from the axial channel in a direction transverse to the hinge axis. The hinge mechanism may further include a locking collar. The locking collar may include a locking collar pin protruding inwardly through the intermediate hinge cylinder and into the axial channel. The central lock cylinder may have an axial range of motion relative to the first collar when the locking collar is rotated such that the locking collar pin is positioned within the axial channel. The axial range of motion between the central lock cylinder and the first collar may be reduced when the locking collar is rotated such that the locking collar pin is positioned within the axial lock channel.

Optionally, a hinge endplate may be provided that is attachable to an end of the hinge mechanism to reduce an axial range of motion between the central lock cylinder and the first collar.

In some embodiments, a furniture unit is provided that includes a hinge mechanism described herein. The furniture unit may be a seat deployable between a folded position and a deployed position. Optionally, the furniture unit may be a table deployable between a folded position and a deployed position.

In further aspects of the invention, a furniture unit configured to be deployable between a folded position and a deployed position may be provided. The furniture unit may include a first furniture piece and a second furniture piece coupled to the first furniture piece by a hinge mechanism. The second furniture piece may be rotatable relative to the first furniture piece. The hinge mechanism may include a central lock cylinder having a surface and an elongate length defining a hinge axis. The central lock cylinder may further include a first rotate channel along the surface and transverse to the hinge axis.

A first collar may be provided and coupled with the central lock cylinder along a first portion of the elongate length of the central lock cylinder. The first collar may include a first collar pin protruding inwardly from the first collar and into the first rotate channel of the central lock cylinder. The first collar pin of the first collar may cooperate with the first rotate channel to limit an axial range of movement between the first collar and the central lock cylinder in an axial direction. The first collar may have a rotational range of motion about the hinge axis relative to the central lock cylinder. The first furniture piece may be coupled with the first collar.

In some embodiments, the first rotate channel of the central lock cylinder may have an annular segment configuration. The first collar pin may cooperate with the first rotate channel to limit the rotational range of motion of the first collar about the hinge axis relative to the central lock cylinder to less than 360 degrees (e.g., less than 135 degrees).

The central lock cylinder of the hinge mechanism may further include a first locking channel extending from the first rotate channel in the axial direction. When the first collar pin of the first collar is rotationally aligned with the first locking channel, the central lock cylinder may be movable in the axial direction relative to the first collar to lock the furniture unit into the deployed position or the folded position where at least a portion the first collar pin of the first collar is positioned within the first locking channel. When at least a portion the first collar pin of the first collar is positioned within the first locking channel, the rotational range of motion of the first collar about the hinge axis relative to the central lock cylinder may be reduced.

An edge formed between the first rotate channel and the first locking channel may be rounded to facilitate movement of the first collar pin into and out of the first locking channel.

The central lock cylinder may be nested within an intermediate hinge cylinder positioned between the central lock cylinder and the first collar. The intermediate hinge cylinder may be rotatable about the hinge axis relative to the central lock cylinder and the first collar. The intermediate hinge cylinder may include a first slot corresponding to the first rotate channel of the central lock cylinder such that the first collar pin of the first collar protrudes through the first slot of the intermediate hinge cylinder and into the first rotate channel of the central lock cylinder. Optionally, an angular length of the first slot may be less than an angular length of the first rotate channel.

In some embodiments, the first furniture piece may be rotatable about the hinge axis to a position adjacent and parallel to the second furniture piece. A thickness of the first furniture piece in addition to a thickness of the second furniture piece may be equal to the diameter of the first collar.

In some embodiments, the second furniture piece may be integrally formed with the central lock cylinder.

In some embodiments, the hinge mechanism may further include a second rotate channel along the surface and transverse to the hinge axis, a third rotate channel along the surface and transverse to the hinge axis, and/or a fourth rotate channel along the surface and transverse to the hinge axis. The hinge mechanism may further include a second collar rotatably coupled with the central lock cylinder along a second portion of the elongate length of the central lock cylinder—the second collar coupled to the second furniture piece and having a second collar pin protruding inwardly into the second rotate channel. The hinge mechanism may further a third collar rotatably coupled with the central lock cylinder along a third portion of the elongate length of the central lock cylinder—the third collar coupled to a third furniture piece and having a third collar pin protruding inwardly into the third rotate channel. The hinge mechanism may further include a fourth collar rotatably coupled with the central lock cylinder along a fourth portion of the elongate length of the central lock cylinder—the fourth collar coupled to a fourth furniture piece and having a fourth collar pin protruding inwardly into the fourth rotate channel.

The hinge mechanism may further include a first locking channel extending from the first rotate channel in the axial direction, a second locking channel extending from the second rotate channel in the axial direction, a third locking channel extending from the third rotate channel in the axial direction, and/or a fourth locking channel extending from the fourth rotate channel in the axial direction.

The first furniture piece, the second furniture piece, the third furniture piece, and the fourth furniture piece may be deployable from the folded configuration to the deployed configuration. The first furniture piece, second furniture piece, third furniture piece, and fourth furniture piece may be in the deployed configuration when the first collar pin, the second collar pin, the third collar pin, and the fourth collar pin are rotatably aligned with and/or positioned in the first locking channel, the second locking channel, the third locking channel, and the fourth locking channel, respectively.

In some embodiments, the first collar and the first collar pin of the hinge mechanism may be an integral piece.

In some embodiments, the first collar and the first collar pin of the hinge mechanism may be separate pieces. The first collar may include a collar pin hole for receiving the first collar pin therethrough.

In further aspects of the present invention, yet another hinge mechanism is provided. The hinge mechanism may include a central lock cylinder having an elongate length defining a hinge axis. The central lock cylinder may further include a first rotate channel transverse to the hinge axis at a first portion of the central lock cylinder and a locking channel extending from the rotate channel in the an axial direction.

The hinge mechanism may further include three separate flats rotatably coupled with the central lock cylinder. In some embodiments, at least two of the three flats may be coupled with the central lock cylinder via a first collar and a second collar, respectively. The first collar may be coupled with the central lock cylinder along the first portion of the elongate length of the central lock cylinder. The first collar may include a first collar pin protruding inwardly from the first collar and into the first rotate channel of the central lock cylinder.

The first collar pin of the first collar may cooperate with the first rotate channel to limit movement between the first collar and the central lock cylinder in the axial direction. The first collar may have a rotational range of motion about the hinge axis relative to the central lock cylinder.

In some embodiments, at least one of the three flats may be integrally formed with the central lock cylinder.

Optionally, in some embodiments the central lock cylinder may further include a second rotate channel transverse to the hinge axis at a second portion of the elongate length of the cylinder hinge, a third rotate channel transverse to the hinge axis at a third portion of the elongate length of the central lock cylinder, and/or a fourth rotate channel transverse to the hinge axis at a fourth portion of the elongate length of the cylinder hinge.

The central lock cylinder may further include a second locking channel extending from the second rotate channel in the axial direction, a third locking channel extending from the third rotate channel in the axial direction, and/or a fourth locking channel extending from the fourth rotate channel in the axial direction. The at least three separate flats may comprise a first flat, a second flat, a third flat, and a fourth flat. The first flat may couple with the first collar. The second flat may couple along the second portion of the central lock cylinder via the second collar. The second collar may include a second collar pin protruding inwardly from the second collar and into the second rotate channel of the central lock cylinder.

The third flat may couple along the third portion of the central lock cylinder via a third collar. The third collar may include a third collar pin protruding inwardly from the third collar and into the third rotate channel of the central lock cylinder.

The fourth flat may couple along the fourth portion of the central lock cylinder via a fourth collar. The fourth collar may include a fourth collar pin protruding inwardly from the fourth collar and into the fourth rotate channel of the central lock cylinder.

The hinge mechanism may have a deployed configuration. The hinge may be in the deployed configuration when the first collar pin, the second collar pin, the third collar pin, and the fourth collar pin are rotatably aligned with and/or positioned in the first locking channel, the second locking channel, the third locking channel, and the fourth locking channel, respectively.

While some embodiments have collars with studs protruding inwardly into rotate and/or lock channels of the central lock cylinder, other embodiments of the hinge may have collars with rotate and/or lock channels that are configured to receive a stud extending outwardly from the surface of the central lock cylinder. Further, it should be understood that in some embodiments, some collars of a hinge may include rotate and/or locking channels for receiving a stud extending outwardly from the surface of the central lock cylinder, while other collars of the hinge include studs that project inwardly into rotate and/or locking channels of the central lock cylinder. Accordingly, in some embodiments, features of the collar and central lock cylinder may be reversible and may be configured to provide similar utility.

Thus, in some aspects of the present invention, a hinge mechanism is provided that includes a central cylinder having an elongate length defining a hinge axis and a collar disposed about the central cylinder. The collar may include a rotate channel transverse to the hinge axis. The rotate channel may include a first end and a second end and an angular length therebetween. The collar may also include a locking channel extending from the rotate channel in an axial direction. The central cylinder may include a stud protruding outwardly from a surface of the central cylinder into the rotate channel or the lock channel of the collar. The stud of the central cylinder may cooperate with the rotate channel to limit an axial range of movement between the collar and the central cylinder in the axial direction. The collar may have a rotational range of motion about the hinge axis relative to the central cylinder when the stud is positioned within the rotate channel of the collar. When the stud of the central cylinder is rotationally aligned with the locking channel, the central cylinder is movable in the axial direction relative to the collar to transition the hinge mechanism into a locking configuration where at least a portion the stud of the central cylinder is positioned within the locking channel of the collar. When at least a portion the stud of the central cylinder is positioned within the locking channel, the rotational range of motion of the collar about the hinge axis relative to the central cylinder may be reduced.

The hinge mechanism may also include an intermediate cylinder positioned between the collar and the central cylinder and rotatable relative to the central cylinder about the hinge axis. The intermediate cylinder may include a slot axially aligned with the rotate channel of the collar. The slot may have an angular length less than or equal to the angular length of the rotate channel of the collar. The stud of the central cylinder may protrude outwardly through the first slot opening of the intermediate cylinder and into the rotate channel of the collar. Further, embodiments of the hinge mechanism may also include many of the features described above and throughout this application.

A hinge system may be provided in further embodiments. The hinge system may include a central cylinder having an elongate length defining a hinge axis. The central cylinder may include: a first rotate channel transverse to the hinge axis, the first rotate channel including a first end and a second end; a second rotate channel transverse to the hinge axis, the second rotate channel including a first end and a second end; and the first end of the first rotate channel may be on an opposite side of the central cylinder from the first end of the second rotate channel and the second end of the first rotate channel may be on an opposite side of the central cylinder from the second end of the second rotate channel. A collar may be provided that may be configured to be disposed about the central cylinder and about the first rotate channel and the second rotate channel of the central cylinder. A collar pin may be provided that is configured to extend from the collar through the central cylinder by extending through the first rotate channel and the second rotate channel of the central cylinder. The collar pin may cooperate with the first rotate channel and the second rotate channel to limit an axial range of movement between the collar and the central cylinder in an axial direction. The collar may have a rotational range of motion about the hinge axis relative to the central cylinder when the collar pin is positioned within the first and second rotate channels. The hinge mechanism may further comprise a first configuration and a second configuration. The first configuration may be defined by the collar rotated to a position relative to the central cylinder where a first portion of the collar pin is proximal to the first end of the first rotate channel and where a second portion of the collar pin that is opposite the first portion of the collar pin is proximal to the first end of the second rotate channel. The second configuration may be defined by the collar rotated to a position relative to the central cylinder where the first portion of the collar pin is proximal the second end of the first rotate channel and where the second portion of the collar pin is proximal to the second end of the second rotate channel.

Optionally, in some embodiments, the first rotate channel and the second rotate channel may be aligned. The angle subtended by the first rotate channel and the second rotate channel when a vertex of the angle is the hinge axis may be 90 degrees or less. In some embodiments, the angle subtended by the first rotate channel and the second rotate channel when the vertex of the angle is the hinge axis may be 45 degrees or less.

The central cylinder may further include a first locking channel extending from the first end of the first rotate channel in an axial direction, the first locking channel may include a tapered portion that tapers in the axial direction away from the first rotate channel from a first width to a second width that is less than the first width. The central cylinder may further include a second locking channel extending from the first end of the second rotate channel in an axial direction, the second locking channel including a tapered portion that tapers in the axial direction away from the second rotate channel from a first width to a second width that is less than the first width. When the first portion of the collar pin is rotationally aligned with the first locking channel and when the second portion of the collar pin is rotationally aligned with the second locking channel, the central cylinder may be moveable in the axial direction relative to the collar to transition the hinge mechanism into a locking configuration where at least a part of the first portion of the collar pin is positioned within the first locking channel of the central cylinder and wherein at least a part of the second portion of the collar pin is positioned within the second locking channel. When at least a part of the first portion of the collar pin is positioned within the first locking channel and when at least a part of the second portion of the collar pin is positioned within the second locking channel, the rotational range of motion of the collar about the hinge axis relative to the central cylinder may be reduced.

In some embodiments, the second width of the first locking channel may be less than a width of the first portion of the collar pin and the second width of the second locking channel may be less than a width of the second portion of the collar pin.

Optionally, the collar may include a first aperture and a second aperture for receiving the collar pin therethrough. The first aperture and the second aperture may define a collar pin insertion axis. The collar pin may be repositionable to a plurality of positions relative to the collar about the collar pin insertion axis. Collar pin repositioning about the collar pin insertion axis may vary an axial position of the collar relative to the central cylinder, a rotational range of motion of the collar about the central cylinder, or both the axial position of the collar relative to the central cylinder and the rotational range of motion of the collar about the central cylinder.

In some embodiments, the first and second apertures may have a circular cross-section when viewed along the collar pin insertion axis. In some embodiments, the first and second apertures may include an engagement feature configured to engage with a corresponding engagement feature of the collar pin. Optionally, the first and second apertures may be splined or threaded. In some embodiments, the first and second apertures have a non-circular cross-section when viewed along the collar pin insertion axis.

In some embodiments, the collar pin may comprise a collar pin body configured to engage with walls of the collar defining the first and second apertures and a collar pin tip configured to engage with the first rotate channel and the second rotate channel of the central cylinder. An axis of the collar pin tip may be not coaxial with the collar pin insertion axis when the collar pin is received through the first and second apertures. The collar pin tip may have an elliptical cross-section when viewed along an axis of the collar pin tip. Optionally, the collar pin tip has a rectangular cross-section with a length greater than a width when viewed along an axis of the collar pin tip.

In some embodiments, the collar pin includes a head configured to engage with an outer surface of the collar. An inner surface of the head may be curved to match a curvature of the outer surface of the collar. An inner surface of the head may be flat to match a flat portion of the outer surface of the collar which the head of the collar pin engages with. In some embodiments, the head may include one or more slots for receiving an engagement feature therethrough for securing the collar pin to the collar.

In further aspects, a hinge mechanism may be provided with a central cylinder having an elongate length defining a hinge axis. The central cylinder may include a first rotate channel transverse to the hinge axis, the first rotate channel may include a first end and a second end; and a locking channel extending from the first end of the first rotate channel in an axial direction, the locking channel may include a tapered portion that tapers in the axial direction away from the first rotate channel from a first width to a second width that is less than the first width. A collar may be configured to be disposed about the central cylinder. A collar pin may be configured to extend inwardly from the collar and into the first rotate channel or the locking channel of the central cylinder. The collar pin may cooperate with the first rotate channel to limit an axial range of movement between the collar and the central cylinder in an axial direction. The collar may have a rotational range of motion about the hinge axis relative to the central cylinder when the collar pin is positioned within the first rotate channel of the central cylinder. The hinge mechanism may further comprise a first configuration and a second configuration. The first configuration may be defined by the collar rotated to a position relative to the central cylinder where the collar pin is proximal to the first end of the first rotate channel. The second configuration may be defined by the collar rotated to a position relative to the central cylinder where the collar pin is proximal the second end of the first rotate channel. When the collar pin is rotationally aligned with the locking channel, the central cylinder may be moveable in the axial direction relative to the collar to transition the hinge mechanism into a locking configuration where at least a portion of the collar pin is positioned within the locking channel of the central cylinder. When at least a portion of the collar pin is positioned within the locking channel, the rotational range of motion of the collar about the hinge axis relative to the central cylinder may be reduced.

The second width of the locking channel may be less than a width of the collar pin to provide a friction fit engagement between the collar pin and the locking channel when the hinge mechanism is transitioned into the locking configuration. In some embodiments, the collar includes an aperture for receiving the collar pin therethrough. The aperture may define a collar pin insertion axis. The collar pin may be repositionable to a plurality of positions relative to the collar about the collar pin insertion axis. Collar pin repositioning about the collar pin insertion axis may vary an axial position of the collar relative to the central cylinder, a rotational range of motion of the collar about the central cylinder, or both the axial position of the collar relative to the central cylinder and the rotational range of motion of the collar about the central cylinder.

In some embodiments, the aperture may have a circular cross-section when viewed along the collar pin insertion axis. The aperture may include an engagement feature configured to engage with a corresponding engagement feature of the collar pin. Optionally, the aperture is splined or threaded.

In some embodiments, the aperture may have a non-circular cross-section when viewed along the collar pin insertion axis. The collar pin may include a collar pin body configured to engage with walls of the collar defining the aperture and a collar pin tip configured to engage with the first rotate channel of the central cylinder. Optionally, an axis of the collar pin tip may be not coaxial with the collar pin insertion axis when the collar pin is received through the aperture.

In some embodiments, the collar pin tip may have an elliptical cross-section when viewed along an axis of the collar pin tip. In some embodiments, the collar pin tip may have a rectangular cross-section with a length greater than a width when viewed along an axis of the collar pin tip.

Optionally, the collar pin may include a head configured to engage with an outer surface of the collar. An inner surface of the head may be curved to match a curvature of the outer surface of the collar. An inner surface of the head may be flat to match a flat portion of the outer surface of the collar which the head of the collar pin engages with. The head may include one or more slots for receiving an engagement feature therethrough for securing the collar pin to the collar.

In further aspects, a hinge mechanism may be provided that includes a central cylinder having an elongate length defining a hinge axis. The central cylinder may include a first rotate channel transverse to the hinge axis, the first rotate channel may include a first end and a second end. A collar may be configured to be disposed about the central cylinder and about the first rotate channel of the central cylinder. A collar pin may be configured to extend inwardly from the collar and into the first rotate channel of the central cylinder. The collar pin may cooperate with the first rotate channel to limit an axial range of movement between the collar and the central cylinder in an axial direction. The collar may have a rotational range of motion about the hinge axis relative to the central cylinder when the collar pin is positioned within the first rotate channel. The collar may include an aperture for receiving the collar pin therethrough, the aperture may define a collar pin insertion axis. The collar pin may be repositionable to a plurality of positions relative to the collar about the collar pin insertion axis. Collar pin repositioning about the collar pin insertion axis may vary an axial position of the collar relative to the central cylinder, a rotational range of motion of the collar about the central cylinder, or both the axial position of the collar relative to the central cylinder and the rotational range of motion of the collar about the central cylinder.

In some embodiments, the aperture may have a circular cross-section when viewed along the collar pin insertion axis. Optionally, the aperture may include an engagement feature configured to engage with a corresponding engagement feature of the collar pin. In some embodiments, the aperture may be splined or threaded.

In some embodiments, the aperture may have a non-circular cross-section when viewed along the collar pin insertion axis. Optionally, the collar pin may include a collar pin body configured to engage with walls of the collar defining the aperture and a collar pin tip configured to engage with the first rotate channel of the central cylinder.

In some embodiments, an axis of the collar pin tip may be not coaxial with the collar pin insertion axis when the collar pin is received through the aperture. The collar pin tip may have an elliptical cross-section when viewed along an axis of the collar pin tip. Optionally, the collar pin tip may have a rectangular cross-section with a length greater than a width when viewed along an axis of the collar pin tip.

Optionally, the collar pin may include a head configured to engage with an outer surface of the collar. An inner surface of the head may be curved to match a curvature of the outer surface of the collar. An inner surface of the head may be flat to match a flat portion of the outer surface of the collar which the head of the collar pin engages with. The head may include one or more slots for receiving an engagement feature therethrough for securing the collar pin to the collar.

In still further aspects, a hinge mechanism may be provided that includes a central cylinder having an elongate length defining a hinge axis. The central cylinder may include a first rotate channel transverse to the hinge axis. The first rotate channel may include a first end and a second end. A collar may have an outer surface and an inner surface and an aperture extending from the outer surface to the inner surface. The collar may be configured to be disposed about the central cylinder and about the first rotate channel of the central cylinder. A collar pin may have a head with an inner surface. The collar pin may be configured to extend through the aperture of the collar and into the first rotate channel of the central cylinder. The inner surface of the head of the collar pin may be configured to match an outer surface of the collar. The collar pin may cooperate with the first rotate channel to limit an axial range of movement between the collar and the central cylinder in an axial direction. The collar may have a rotational range of motion about the hinge axis relative to the central cylinder when the collar pin is positioned within the first rotate channel. The hinge mechanism may further include a first configuration and a second configuration. The first configuration may be defined by the collar rotated to a position relative to the central cylinder where the collar pin is proximal to the first end of the first rotate channel. The second configuration may be defined by the collar rotated to a position relative to the central cylinder where the collar pin is proximal the second end of the first rotate channel.

In some embodiments, the collar couples with two blades that are configured to receive a flat. Optionally, the two blades may be parallel with one another.

In some embodiments, a portion of the outer surface of the collar may be flat. The aperture may extend from the flat portion of the outer surface of the collar to the inner surface of the collar. The inner surface of the head of the collar pin may be flat to match the flat portion of the outer surface of the collar.

In some embodiments, a portion of the outer surface of the collar may be curved. The aperture may extend from the curved portion of the outer surface of the collar to the inner surface of the collar. The inner surface of the head of the collar pin may be curved to match a curvature of the curved portion of the outer surface of the collar.

Optionally, the head of the collar pin may include one or more slots for receiving an engagement feature therethrough to secure the collar pin to the collar.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The invention will be better understood on reading the following description and examining the figures that accompany it. These figures are provided by way of illustration only and are in no way limiting on the invention.

BRIEF DESCRIPTION OF THE DRAWINGS

FIG. 16 illustrates an exemplary hinge or hinge portion in a rotate configuration where the collar is free to rotate about the central lock cylinder within its rotational range of motion;

FIG. 17 illustrates the exemplary hinge or hinge portion of FIG. 16 in a lock configuration;

FIG. 18 illustrates an exemplary hinge with a plurality of locking channels located within the central lock cylinder;

FIG. 19 illustrates another exemplary collar, stud, and central lock cylinder design;

FIG. 26 shows a cross-sectional view of the hinge in FIG. 25 at A-A;

FIG. 27 shows a cross-sectional view of the hinge in FIG. 25 at B-B;

FIG. 28 shows a cross-sectional view of the hinge in FIG. 25 at C-C;

FIG. 29 shows a cross-sectional view of the hinge in FIG. 25 at D-D;

FIG. 39 illustrates a lock position of an exemplary lock collar of the exemplary hinge of FIG. 33;

FIG. 40 illustrates the exemplary lock collar of FIG. 39 in an unlocked position according to some embodiments;

FIG. 41 illustrate another lock position of the exemplary lock collar of FIG. 39 according to some embodiments;

FIG. 42 shows another exemplary method and system for locking a central lock cylinder of hinge in an axial direction according to some embodiments;

FIG. 43 shows another view of the locking plate of FIG. 42;

FIG. 52 shows an exemplary which may use a solenoid to control the locking and unlocking of the hinge and an optional internal spring for biasing the central lock cylinder in the axial direction;

FIG. 53 illustrates an exemplary hinge with two central lock cylinders controlled with two separate solenoids and an optional internal spring for biasing the central lock cylinder in the axial direction;

FIG. 66 illustrates yet another variation of an exemplary collar pin including an offset collar pin tip according to some embodiments;

FIG. 67 illustrates an exemplary variation of the exemplary collar pin of FIG. 66 configured to span the central cylinder according to some embodiments;

FIG. 68 illustrates an exemplary variation of the exemplary collar pin of FIG. 67 including a collar pin head according to some embodiments;

FIG. 75 illustrates yet another variation of an exemplary collar pin including a rectangular collar pin tip according to some embodiments;

FIG. 76 illustrates the exemplary collar pin of FIG. 75 rotated to a second configuration which changes an angle of opening between the collar and intermediate cylinder or central cylinder according to some embodiments;

FIG. 77 illustrates an exemplary variation of the exemplary collar pin shown in FIG. 75 and FIG. 76 with an extended collar tip configured to span the diameter of the central cylinder according to some embodiments;

FIG. 78 illustrates an exemplary variation of the exemplary collar pin shown in FIG. 77 including two collar pin bodies and a collar pin head according to some embodiments;

DETAILED DESCRIPTION OF THE DISCLOSURE

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
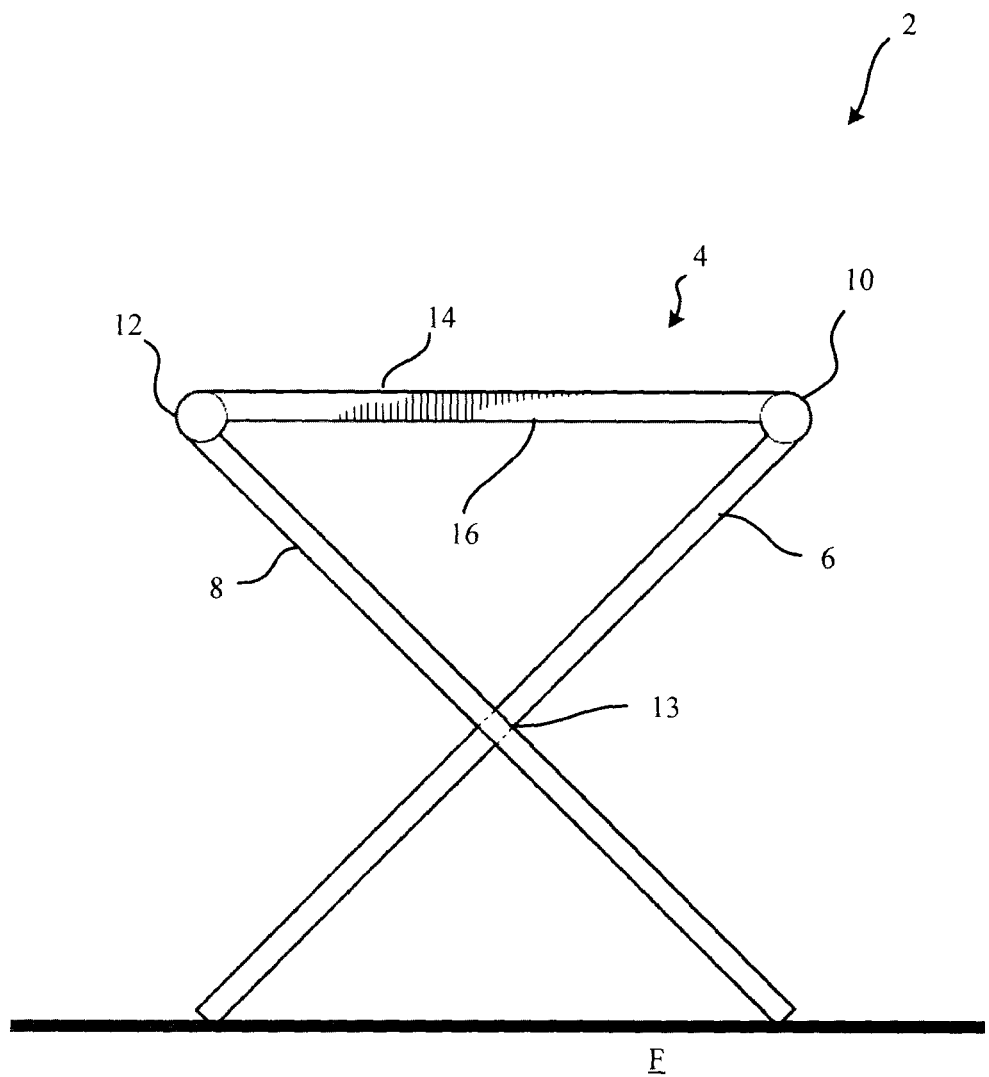
FIG. 1 shows an exemplary furniture unit in a first configuration according to some embodiments.

FIG. 1 shows an exemplary modular furniture unit 2 in a first configuration according to some embodiments. The furniture unit 2 comprises a furniture piece 4, a first leg 6, and a second leg 8. The first leg 6 couples to the furniture piece 4 at a first side of the furniture piece 4 via first hinge 10. The second leg couples to the furniture piece 4 at a second side of the furniture piece 4 opposite the first side via a second hinge 12. In many embodiments, the first leg 6 and the second leg 8 intersect and create a joint 13 of furniture unit 2 that limits the rotation of first leg 6 and second leg 8 about hinges 10, 12, respectively. When the joint 13 is formed between first leg 6 and second leg 8, the furniture unit 2 may then provide a fixed surface for supporting weight (e.g., for sitting, kneeling, working, or the like). Optionally, legs 6, 8 may be disengaged and rotated away from one another to a folded/flat configuration where one or both legs are rotated to a position against adjacent furniture piece 4 (e.g., parallel to a plane of furniture piece 4 and/or coplanar with furniture piece 4). Advantageously, in the folded/flat configuration of furniture unit 2 may allow for easy storage (e.g., hanging on a wall) and/or stacking of multiple furniture units 2 on top of one another.

The modular furniture unit 2 may be a stool, workstation, chair, table, or the like according to some embodiments. The furniture piece 4 may be a generally flat piece with a first major surface 14 and a second major surface 16 opposite the first major surface 14. The first major surface 14 and/or the second major surface 16 may have a generally flat configuration. In some embodiments, the first and/or second major surface 14, 16 of furniture piece 4 may be a table or workstation top. In other embodiments, the first and/or second major surface 14, 16 of the furniture piece 4 may be a seat or stool bottom.

The first leg 6 and the second leg 8 may rotate relative to the first furniture piece 4 about hinge 10 and hinge 12, respectively, and cooperate with one another to position the modular furniture unit 2 in various configurations (e.g., folded/flat configuration, etc.). For example, in the first configuration illustrated in FIG. 1, a joint 13 is formed between the first leg 6 and the second leg 8 so that the first major surface 14 of the furniture unit may be substantially horizontal with the floor F. In embodiments where first leg 6 and second leg 8 are similar lengths, this may be accomplished by forming joint 13 along a vertical midline between hinge 10 and hinge 12.

Figure 2:
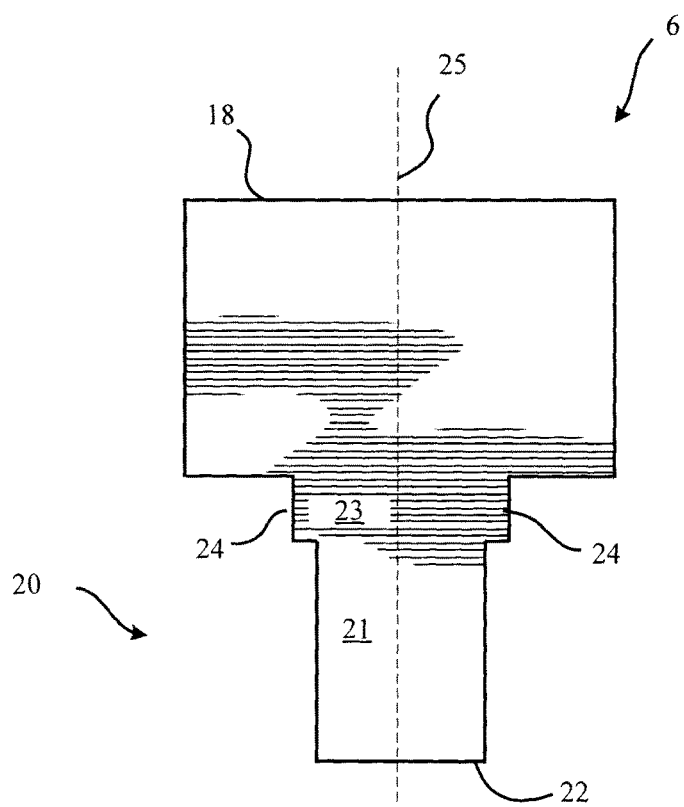
FIG. 2 shows an exemplary front leg of the exemplary furniture unit of FIG. 1 according to some embodiments.

FIG. 2 illustrates an exemplary configuration for first leg 6 according to some embodiments of the present invention. First leg 6 includes one or more engagement features that cooperate with engagement features on second leg 8. In the illustrated embodiment, first leg 6 has a top side 18 that couples with the furniture piece 4 via hinge 10. In some embodiments, the top side 18 of first leg 6 may be fixed/integral with the hinge 10. From the top side 18, a width of first leg 6 may narrow at a tongue 20. The tongue 20 may further include one or more intermediate step portions 24 where the tongue 20 further reduces in width in a step-wise manner to the bottom side 22 of first leg 6. The one or more intermediate step portions 24 may define separate tongue portions having different widths. For example, in the illustrated embodiment, tongue 20 may include a first portion 21 having a first portion width and a second portion 23 with a second portion width that is greater than the first portion width. Optionally, tongue 20 and step portion 24 may be centered along a vertical midline 25 of first leg 6.

Figure 3:
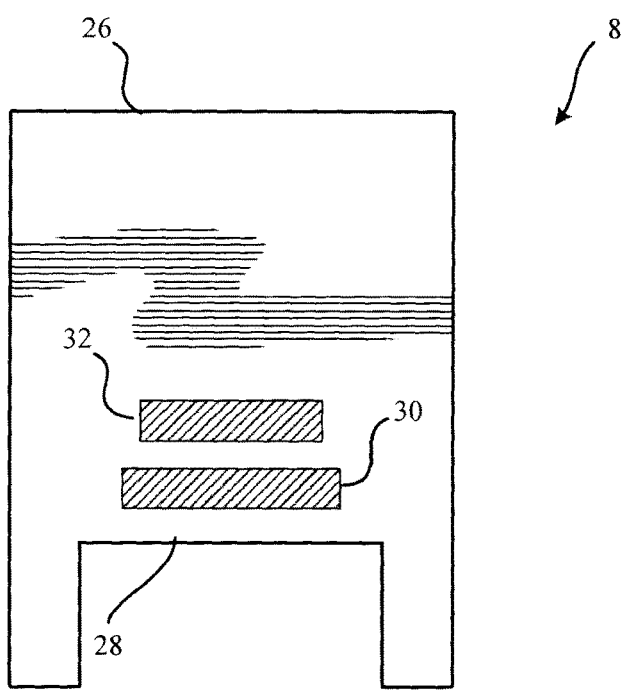
FIG. 3 shows an exemplary back leg of the exemplary furniture unit of FIG. 1 according to some embodiments.

FIG. 3 illustrates an exemplary complementary configuration for second leg 8 according to some embodiments of the invention. As mentioned above, in many embodiments, second leg 8 may include one or more engagement features that cooperate with engagement features on first leg 6 to form joint 13. In the illustrated embodiment, second leg 8 has a top side 26 that couples with the furniture piece 4 via hinge 12. In some embodiments, the top side 26 of second leg 8 may be fixed/integral with the hinge 12. Opposite the top side 26, second leg 8 may include a recessed side 28. Further, second leg 8 may include a first slot 30 and a second slot 32.

Recessed side 28 may have a width configured to receive and engage with at least the first portion 21 of tongue 20 to form joint 13. Optionally, the recessed side 28 may also have a width sufficient to receive and engage with second portion 23 of tongue 20 to form joint 13. Optionally, the first slot 30 may have a configuration for receiving and engaging with the second portion 23 of tongue 20. Accordingly, the first slot 30 may have a width greater than or equal to a width of portion 23 and a height greater than or equal to a thickness of first leg 6. Further, second slot 32 may have a configuration that corresponds to portion 21 of tongue 20. For example, second slot 32 may have a width greater than or equal to a width of portion 21 but less than a width of portion 23 and a height greater than or equal to a thickness of first leg 6.

Figure 4:
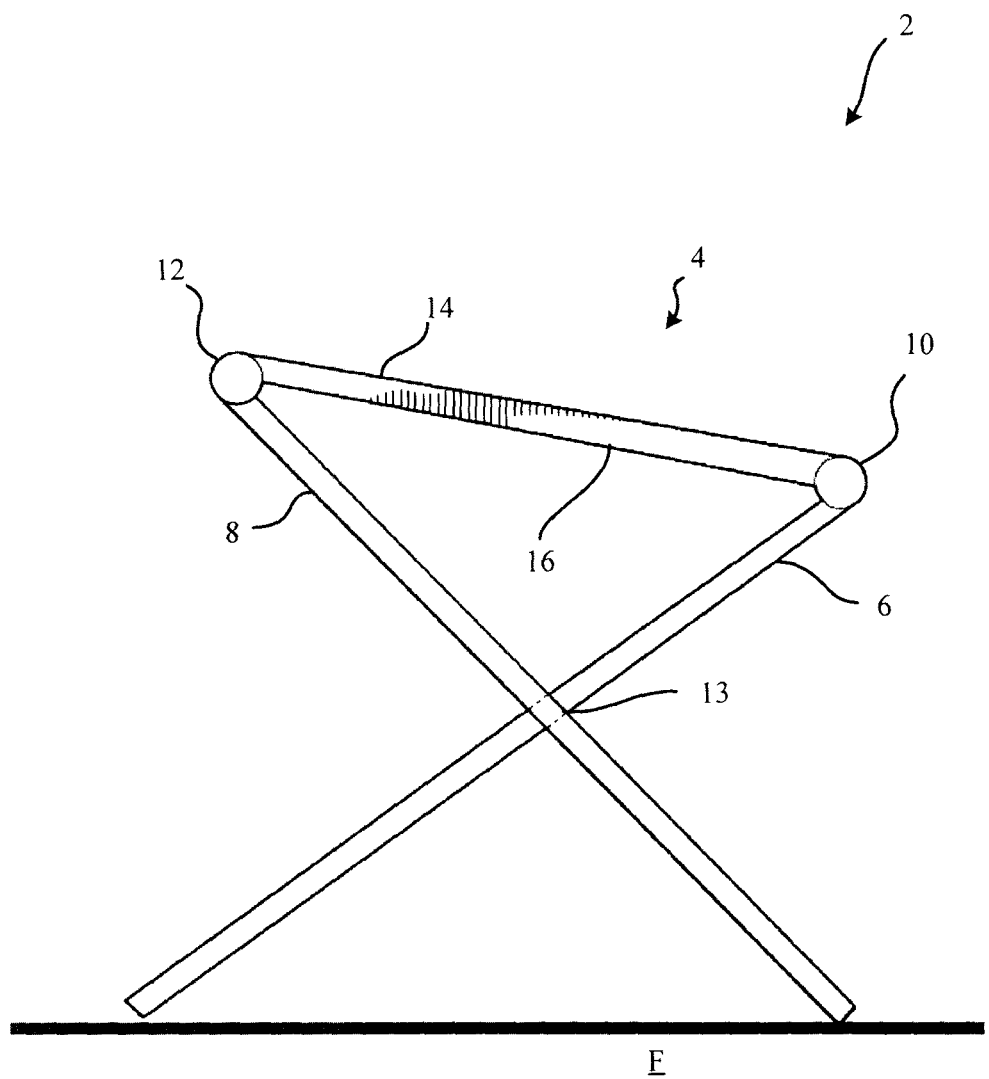
FIG. 4 shows the exemplary furniture unit of FIG. 1 in a second configuration according to some embodiments.

As can be appreciated, the first leg 6 may engage second leg 8 in a number of ways. For example, the tongue 20 and step portion 24 of first leg 6 may be rotated within recessed side 28 to form joint 13 between the first leg 6 and the second leg 8. Alternatively, the tongue 20 and step portion 24 may be rotated and slid within slot 30 to form joint 13 between first leg 6 and the second leg 8. It yet another alternative, the tongue 20 may be rotated and slide within slot 32 to form joint 13 between first leg 6 and second leg 8. The multitude of engagement options provides for a modular furniture unit 2 where the height and/or angle of the first furniture piece 4 may be varied. For example, FIG. 4 shows the exemplary stool, workstation, chair, or table of FIG. 1 in a second configuration where joint 13 is formed in an alternative location. In the second configuration, the first major surface 14 may be slanted relative to floor F.

In further embodiments, the first leg 6 and the second leg 8 may be rotated to the other side of furniture piece 4 and engaged with one another such that the furniture user may utilize second major surface 16 and may use second major surface 16 at various heights and/or angles. Accordingly, depending on the configuration of the ladder slots and the step tongue, the height and/or the angle of the first furniture piece 4 may be varied.

Additionally, furniture unit 2 may be flattened for easy storage or carrying. For example, First leg 6 and second leg 8 may be disengaged by rotating and sliding the legs 6, 8 away from each other. Thereafter, the legs 6, 8 may be positioned along the same plane as furniture piece 4 for easy storage of furniture unit 2. In some embodiments, one leg 6, 8 may be rotated adjacent the first major surface 14 or the second major surface 16 of furniture piece 4 while the other leg 6, 8 is positioned along the same plane as furniture piece 4. Alternatively, the other leg 6, 8, may be rotated adjacent the first major surface or the second major surface 16 of furniture piece 4 to provide a compact folded configuration.

While first leg 6 and second leg 8 are generally illustrated as symmetrical about their respective vertical midlines, it should be understood that many alternative embodiments are possible. For example, while first leg 6 is illustrated with a single tongue 20, other embodiments may utilize two, three, four, or more tongues 20. Additionally, tongue 20 may include additional step portions that correspond to additional slots in a corresponding second leg 8. Similarly, second leg 8 may be configured without a recessed side 28. For example, alternative embodiments may only include slot engagement features. Further, while illustrated with two slots 30, 32, it should be understood that embodiments may have one, three, four, five or more slots. Accordingly, the illustrated embodiment is provided by way of example only and is non-limiting.

Figure 5:
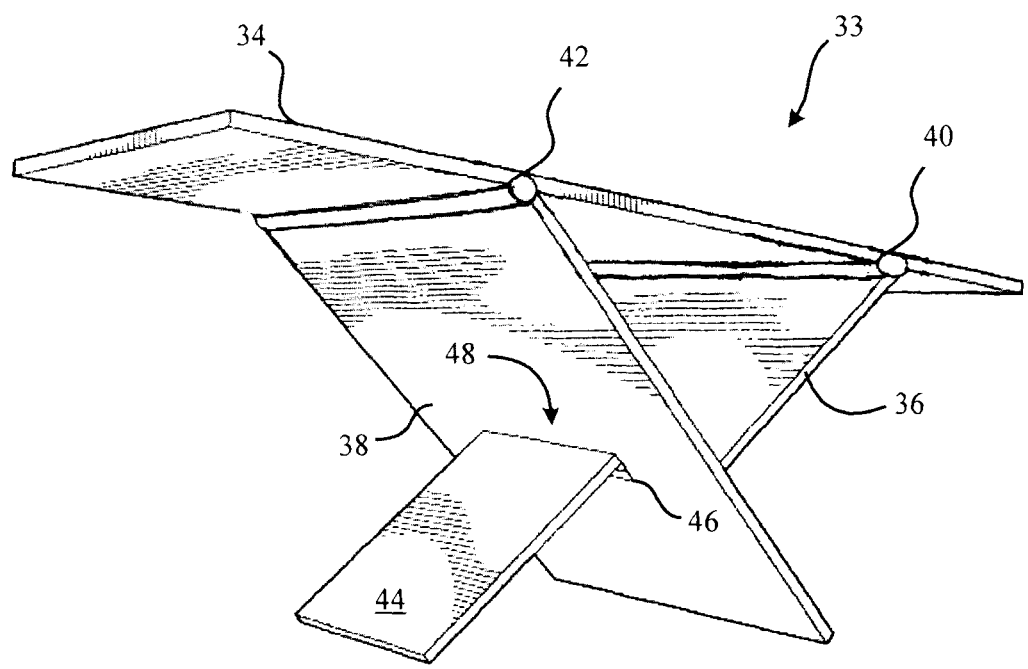
FIG. 5 shows a view of an exemplary furniture unit according to some embodiments.
Figure 6:
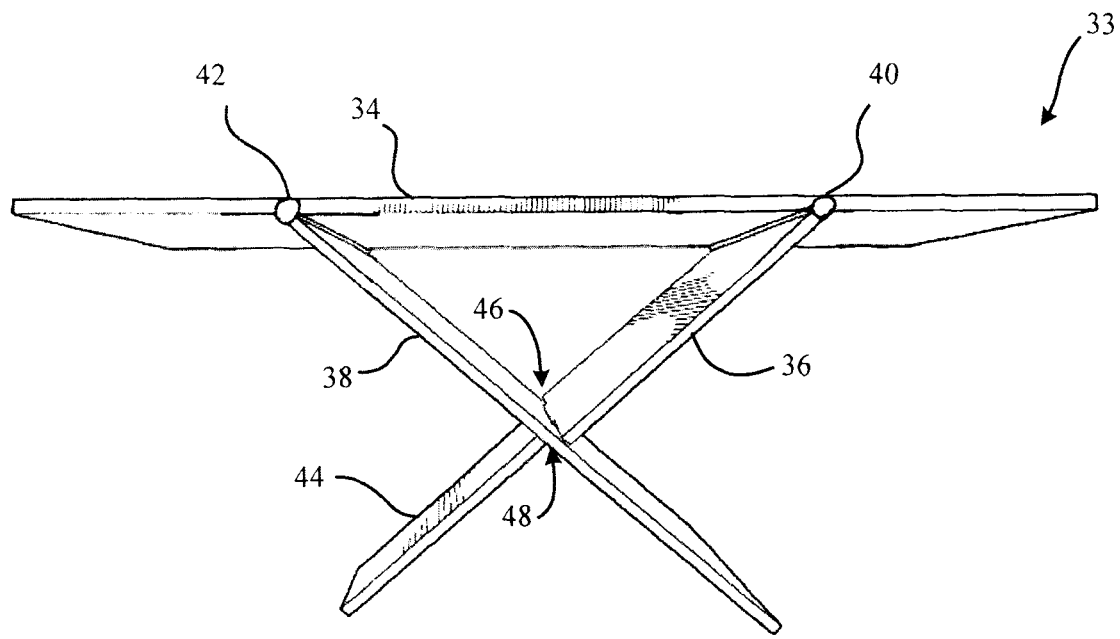
FIG. 6 shows a side view of the exemplary furniture unit of FIG. 5.

FIG. 5 and FIG. 6 shows views of another exemplary furniture unit 33. Furniture unit 33 may be table, workstation, or the like according to some embodiment. Furniture unit 33 may have a top furniture piece 34 coupled with a first leg 36 and a second leg 38. First leg 36 may couple with top furniture piece 34 via hinge 40 and second leg 38 may couple with top furniture piece 34 via hinge 42.

First leg 36 includes a tongue 44 that may be rotated within and engaged with slot 46 of second leg 38 to form a joint 48. When joint 48 is formed, furniture unit 33 may provide a stable and steady surface for supporting weight.

When the furniture unit 33 is not in use, a user may reconfigure unit 33 to a folded or flat configuration where the first leg 36 and the second leg 38 are folded flat against top furniture piece 34. This may provide easy storage and/or stacking of multiple furniture units 33. Similar to the furniture unit 2 described above, the legs 36, 38 may be configured to provide several alternative engaged positions to vary the height and/or angle of the tope furniture piece 34.

Figure 7:
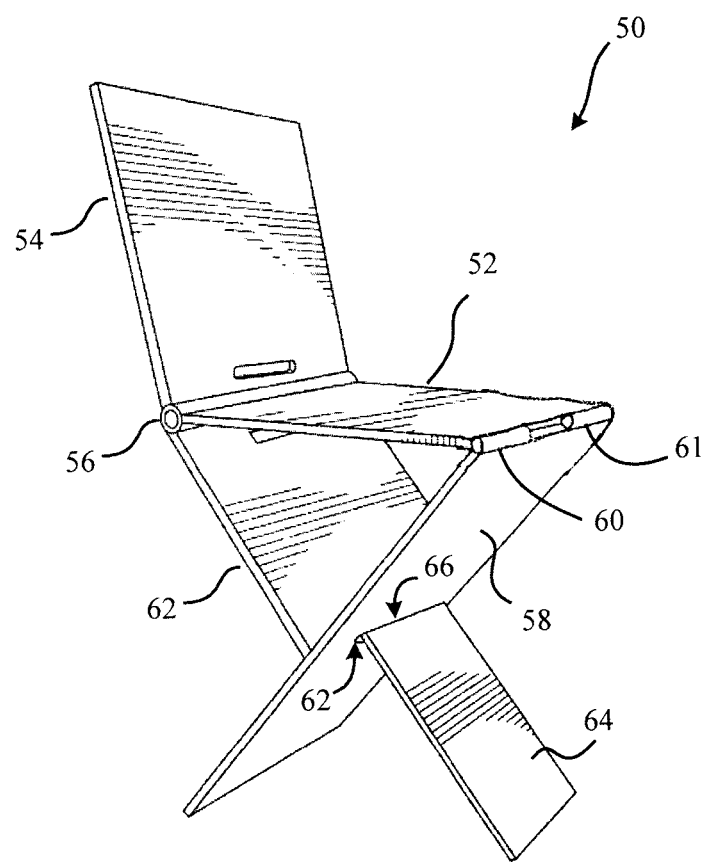
FIG. 7 illustrates an exemplary folding chair according to some embodiments.

FIG. 7 illustrates an exemplary folding chair 50 according to some embodiments. Chair 50 may be reconfigurable between a deployed configuration and a folded configuration. Chair 50 may include a seat base 52 coupled with a seat back 54 by hinge 56. The chair 50 may further include a first leg 58 (e.g., front leg) coupled with the seat base 52 by hinges 60, 61. Further, a second leg 62 (e.g., back leg) may couple with the seat base 52 and the seat back 54 by hinge 56.

First leg 58 may include a slot 62 that is configured to receive and engage a tongue 64 of second leg 52 to form a joint 66. The chair 50 may be in the deployed position when joint 66 is formed, and may thereby provide a stable and sturdy seat base 52 for use by a user. While illustrated with a single slot that corresponds with a tongue portion, other embodiments may include a plurality of slots and/or a recessed surface similar to embodiments described above to provide a variety of deployed configurations. Additionally, the tongue may include one or more portions defined by step changes in width so that the portions may preferentially engage with one or more slots and/or a recessed surface on the corresponding leg.

Figure 8:
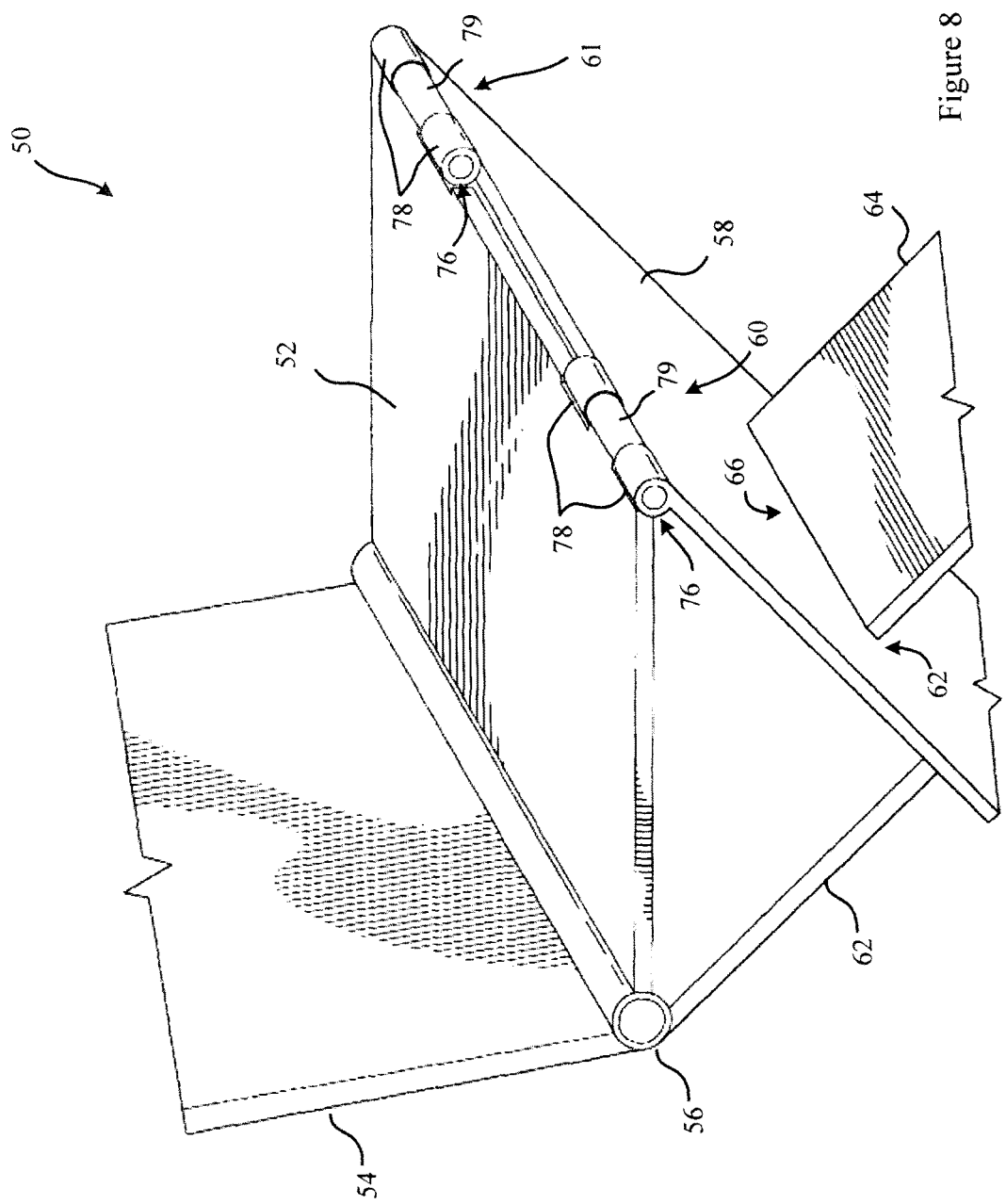
FIG. 8 illustrates a close up view of an exemplary chair hinge when the chair is in the deployed configuration.

FIG. 8 illustrates a close up view of exemplary chair hinges 56, 60, 61 when the chair 50 is in the deployed configuration. Hinge 56 couples the seat base 52, the seat back 54, second leg 62. Hinge 60, 61 couple the seat base 52 and the first leg 58. The hinge 56 allows the seat back 54 to fold down onto seat base 52 when not in use. The hinge 56 also allows the second leg 62 to fold against the bottom surface of seat 52 when chair 50 is not in use. First leg 58 may also rotate about hinges 60, 61 to a folded/closed position parallel and/or in line with seat base 52. The break between hinge 60 and hinge 61 allows the second leg 62 to fold flat against the seat base 52 and first leg 58 when in a folded configuration. For example, the break between hinges 60, 61 may be a width that accommodates a width of the tongue 64 of second leg 62.

Figure 9:
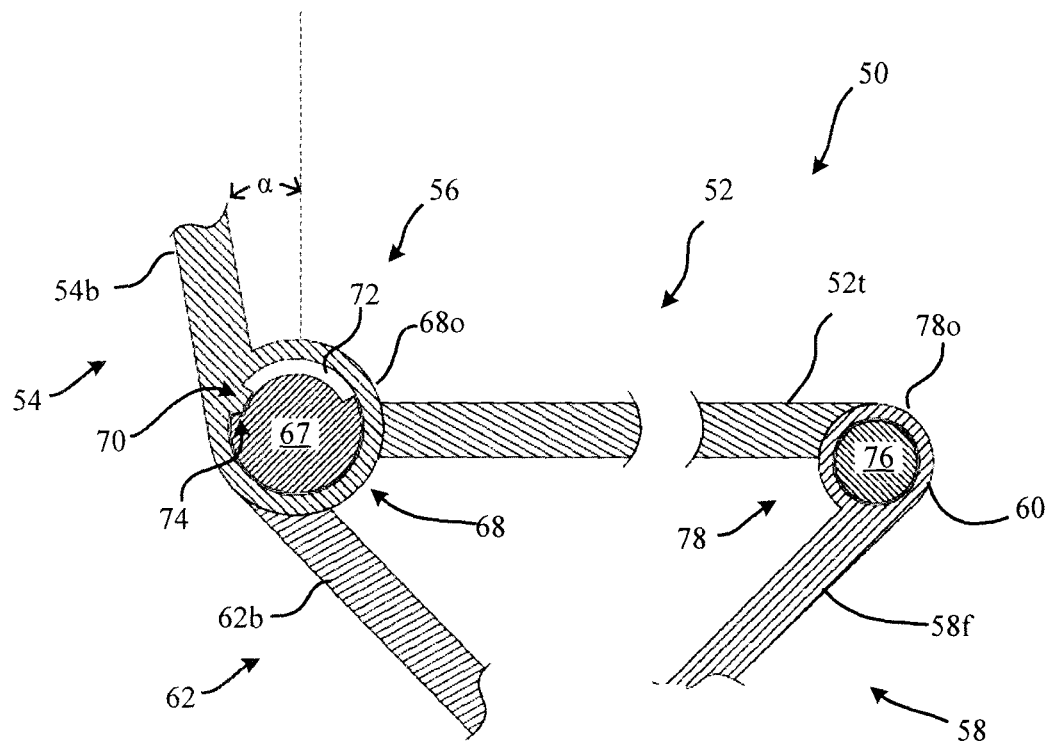
FIG. 9 illustrates a cross-sectional view of the chair when the chair is in the deployed configuration.

FIG. 9 illustrates a cross-sectional view of the chair 50 when the chair 50 is in the deployed configuration. As can be seen in FIG. 9, seat back 54 may couple to a central lock cylinder 67 via collar 68. In some embodiments, a back surface 54*b* of seat back 54 may be tangential to an outer surface 68*o* of collar 68 to provide seamless transition between the back surface 54*b* of seat back 54 and the collar 68. Collar 68 may further include a protrusion 70 (e.g., "stud" or "pin" used interchangeable throughout and should be interpreted with the same scope) that protrudes inwardly from the collar 68 and into a recessed channel 72 of the central lock cylinder 67. The engagement of the protrusion 70 with an end 74 of the channel 72 may allow the seat back 54 to be supported at a desired recline angle α when the chair 50 is in the deployed position. Further, the second leg 62 may also couple to central lock cylinder 67 via a collar 69 (see FIG. 11). The back surface of 62*b* of second leg 62 may be tangential to an outer surface of the collar 69 to provide a seamless transition between the back surface 62*b* of second leg 62 and the outer surface of the collar 69. Additional details of hinge 56 are discussed further below.

Hinge 60 and 61 may have similar configurations where the seat base 52 and/or the first leg 58 couple to a central lock cylinder 76 via one or more hinge collars 78, 79. First leg 58 may include a front surface 58*f* that may be tangential to an outer surface 78*o* of collar 78 to provide a seamless transition between the front surface 58*f* of leg 58 and the collar 78. Further a top surface 52*t* of seat base 52 may be tangential to an outer surface of a collar 79 (FIG. 8) that couples the seat base 52 to the central lock cylinder 76 to provide a seamless transition between the top surface 52*t* of seat base 52 and the collar.

Further, in some embodiments, seat back 54 and seat base 52 may have similar dimensions (e.g., length, width) such that seat back 54 may be folded down on seat base 52 about hinge 56 when the chair 50 is in the deployed configuration. In this configuration, the chair 50 may be in a stool configuration where a user may sit on the back surface 54*b* of seat back 54.

Figure 10:
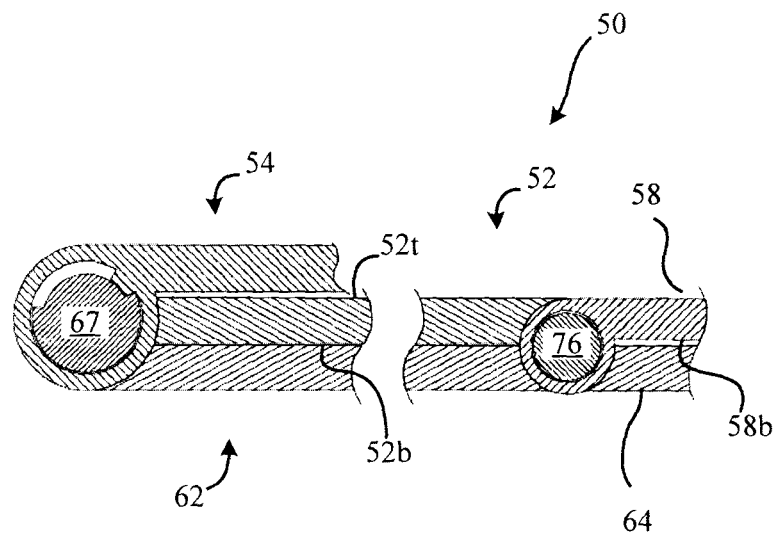
FIG. 10 illustrates a cross-sectional view of a chair when the legs and seat back are repositioned to an exemplary folded configuration.

When not in use, the first leg 58 may be disengaged with the second leg 60 and the legs 58, 62 and seat back 54 may be repositioned in line, parallel, and/or adjacent to the seat base 52 to reconfigure the seat 50 to a folded configuration. FIG. 10 illustrates a cross-sectional view of the chair 50 when the legs 58, 62 and seat back 54 are repositioned to an exemplary folded configuration. Seat back 54 may be rotated forward and positioned along a top surface 52*t* of seat base 52. First leg 58 may be folded forward such that the first leg 58 is parallel and/or coplanar or otherwise in line with seat base 52. The second leg 62 may rotated forward and positioned along a bottom surface 52*b* of seat base 52. Further a portion of second leg 62 (e.g., a tongue portion 64) may be positioned between hinges 60, 61 and along a back surface 58*b* of first leg 58. In some embodiments, hinge 56 may have a diameter substantially equal to a combined thickness of the seat base 52, the seat back 54, second leg 62. In some embodiments, hinge 60, 61 may have a diameter substantially equal to a combined thickness of first leg 58 and second leg 62. In some embodiments, hinge 60, 61 is smaller in diameter to hinge 56. In some embodiments, hinge 60, 61 protrude below the level of the seat base 52 a distance equal with the hinge 56, thus maintaining the folding symmetry of the first and second legs 58, 62.

Accordingly, in some embodiments, when the chair 50 is in a folded configuration, the hinges 56, 60, and 61 and the thicknesses of the seat base 52, seat back 54, and legs 58, 62 may be configured so that the hinges 56, 60, and 61 do not protrude outwardly from the chair 50 when in the folded configuration.

Figure 11:
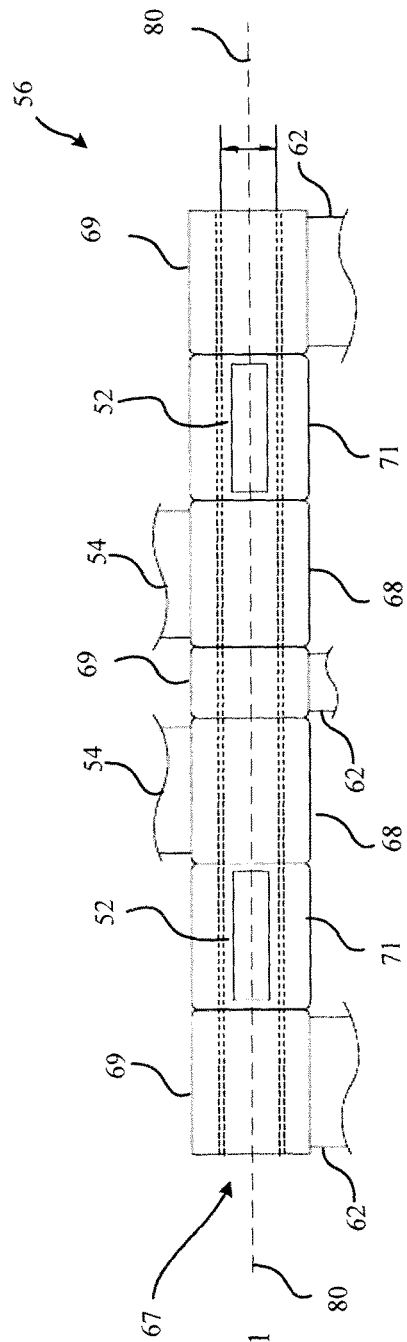
FIG. 11 illustrates a top view of an exemplary hinge.
Figure 12:
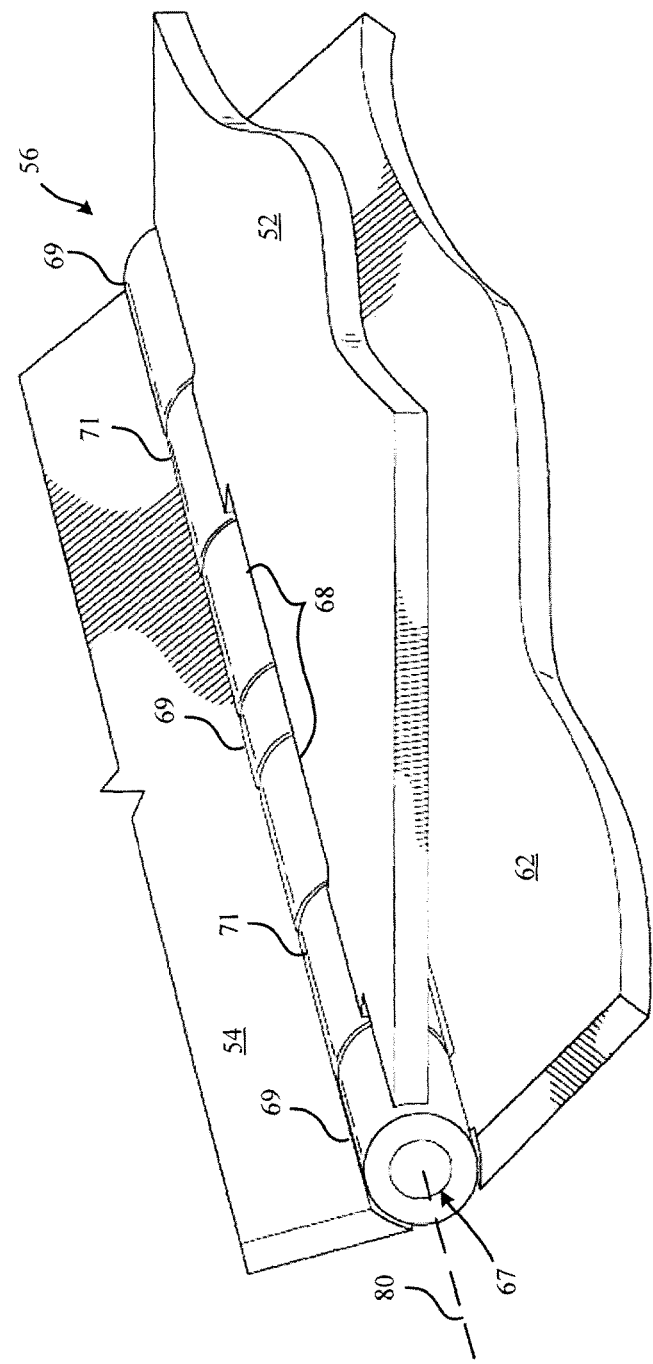
FIG. 12 illustrates further details of the exemplary hinge of FIG. 11.

FIG. 11 and FIG. 12 illustrate further details of hinge 56. As illustrated central lock cylinder 67 may have an elongate body that defines a hinge axis 80 about which the coupled furniture pieces rotate. Central lock cylinder 67 be positioned within a plurality of collars and the plurality of collars may couple to the seat base 52, seat back 54, and the back leg 62. The plurality of collars may also have a similar thickness and be adjacent one another to provide a uniform outward appearance. In the illustrated embodiment, the back leg 62 couples to the central lock cylinder 67 via three collars 69. Two collars 69 may be positioned on the ends of hinge 56 and a third collar 69 may be positioned at a center of hinge 56. The seat base 52 may couple to the central lock cylinder 67 via two collars 71. The two collars 71 may be positioned adjacent the edge collars 69 and inwardly therefrom. The seat back 54 may be coupled to the central lock cylinder via two collars 68. Each of the collars 68 may be positioned between one of the collars 71 and the central collar 69.

While the central lock cylinder is illustrated as solid, in other embodiments, the central lock cylinder may be a tube. Further, it should be understood that any number of collars may be used to couple the seat base 52, seat back 54, and leg 62 with central lock cylinder 67 (e.g., one, two, three, four, or more collars). Further, in many embodiments, the order and/or position of the collars along the length of the central lock cylinder 67 may differ. Accordingly, the illustrated array of collars and order/position of collars is exemplary and non-limiting.

In some embodiments, a set of collars (e.g., collars 68, collars 69, or collars 71) may be integral with central lock cylinder 67. For example, the seat base 52 may be fixed to collars 71, however collars 71 may be integrally formed with central lock cylinder 67. In such an embodiment, the integral collars (e.g., collars 71) do not rotate about central lock cylinder 67, while the remaining collars may be configured to rotate about central lock cylinder 67. Advantageously, a fixed/integral set of collars may hold the remaining rotating collars in position along the length of the hinge (e.g., hinge 56). In some embodiments, in order to have a set of collars fixed to the central lock cylinder 67, and the remaining collars held in place along the length of central lock cylinder 67, the chair 50 may be manufactured by additive or three-dimensional printing.

In many embodiments, the hinges (e.g., hinge 56) may be configured to be lockable (e.g., locked and unlocked) to selectively restrict a rotational range of motion between one or more collars, flats, or furniture pieces (e.g., seat back, seat base, legs) relative to the hinge and/or another collar, flat, or furniture piece. In some embodiments, the collars/flats may be locked open (i.e., one or more deployed positions) and/or locked closed (e.g., a folded/flat position). In some embodiments, the central lock cylinder (e.g., central lock cylinder 67) may be translated along the hinge axis (e.g., hinge axis 80) to lock the rotating collars in position by securing a corresponding protrusion (e.g., studs) in a secondary channel (e.g., locking channel). Advantageously, the locking mechanisms (e.g., locking channels, studs, etc.) may all be contained and concealed internally within the hinge 56 and may even be an intrinsic part of the hinge.

Figure 13:
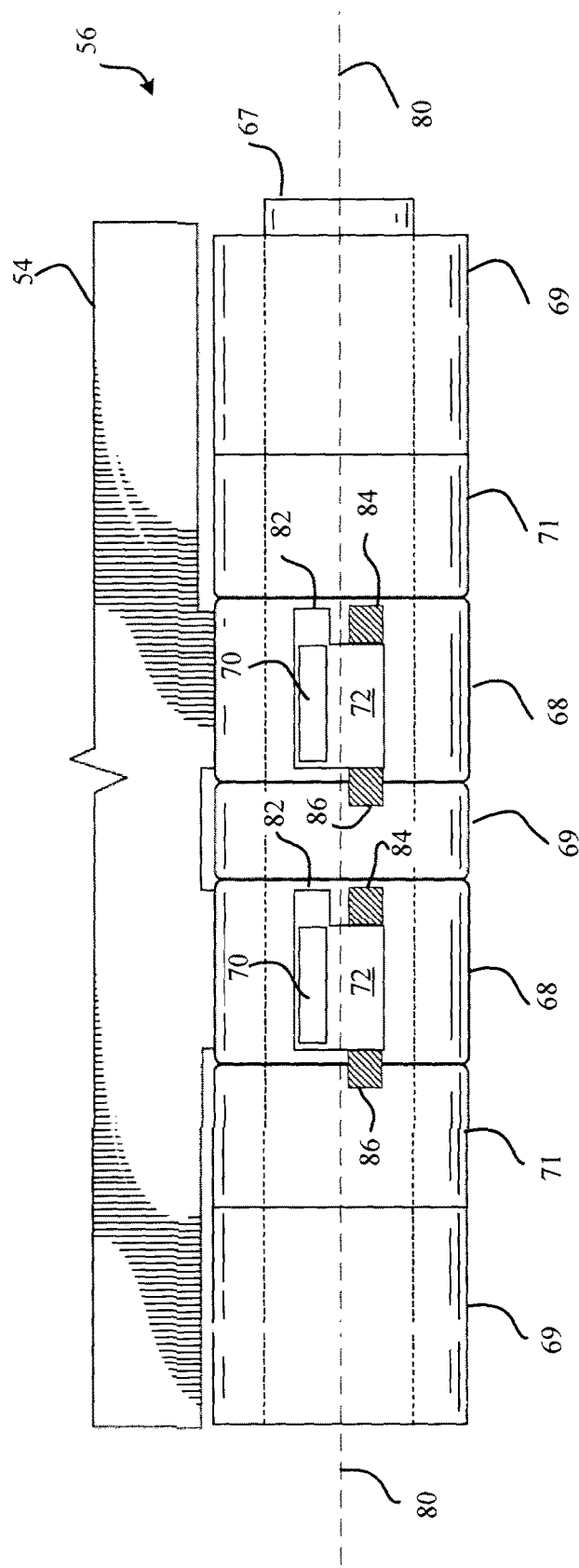
FIG. 13 illustrates the internal workings of an exemplary lockable hinge shown in FIG. 11.
Figure 14:
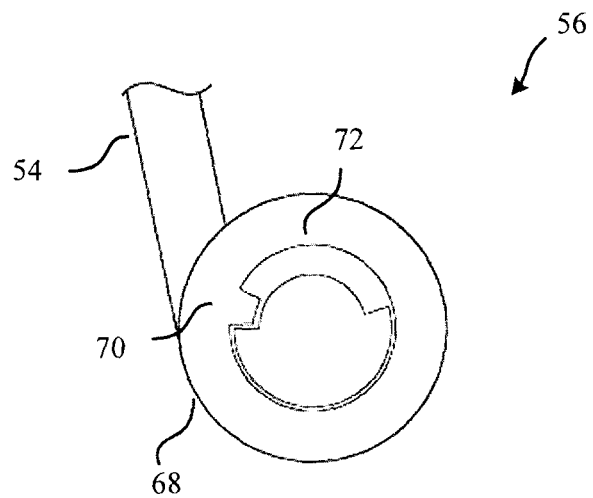
FIG. 14 illustrates a cross-sectional view along the hinge of FIG. 11.
Figure 15:
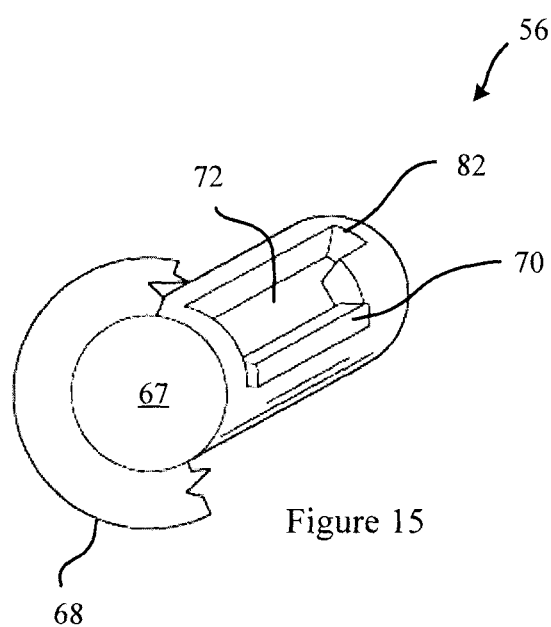
FIG. 15 illustrates the internal workings of exemplary lockable hinge of FIG. 11.

FIG. 13, FIG. 14, and FIG. 15 illustrate the internal workings of exemplary lockable hinge 56. In the embodiment shown, lockable hinge 56 may be configured to lock a seat back 54 (and corresponding collars 68) in a deployed position relative to the hinge cylinder. As illustrated, central lock cylinder 67 may include a recessed surface defining one or more rotate channels 72 that are transverse to the hinge axis 80. Furthermore, central lock cylinder 67 may include a recessed surface defining one or more locking channels 82 that extend from the rotate channels 72 in an axial direction. Collars 68 may each include a stud 70 that projects inwardly from the respective collar 68 into a corresponding rotate channel 72.

In many embodiments the stud 70 has an axial dimension that closely corresponds with an axial dimension of the respective rotate channel 72. In such embodiments, the stud 70 may cooperate with the walls of the rotate channel 72 to restrict axial movement between the collar 68 (and seat back 54) and the central lock cylinder 67. Further, in many embodiments, the stud 70 has an dimension transverse to the axial direction (e.g., angular dimension) that is less than the dimension of the rotate channel 72 that is transverse to the axial direction (e.g., an angular dimension of the rotate channel 72). Accordingly, when a stud 70 is fully positioned in a corresponding rotate channel 72 (i.e., not within the locking channel 82), collars 68 may have a rotational range of motion about central lock cylinder 67 and may be restricted in the axial direction. The rotational range of motion about central lock cylinder 67 may be defined/limited by an angular length of the rotate channel 72. Accordingly, in many embodiments a rotate channel 67 and a corresponding stud 70 may be may be configured to define a rotational degree of freedom and/or an axial degree of freedom of the collar 68 and seat back 54 about and along the central lock cylinder 67.

The locking channels 82 may be configured with an angular dimension that is less than an angular dimension of the rotate channel 72 and may otherwise closely correspond with the angular dimension of a stud 70. When the stud 70 is rotationally aligned with a locking channel 82, the central lock cylinder 67 may be moved in the axial direction to position at least a portion of the stud 70 within the locking channel 82. When at least a portion of the stud 70 is positioned within the locking channel 82, a rotational range of motion of the stud 70, collar 68, and seat back 54 may be reduced compared to a rotational range of motion of the stud 70, collar 68, and seat back 54 when the stud 70 is fully positioned in the rotate channel 72 (i.e., not within the locking channel 82). In many embodiments, when at least a portion of the stud 70 is positioned in the locking channel 82 the corresponding collar 68 and seat back 54 are rotationally locked relative to the central lock cylinder 67 and may be rotationally locked relative to another collar and flat of the hinge mechanism. In the illustrated embodiment, flat (seat back) 54 may be locked in an open or deployed position when at least a portion of the studs 70 are positioned in locking channels 82. Advantageously, the exemplary locking hinge 56 may lock seat back 54 in the deployed position to prevent the seat back 54 from inadvertently rotating back to a closed or folded position along seat base 52.

In some embodiments, rotate channels 72 may include one or more second locking channels 84, 86 extending therefrom in the axial direction that are angularly spaced apart from locking channels 82. The shaded locking channels 84, 86 show optional locations for a second locking channel 84, 86. In some embodiments, one or more second locking channels 84, 86 are positioned at an opposite end of the rotate channel 72 from the locking channel 82. Such a configuration may allow the hinge 56 to lock or otherwise reduce a rotational range of motion of the corresponding stud 70, collar 68, and seat back 54 relative to the central lock cylinder 67 at the other rotational range limit of the stud 70, collar 68, and seat back 54 when the stud 70 is positioned fully within the rotate channel 72. Further, in some embodiments, the locking channels 84 may extend from the rotate channel 72 in an axial direction similar to the first locking channel 82. In such embodiments, the collar 68 and seat back 54 may be locked in a second position (e.g., a closed configuration or other intermediate configuration) by rotationally aligning the stud 70 with the second locking channel 84 and translating the central lock cylinder 67 in the axial direction. With this configuration, the central lock cylinder 67 may be translated in the same direction for locking the seat back 54 in the deployed configuration and the closed configuration. Additionally or alternatively, a second locking channel 86 may be provided where the central lock cylinder 67 locks the collar 68 and seat back 54 in the closed configuration by moving in an axial direction opposite from the axial direction for locking the collar 68 and seat back 54 in the deployed position.

While the locking channels 82 (and potential locking channels 84) are illustrated with a configuration that only receives a portion of studs 70, it should be understood that, the locking channels 82, 84 may be configured with an axial length that accommodates the entire axial length of stud 70. Such a configuration may be beneficial for spreading loads between the collar studs 70 and the central lock cylinder 67.

Further, while the illustrated embodiment is shown with both collars 71 each with a stud 70 projecting inwardly into a rotate channel 72 of central lock cylinder 67, it should be understood that in some embodiments, only one of collars 71 may include the stud 70 projecting inwardly into the rotate channel 72 of central lock cylinder 67 (rotate channel 72 may also be configured with a single rotate channel 72 to correspond with the single stud 70).

Furthermore, optionally, collars 71 may include a plurality of studs 70 for each collar 71 that protrude into one or more rotate channels 72 of central lock cylinder 67. For example, one or more collar of hinge 56 may have a first stud 70 projecting inwardly into a first rotate channel 72 of the central lock cylinder 67 and a second stud 70 projecting inwardly from an opposite side of first stud 70 (e.g., 180 degrees from first stud 70) and into a second rotate channel 72 of the central lock cylinder 67. The first and second rotate channels 72 and first and second studs 70 may have similar configurations that provide a desired rotational range of motion of the collar about the central lock cylinder 67. In some embodiments, such a configuration may be advantageous to spread loads among two or more studs 70 per collar.

Also, while the illustrated embodiment is shown with only one set of collars (i.e., collars 68) including a stud 70 projecting into a rotate channel 72 of central lock cylinder 67, it should be understood that in other embodiments, other collars of hinge 56 (e.g., collars 69, 71) may be configured in a similar way and the central lock cylinder 67 may include corresponding rotate channels 72 and/or locking channels 82, 84, 86 as desired. Further, rotate channels corresponding to different sets of collars may be configured with different angular lengths. Accordingly, in some embodiments of the hinge mechanism, different collars may have different rotational ranges of motion about the central lock cylinder 67. Moreover, the rotate channels may be at different rotational angles relative to one another to provide various rotate angles specific to the collars and the attached components (e.g., furniture pieces, seat base, seat back, legs, etc.).

As discussed above, in some embodiments all or some of the collars may have studs that protrude into a corresponding rotate and/or locking channels of a hinge cylinder. The rotate channels may provide a desired rotational range of motion of the collar about the central lock cylinder 67. The locking channels that extend from the rotate channels may allow the collars to be locked in one or more rotational positions (e.g., open/deployed configuration, closed/flat configuration, and/or one or more intermediate positions between open/deployed and closed/flat configurations) the relative to the central lock cylinder 67 and/or other collars and furniture pieces. Further the locking and unlocking of the hinge (e.g., hinge 56) may be performed by pushing/pulling the central lock cylinder 67 in the axial direction. For example, in some embodiments, the central lock cylinder 67 may have an end that is accessible from an end of the hinge 56. The central lock cylinder 67 may then be pushed or otherwise actuated from the end to lock the hinge 56 in a deployed, closed, or intermediate configuration and a portion of central lock cylinder 67 may protrude out the opposite end of hinge 56. To unlock the hinge from the deployed, closed, or intermediate configuration, the protruding end of central lock cylinder 67 may be pushed or otherwise actuated in the opposite direction to unlock the hinge mechanism 56.

FIG. 16 and FIG. 17 illustrate an exemplary hinge or hinge portion 88. Hinge or hinge portion 88 may include a central lock cylinder 90 and a collar 92 positioned about central lock cylinder 90. The collar 92 includes a stud 94 that projects inwardly into a rotate channel 96 and locking channel 98 of the central lock cylinder. The rotate channel 96 extends transverse to the hinge axis 100 and locking channel 98 extends from the rotate channel 96 in the axial direction. The rotate channel 96 has an angular dimension greater than an angular dimension of the stud 94. Further in some embodiments, the rotate channel 96 has an axial dimension that closely corresponds to the axial dimension of stud 94. The locking channel has a smaller angular dimension than the rotate channel 96 and may be configured to substantially fit the angular dimension of the stud 94.

FIG. 16 illustrates the exemplary hinge or hinge portion 88 in a rotate configuration where the collar 92 is free to rotate about the central lock cylinder 90 within its rotational range of motion and FIG. 17 illustrates the exemplary hinge or hinge portion 88 in a lock configuration. As illustrated in FIG. 16, in some embodiments when the hinge is in the rotate configuration, the central lock cylinder 90 may have an end 102 that protrudes past an end 106 of collar 92 and may also have an end 104 that is pushed or withdrawn within collar 92. In some embodiments, end 102 may be beveled or rounded to avoid sharp edges when the end 102 protrudes from collar 92.

To transition the hinge 88 to the lock position, the stud 95 may be rotationally aligned with the locking channel 98 and the central lock cylinder 90 may be pushed from end 102 or otherwise actuated to position a stud 94 within locking channel 98. As illustrated in FIG. 17, in some embodiments when the hinge 88 is in the locked configuration, the central lock cylinder 90 may have ends 102, 104 that are generally even or flush with ends 106, 108 of collar 92. A locking configuration with the central lock cylinder 90 positioned so that it does not protrude from collar 92 may be beneficial in reducing the chance of inadvertent actuation of the central lock cylinder 90 that may inadvertently transition the hinge mechanism 88 from a locked position to an open position. It should be understood that some exemplary embodiments may utilize only a rotate channel if locking is not desired or needed.

FIG. 18 and FIG. 19 illustrate a number of other exemplary collar, stud, and central lock cylinder designs. FIG. 18 shows an exemplary hinge 110. Hinge 110 includes a collar 112 positioned about a central lock cylinder 114. The collar 112 includes a stud 116 that protrudes inwardly into a rotate channel 118 and locking channels 120, 122. The rotate channel 118 may extend transverse to the hinge axis 119 and locking channels 120, 122 may extend from the rotate channel 118 in the axial direction (in the same or opposite directions). The rotate channel 118 may have an angular dimension greater than an angular dimension of the stud 116. Further in some embodiments, the rotate channel 118 may have an axial dimension that closely corresponds to the axial dimension of stud 116 to substantially restrict axial movement between the central lock cylinder 114 and the collar 112 when the stud 116 is not adjacent to a locking channel 120, 122. The locking channels 120, 122 may have a smaller angular dimension than the rotate channel 118 and may be configured to substantially fit the angular dimension of the stud 116. The locking channel 120 may extend in the axial direction at a first end of rotate channel 118 and the locking channel 122 may extend in the axial direction at a second end of the rotate channel 118 that is angularly spaced from and opposite from the first end of the rotate channel 118. Locking channel 120 may correspond to a locked deployed configuration when stud 116 is positioned therein. Locking channel 122 may correspond to a locked closed configuration when stud 116 is positioned therein.

FIG. 19 illustrates a similar embodiment where a third locking channel 124 extends from the rotate channel 118 in the axial direction. The third locking channel 124 may provide an intermediate locking configuration between the fully deployed configuration corresponding to locking channel 120 and the fully closed configuration corresponding to locking channel 122.

While FIG. 18 and FIG. 19 illustrate locking channels 120, 122, 124 extending from the rotate channel 118 in the same direction, it should be understood that one or more of the locking channels 120, 122, 124 may extend in opposite axial directions from one or more of the other locking channels 120, 122, 124 according to some embodiments. Additionally, while embodiments may include more or fewer locking channels as desired (e.g., none, one, two, three, four, five or more).

While many embodiments disclosed herein are generally related to foldable furniture, other embodiments may be related to embodiments of the hinge mechanism disclosed herein. Many embodiments of the hinge mechanism may be used in many different applications outside of foldable furniture where the benefits of such hinges are desired. Accordingly, the hinge collars may be coupled with any type of attachments, and may be constructed from a wide range of materials or combination of materials.

There may be any number of collars on a cylinder. Some collars may be freely rotate about the cylinder and some collars may have limited rotational motion about the cylinder. Some collars may be lockable in one or more positions. Further, the one or more collars may have different or similar angles of rotation about the hinge cylinder. The ability to lock and unlock an array of collars may depend on having the locking channels aligned for each when the cylinder is pushed along the axial direction. Non-locking collar(s) may be part of an array and may similarly be secured on the cylinder by use of a pin fixed to the collar moving in a single rotate channel on the cylinder but having no locking channel. Instead, it may have an extra floating space/width on the rotate-channel to accommodate the cylinder axial translation—thus leaving the collar free to rotate even when the cylinder moves sideways to lock the other collars. The size of each part and the relative proportions between the parts are also variable. In some aspects, it is possible to gang/join together a length of different arrays of collars/cylinder with each array having their own arrangement of locking or non-locking channels activated by the sideways (axial) movement of the hinge cylinder within the array of collars.

In some embodiments, the studs may form an intrinsic part of the collar (integral therewith). In some embodiments, to provide such a configuration, the hinge may be manufactured by additive manufacturing or three-dimensional printing.

Figure 20:
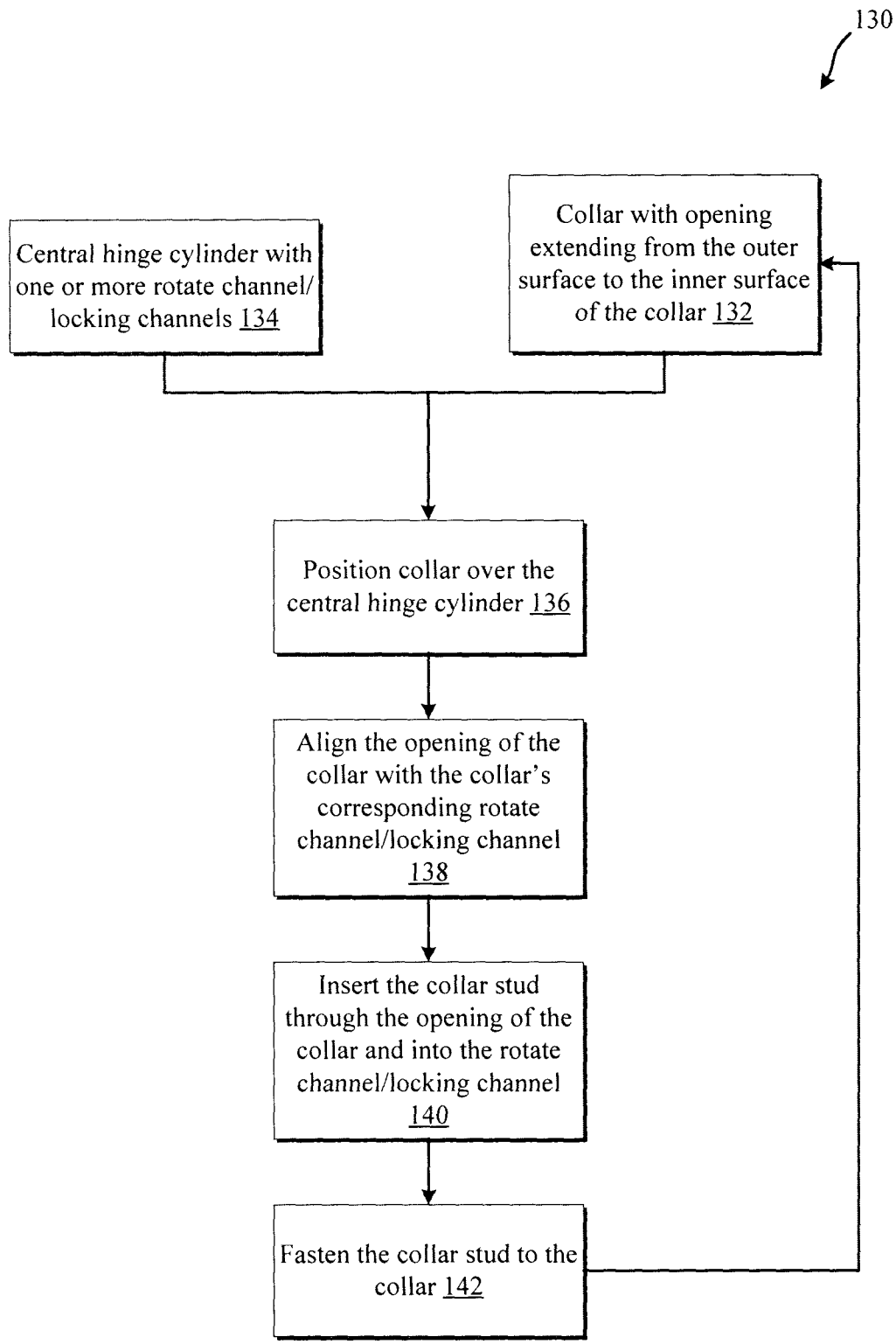
FIG. 20 illustrates an exemplary method of manufacturing a hinge mechanism.

In some aspects of the invention, embodiments of the collar and stud may be separate pieces that are coupled together during manufacturing. FIG. 20 illustrates an exemplary method 130 of manufacturing a hinge mechanism. A collar may be provided 132 that includes an aperture or opening that extends from an outer surface of the collar to an inner surface of the collar. The opening may be configured to receive a stud therethrough. The collar may correspond to a provided central lock cylinder 134 with a rotate and/or locking channel. The collar may be positioned about the central lock cylinder 136. Thereafter, the opening of the collar may be aligned with the collar's corresponding rotate and/or locking channel 138. Once aligned, a collar stud may be inserted through the opening of the collar and into the rotate and/or locking channel of the central lock cylinder 140. The collar stud may then be fastened to the collar 142. The method 130 may continue at step 132 if additional collars are to be added to the hinge mechanism.

Figure 21:
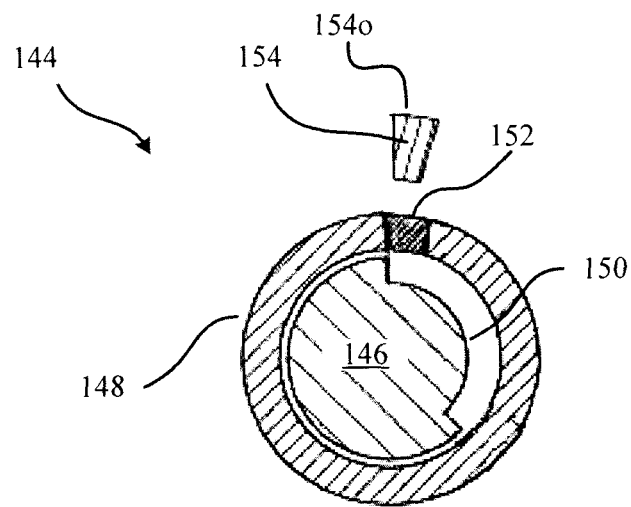
FIG. 21 illustrates an exemplary hinge including a central lock cylinder with a collar having an aperture for receiving a collar stud.

FIG. 21 illustrates an exemplary hinge 144 including a central lock cylinder 146 with a collar 148. The central lock cylinder 146 includes a rotate channel 150 transverse to the central lock cylinder axis. The collar 148 includes an aperture 152 configured to receive a stud 154 therethrough when the aperture 152 is aligned with the rotate channel 150. It should be understood that stud 154 may also be inserted through the aperture 152 when the aperture is aligned with a locking channel (not shown in this cross sectional image).

Stud 154 may have an outer surface 154o that corresponds to a curvature of collar 148. Accordingly, when stud 154 is inserted within aperture 152 and rotate channel 150, outer surface 154o may be substantially uniform with the outer surface of collar 148. Accordingly, after hinge manufacture, hinge 144 may have a uniform outer appearance. In some embodiments the stud 154 may have a round cross-section, an oval cross-section, a rectangular cross-section, a triangular cross-section, or any shape or cross-section configuration. In some embodiments, the stud 154 may be hidden (e.g., integrally formed with the collar), or otherwise revealed.

In some embodiments, the stud 154 (also referred to as a collar pin) may be configured to fittingly mate with aperture 152 (e.g., via engagement features, friction fit, etc.). In some embodiments, the aperture may include engagement features corresponding to engagement features of the stud 154. For example, aperture 152 may include threading engagement features that corresponding to threading engagement features of the stud 154. Accordingly, in some embodiments, a stud 154 may be threaded or otherwise screwed within aperture 152. In some embodiments, the collar stud 154 may be affixed to the collar 148 using other engagement features (e.g., dovetail engagement features), a friction fit design, welding, and/or chemical affixing. Once the stud 154 enters the rotate and/or a lock channel beneath the cylinder and is engaged with or otherwise fixed to the collar, the stud 154 may hold the three components together as the collar(s) cannot slip off the central lock cylinder because of the pin/stud(s) 154. Thereafter, the collar 148 may be constrained to move within the fixed parameters of the rotate channel and/or a lock channel in the central lock cylinder.

Figure 22:
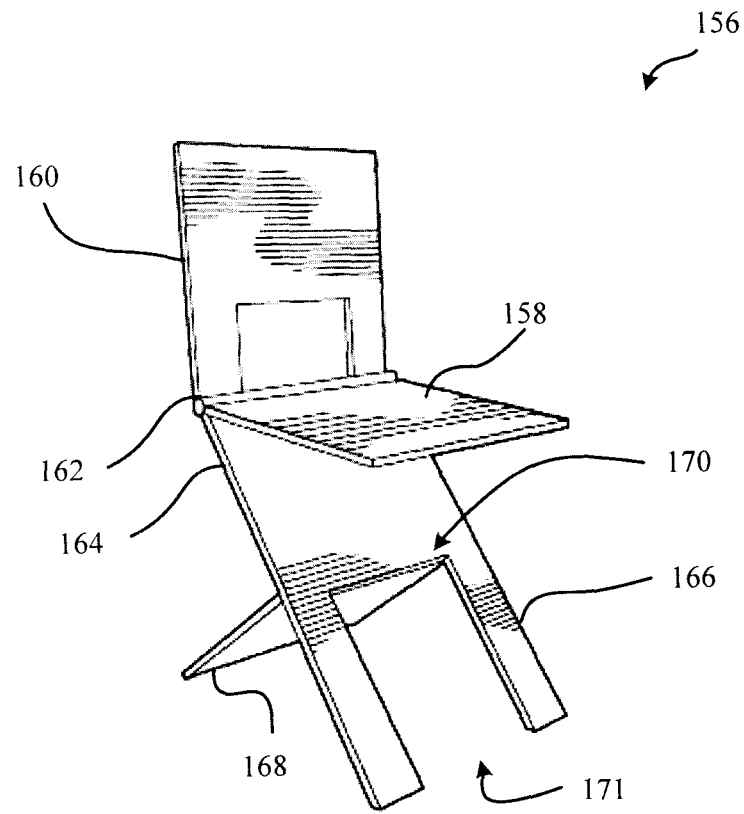
FIG. 22 illustrates an exemplary chair according to some embodiments of the invention.

FIG. 22 illustrates an exemplary chair 156 according to some embodiments of the invention. Exemplary chair 156 may include a seat base 158 coupled with a seat back 160 via hinge 162. A chair leg 164 may also couple with the seat base 158 and the seat back 160 via hinge 162. Chair leg 164 may include a front support section 166 and a back support section 168 that is moveable about a hinge 170 from a flat configuration adjacent front support section 166 to a support configuration that provides chair 156 a support base. Hinge 170 may be configured to limit a rotation of back support section 168 relative to front support section 166 to a rotational range of motion between the flat configuration and the support configuration.

In many embodiments chair 156 may be reconfigurable between a folded configuration and a deployed configuration. In the folded, flat or closed position, seat backrest 154 may fold or rotate about hinge 162 to be along, against, and/or parallel seat base 158; chair leg 164 may also fold or rotate about hinge 162 to be along, against, and/or parallel seat base 158; and back support section 168 of chair leg 164 may be folded to the flat configuration to be along and/or against front support section 166 which may be along, against, and/or parallel seat base 158.

In the deployed configuration, the seat back 160 may fold or rotate about hinge 162 to be at a desired recline angle relative to seat base 158; chair leg 164 may fold or rotate about hinge 162 to a deployed angle relative to seat base 158; and back support section 168 may be moved away from the front support section 166 to the support configuration to provide a support base for chair 156.

In many embodiments, each of seat base 158, the seat back 160, and the chair leg 164 couple with hinge 162 via one or more hinge collars. Hinge 162 may be have a configuration described above (e.g., central lock cylinder with rotate channels and/or locking channels, and collars with inwardly protruding studs) where a central lock cylinder may axially translated relative to the hinge collars to lock the one or more furniture pieces in a desired position (e.g., folded/flat/closed, deployed, and/or one or more intermediate configurations). In some embodiments, one of the furniture pieces (e.g., seat base 158, seat back 160, or chair leg 164) may be integrally formed with the collar and or the central lock cylinder similar to embodiments described above.

Accordingly, in many embodiments, the seat back 160 may couple with a collar and central lock cylinder that are configured to limit a rotational range of motion of the seat back 160 about the central lock cylinder and/or other furniture pieces (e.g., seat base 158). Further, the seat back 160 may couple with a collar and central lock cylinder that are configured to allow the user to selectively lock the seat back 160 in one or more position relative to the central lock cylinder and/or other furniture pieces (e.g., seat base 158). In some embodiments, the seat back 160 may be lockable in the folded configuration were seat back 160 is against and/or parallel the seat base 158, the deployed configuration where the seat back 160 is at the desired recline angle, and/or intermediate configurations where the seat back 160 is at a position between the folded configuration and the intermediate configuration.

In many embodiments, the seat base 158 may couple with a collar and central lock cylinder that are configured to limit a rotational range of motion of the seat back 160 about the central lock cylinder and/or other furniture pieces (e.g., seat back 160, chair leg 162). Further, the seat base 158 may couple with a collar and central lock cylinder that are configured to allow the user to selectively lock the seat base 158 in one or more position relative to the central lock cylinder and/or other furniture pieces (e.g., seat back 160). In some embodiments, the seat base 158 may be lockable in the folded configuration where seat base 158 is against and/or parallel the seat back 160 and/or the deployed configuration where the seat base 158 is in a desired cantilevered angle.

Similarly, in many embodiments, the chair leg 164 may be coupled with a collar and the central lock cylinder that are configured to allow the user to selectively lock the chair leg 164 relative to seat base 158 so that the leg 164 may support the seat base 158. Optionally, the chair leg 164 may be configured to be selectively locked in a folded configuration where the chair leg is against and/or parallel seat base 158. In some embodiments, the hinge mechanism 162 (hinge collars, hinge pins/studs, central lock cylinder, rotate channels, locking channels, etc.) may be configured to lock all three furniture pieces relative to one another in the deployed configuration and/or the folded configuration. Advantageously, a locked folded position may facilitate the moving, transportation, and/or storage of chair 156.

In some embodiments, seat back 160, seat base 158 and chair leg 164 may include corresponding openings that align when the pieces are in the folded configuration. The corresponding openings may provide a handle for convenient gripping by a user for carrying chair 156 in the folded configuration.

Optionally hinge 170 may also be configured according to embodiments disclosed herein for locking back support section 168 relative to front support section 166. In some embodiments back support section 168 may be coupled to a central lock cylinder of hinge 170 via a lockable collar. The back support section 168 may be lockable in the support configuration and/or the flat configuration where the back support section 168 is adjacent and/or parallel to front support section 166. The design of chair leg 164 may be desired as the back support section 168 folds backwardly away from the front support section 166 and creates a central slot 171 in the front support section 166. This central slot 171 may be configured to accommodate a user's feet/legs when the user is sitting on a deployed chair 156.

Figure 23:
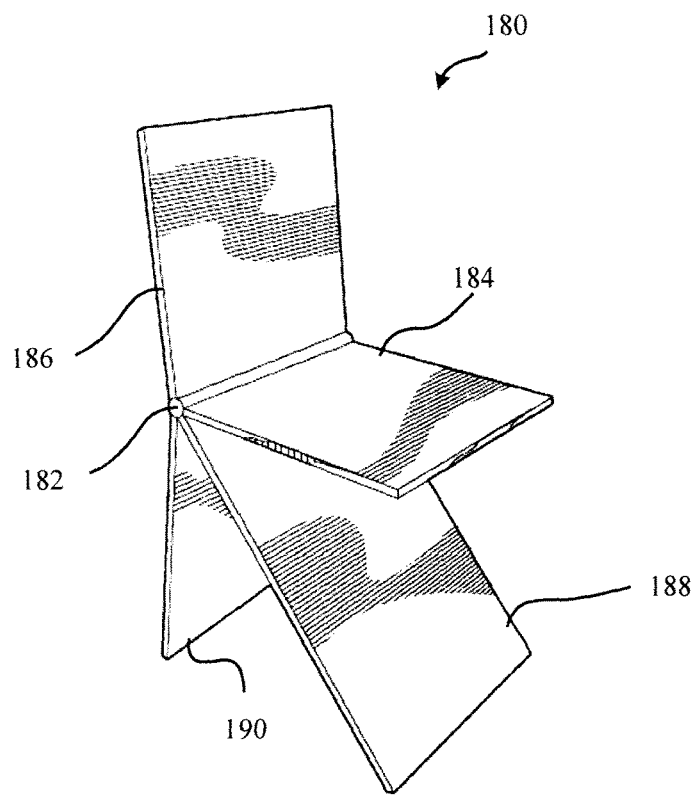
FIG. 23 illustrates yet another embodiment of a folding chair according to some aspects of the invention.
Figure 24:
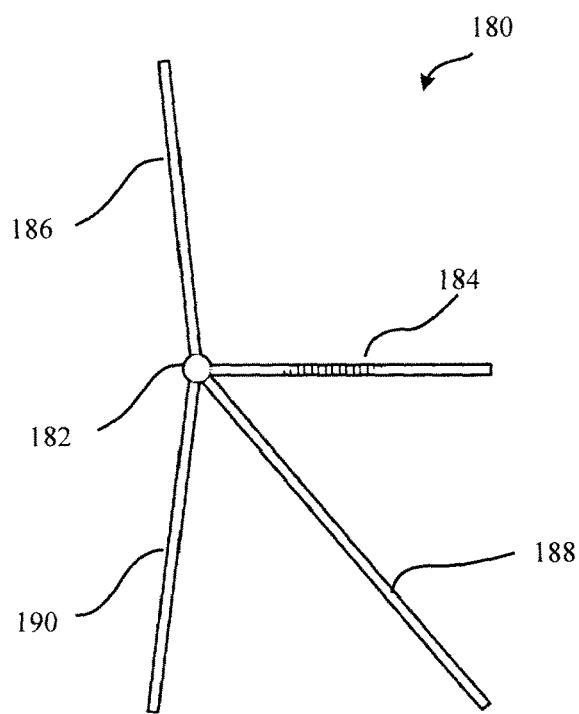
FIG. 24 shows a side view of the folding chair shown in FIG. 23.

FIG. 23 illustrates yet another embodiment of a folding chair 180 according to some aspects of the invention. FIG. 24 shows a side view of the folding chair 180. The chair 180 has one hinge 182 controlling the four flats of the chair 180 (e.g., seat base 184, seat back 186, front leg 188 and back leg 190) which may be locked in the open/deployed configuration and/or the closed/folded configuration. In some embodiments, the four flats may be in the folded configuration when the seat back 186 is against and/or parallel seat base 184 and front leg 188 is against and/or back leg 190. In some embodiments, the four flats may be in the folded configuration when the seat back 186 and the seat base 184 are flat with the front leg 188 and the back leg 190. In further embodiments, chair 180 may be in the folded configuration when the seat back 186 is against and/or parallel with seat base 184; back leg 190 is against and/or parallel front leg 188; and seat base 184 is against and/or parallel front leg 188.

Figure 25:
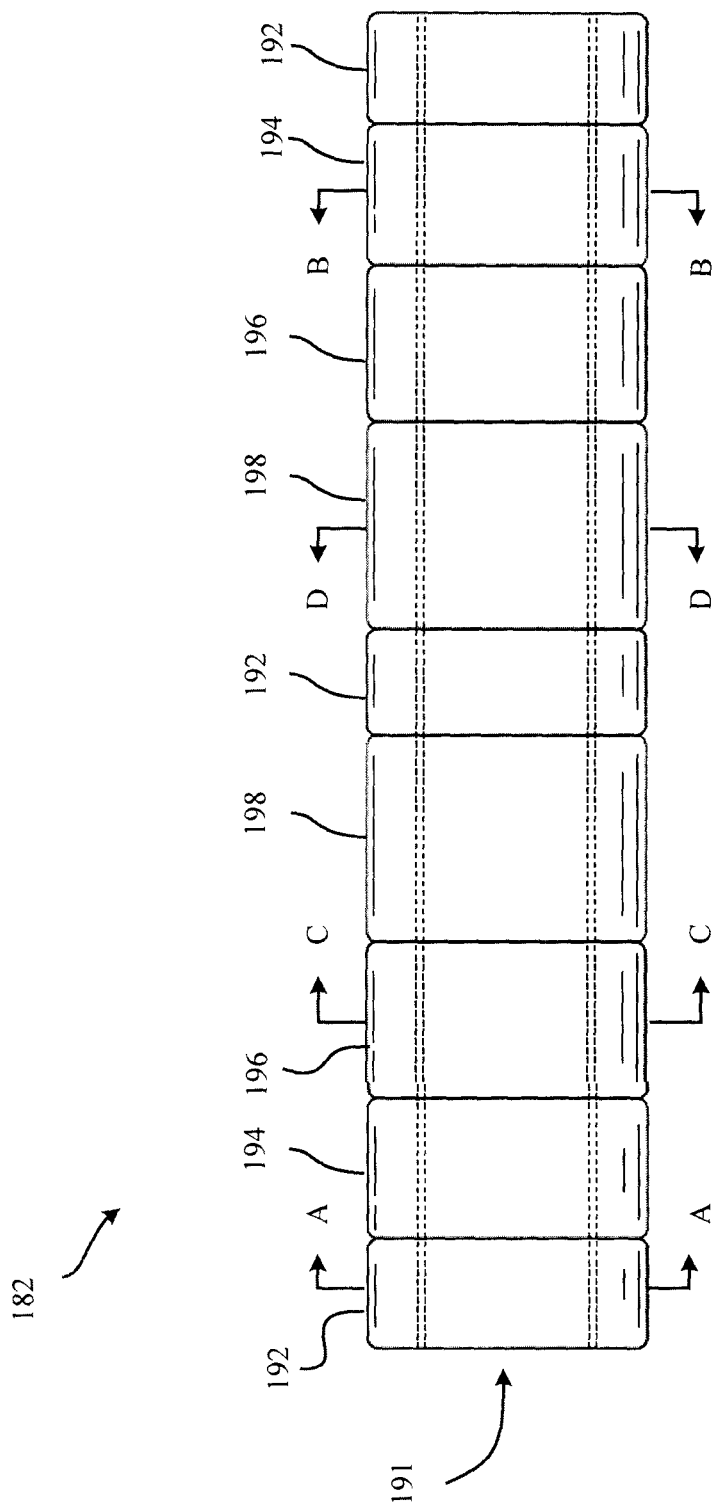
FIG. 25 illustrates a top view of the hinge for the folding chair shown in FIG. 23 and an exemplary arrangement of collars.

FIG. 25 illustrates hinge 182 and an exemplary arrangement of collars. Hinge 182 includes a central lock cylinder 191 positioned within the array of collars. In some embodiments, collars 192 may be coupled with the front leg 188. In some embodiments, collars 194 may be coupled with the back leg 190. In some embodiments collars 196 may be coupled with the seat base 184. In some embodiments, collars 198 may be coupled with the seat back rest 186. The permutation of which flats (e.g., seat base 184, seat back 186, front leg 188, back leg 190) fit on which collars (e.g., collars 192, 194, 196, 198) is open depending on the mechanics.

In some embodiments, the width of the collars (i.e., the axial dimension) may vary to facilitate load distribution along the hinge 182. In the illustrated example of hinge 182, the width of the collars may increase as they approach the center of the hinge 182 to offer greater support and strength as the flats attached to the collars towards the center may have to cope with greater stress as the fixing points approach the center of the hinge 182. This differing collar width may allow for a better distribution of stability, support, and strength across the width of the hinge 182. The width of the hinge may depend on the type of flat attached (e.g., seat base 184, seat back 186, etc.).

FIG. 26 shows a cross-sectional view of hinge 182 at A-A. Front leg 188 may couple with collar 192. Collar 192 may include a stud 193 that projects into a rotate channel 200 in central lock cylinder 191. The rotate channel 200 may limit a rotational range of motion of front leg 188 and collar 192 about the central lock cylinder 191. In some embodiments, the rotate channel 200 may limit rotation of the front leg 188 and collar 192 from 0-90 degrees from vertical 201. In some embodiments, rotate channel 200 may limit rotation of the front leg 188 and collar 192 to less than 60 degrees from vertical 201 (e.g., less than 30-45 degrees from vertical 201).

FIG. 27 shows a cross-sectional view of hinge 182 at B-B. Back leg 190 may couple with collar 194. Collar 194 may include a stud 195 that projects into a rotate channel 202 in central lock cylinder 191. The rotate channel 202 may limit a rotational range of motion of back leg 190 and collar 194 about the central lock cylinder 191. In some embodiments, the rotate channel 202 may limit rotation of the back leg 190 and collar 194 from 0-90 degrees from vertical 201. In some embodiments, rotate channel 202 may limit rotation of the back leg 190 and collar 192 to less than 60 degrees from vertical 201 (e.g., less than 30-45 degrees from vertical 199).

FIG. 28 shows a cross-sectional view of hinge 182 at C-C. Seat base 184 may couple with collar 196. Collar 196 may include a stud 197 that projects into a rotate channel 204 in central lock cylinder 191. The rotate channel 204 may limit a rotational range of motion of seat base 184 and collar 196 about the central lock cylinder 191. In some embodiments, the rotate channel 204 may limit rotation of the seat base 184 and collar 196 from 0-90 degrees from vertical 201.

FIG. 29 shows a cross-sectional view of hinge 182 at D-D. Seat back 186 may couple with collar 198. Collar 198 may include a stud 199 that projects into a rotate channel 206 in central lock cylinder 191. The rotate channel 206 may limit a rotational range of motion of seat back 186 and collar 198 about the central lock cylinder 191. In some embodiments, the rotate channel 206 may limit rotation of the seat back 186 and collar 198 from 0-30 degrees from vertical 201. In some embodiments, rotate channel 206 may limit rotation of the seat back 186 and collar 196 to less than 20 degrees from vertical 201 (e.g., from 0-18 degrees from vertical 201, up to 15 degrees from vertical 201 or the like).

In some embodiments, one of the flats (e.g., seat base 184, seat back 186, front leg 188, back leg 190) may be integrally formed with the central lock cylinder. In some embodiments, the central lock cylinder 191 may lock one or more flats in the deployed position by translating in the axial direction and positioning the corresponding stud of the one or more flats in a corresponding locking channel. In some embodiments, the central lock cylinder 191 may lock all the flats in the deployed position by translating in an axial direction and positioning all the corresponding studs of each of the flats in corresponding locking channels. In further embodiments, the central lock cylinder 191 may lock one or more flats in a folded position (e.g., when the flat is parallel to vertical 201) by translating in the axial direction and positioning the corresponding stud of the one or more flats in a corresponding locking channel. In some embodiments the central lock cylinder 191 may lock all the flats in the deployed position by translating in an axial direction and positioning all of the corresponding studs of each of the flats in corresponding locking channels. In further embodiments, the hinge 182 may be configured with locking channels in the central lock cylinder 191 that lock one or more of the flats in intermediate positions.

In some embodiments, the central lock cylinder 191 may translate in a first axial direction to lock the one or more flats in a deployed position and may translate in the first axial direction when locking one or more flats in a folded position. In some embodiments, the central lock cylinder 191 may translate in a first axial direction to lock the one or more flats in a deployed position and may translate in a second axial direction (opposite the first axial direction) when locking one or more flats in the folded configuration.

Also less or more collars may be used and the length of the hinge 182 may vary depending on different needs. The ratios of dimensions and size may vary depending on the properties of the materials used (e.g., steel, aluminum, plastic, etc.) and the manufacturing process (e.g., additive manufacturing, stud insertion, fixation, welding, or the like). Further, the diameter of the collar may vary, the thickness of the flats may vary, and the size and shape of the studs will vary as will the channels in the cylinder.

In some embodiments, the hinge design described herein may provide for foldable furniture that may be configured to fold flat. In some embodiments, the furniture may have a thickness of less than 2.5 inches when in the flat configuration. The flat folded configuration advantageously provides an unprecedented space saving design. Multiple units may be easily stored by hanging them on a wall or out of sign in a cupboard. Further, multiple furniture units (e.g., chairs) may be easily transported as the units can be stacked flat, horizontally or vertically into an easily portable wheeled box. Further, units may be shipped in flat boxes relatively cheaply compared to conventional chairs. In some embodiments, the chairs may include corresponding engagement features that allow multiple chairs to be joined together to form an elongate chair, bench, couch or the like. In some embodiments, the chairs may be joined together in a line or may be joined to form a curved arrangement (e.g., a semicircle or the like).

Further, while illustrated embodiments are shown with collars having studs protruding inwardly into rotate and/or lock channels of the central lock cylinder, other embodiments of the hinge may have collars with rotate and/or lock channels that are configured to receive a stud extending outwardly from the surface of the central lock cylinder.

Further, it should be understood that in some embodiments, some collars of a hinge may include rotate and/or locking channels for receiving a stud extending outwardly from the surface of the central lock cylinder, while other collars of the hinge include studs that project inwardly into rotate and/or locking channels of the central lock cylinder. Accordingly, in some embodiments, features of the collar and central lock cylinder may be reversible and may be configured to provide similar utility.

Figure 30:
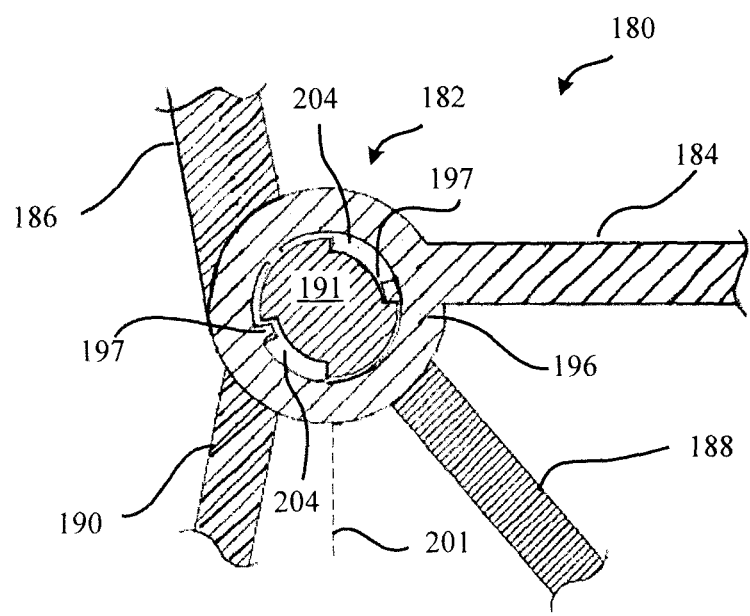
FIG. 30 illustrates another exemplary cross-sectional view of the hinge in FIG. 25 at C-C.

FIG. 30 illustrates another exemplary cross section of hinge 182 at C-C. Seat base 184 may couple with collar 196. Collar 196 may include two studs 197 that project into a respective rotate channel 204 of central lock cylinder 191. Accordingly, in some embodiments, central lock cylinder 191 may include more than one rotate channel (e.g., rotate channel 204) per collar (e.g., collar 196). Such a configuration may help distribute weight to two or more collar studs and to different portions of the central lock cylinder (e.g., central lock cylinder 191). While shown with two studs 197 protruding separately into two rotate channels 204, it should be understood that embodiments of the hinge may have three, four, five, or more studs each protruding into separate rotate channels (e.g., three, four, five, or more rotate channels) of a central lock cylinder.

Figure 31:
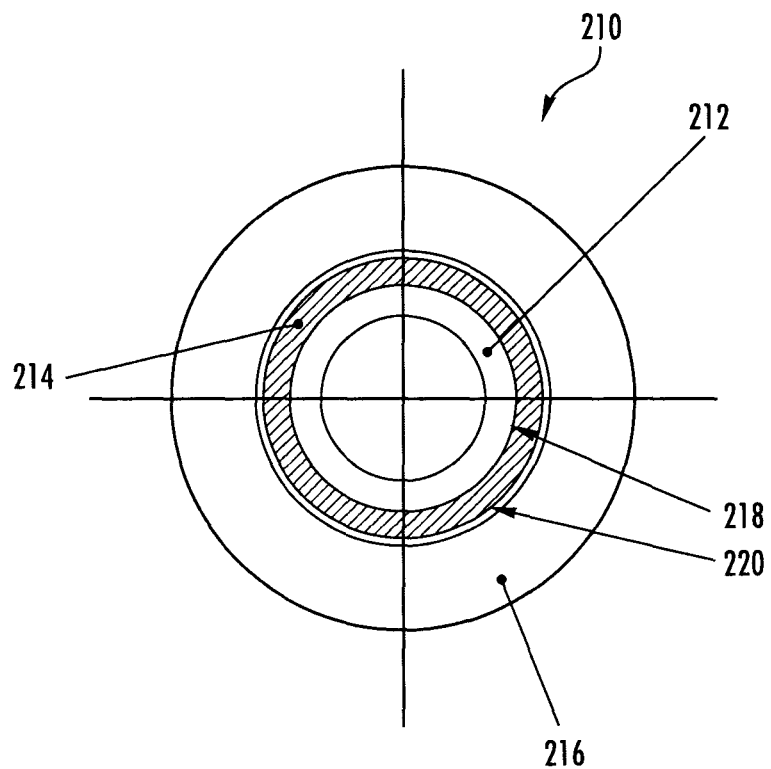
FIG. 31 illustrates an exemplary cross-sectional view of an exemplary hinge according to some embodiments.

FIG. 31 illustrates a cross section of an exemplary hinge 210. Hinge 210 may have a central lock cylinder 212 positioned within an intermediate hinge cylinder 214. The central lock cylinder 212 and intermediate hinge cylinder 214 assembly may be positioned within collar 216. Gap 218 allows the central lock cylinder 212 to rotate relative to intermediate hinge cylinder 214 and collar 216 about the central lock cylinder axis. Gap 220 allows the intermediate hinge cylinder 214 to rotate relative to collar 216 about the central lock cylinder axis. Additionally, the collar 216 of hinge 210 may include collar studs the project inwardly through an aperture or slot in the intermediate hinge cylinder 214 and into rotate/lock channels of the central lock cylinder 212 similar to many of the embodiments described above.

Figure 32:
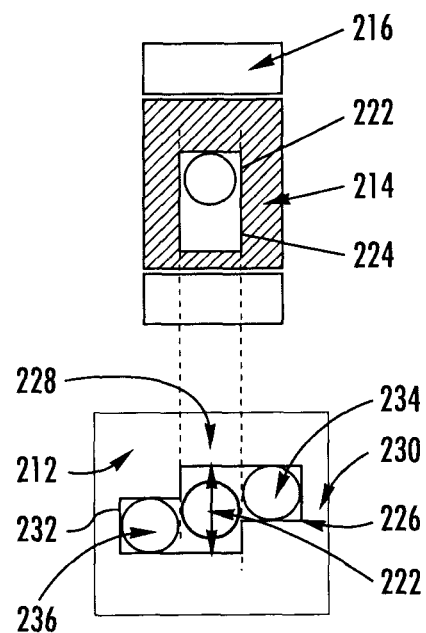
FIG. 32 illustrates the interaction between the components of the hinge shown in FIG. 31.

FIG. 32 illustrates the interaction between the components of hinge 210. Collar 216 may include a collar pin 222 that protrudes inwardly from the collar 216. The pin 222 extends through a slot 224 in the intermediate hinge cylinder 214 and into the channel 226 of the central lock cylinder 212. Channel 226 includes a rotate channel 228 and a first locking channel 230 and a second locking channel 232.

When the collar pin 222 is positioned within the rotate channel 228 and not within the first or second locking channels 230, 232, the collar 216 may rotate relative to the central lock cylinder 212 and the intermediate hinge cylinder 214.

When the collar pin 222 is rotationally aligned with the first locking channel 230, the central lock cylinder 212 may be moved to the left in the axial direction relative to the collar 216 and collar pin 222 to position the collar pin 222 in the locking channel 230. When pin 222 is at position 234, the collar 216 and an attached component may be in a locked deployed configuration.

When collar pin 222 is rotationally aligned with the second locking channel 232, the central lock cylinder 212 may move to the right in the axial direction relative to the collar 216 and collar pin 222 to position the collar pin 222 in the second locking channel 232. When pin 222 is at position 236, the collar 216 and an attached component may be in a locked folded configuration.

Similar to embodiments described above, the collar pin 222 may have many different configurations. In some embodiments the pin 222 may have a circular cross-section, an elongate cross-section, a rectangular cross-section, an oval cross-section, or the like. In some embodiments, the pin 222 may be integrally formed with the collar (e.g., additive manufacturing). In some embodiments, the pin 222 may be inserted through an opening of the collar 216 during hinge 210 assembly and thereafter affixed (welding, chemical affixation) or otherwise engaged with the collar 216 (engagement features, friction fitting engagement, etc.).

In some embodiments the slot 224 of intermediate hinge cylinder 214 includes a width that closely fits pin 222. Accordingly, when the collar 216/pin 222 move in the axial direction, the intermediate hinge cylinder 214 may move in the axial direction along with collar 216/pin 222.

In some embodiments, the slot 224 of the intermediate hinge cylinder 214 has an angular length that closely approximates an angular length of the corresponding rotate channel 228. In many embodiments, the slot 224 may have an angular length that is less than the angular length of the corresponding rate channel 228. Accordingly, in some embodiments, the rotational range of motion of the collar 216/pin 222 may be defined by the angular length of the slot 224 of intermediate hinge cylinder 214. Thus, intermediate hinge cylinder 214 (also referred to as an arc control cylinder) may control the rotational arc of one or more collars of the hinge 210. An intermediate hinge cylinder 214 with slots having an angular length less than an angular length of a corresponding rotate channel of central lock cylinder 212 may prevent the central lock cylinder 212 to be bind up with the weight, friction, and torque of the flats extending from the collars 216 (e.g., seat back, seat base, etc.). The intermediate hinge cylinder 214 may take these forces and may act as the prim pivot, leaving the innermost central lock cylinder 212 free to "float" within the hinge 210. This configuration may make axial movement of the central lock cylinder 212 (e.g., into and out of locking positions) easier and may allow users to slide the central lock cylinder 212 into various configurations.

In some embodiments, to avoid weakening the intermediate hinge cylinder 214 and the central lock cylinder 212, the collars of hinge 210 (e.g., collar 216) may include multiple pins that protrude inwardly through separate slots in the intermediate hinge cylinder 214 and into separate channels in central lock cylinder 212.

Figure 33:
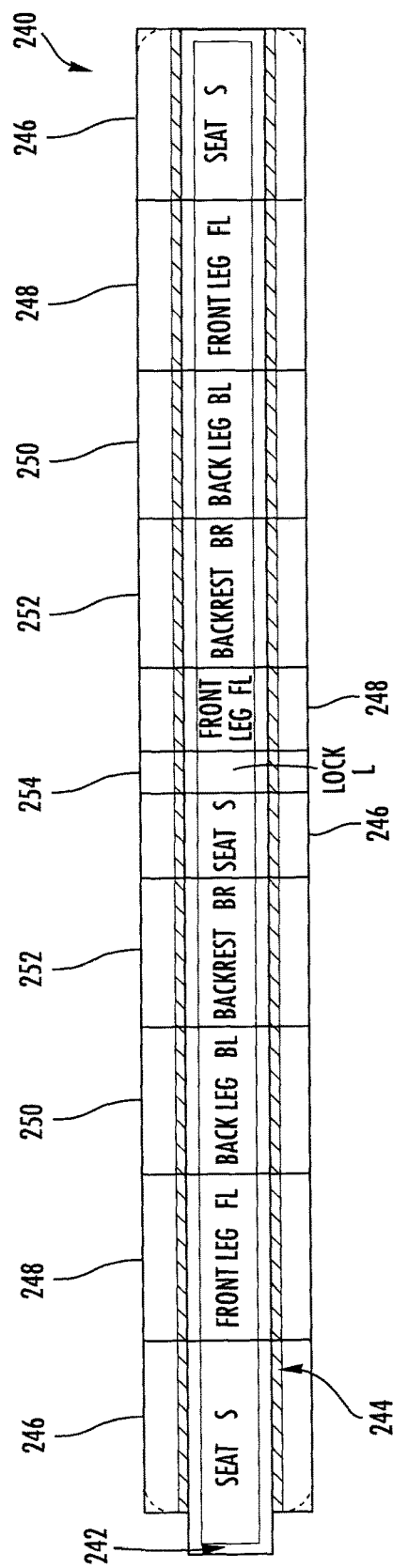
FIG. 33 illustrates an exemplary hinge that may be used for the chair of FIG. 23.

FIG. 33 illustrates an exemplary hinge 240 that may be used for chair 180. Hinge 240 includes a central lock cylinder 242, an intermediate hinge cylinder 244, and an array of collars. The array of collars may include one or more seat base collars 246, one or more front leg collars 248, one or more back leg collars 250, one or more backrest collars 252, and one or more lock collars 254.

In the illustrated embodiment, three seat collars 246 are provided that couple with a seat base 184. The front leg 188 may couple with three front leg collars 248. The back leg 190 may couple with two back leg collars 250. And the seat back 186 may couple with two back rest collars 252.

Figure 34:
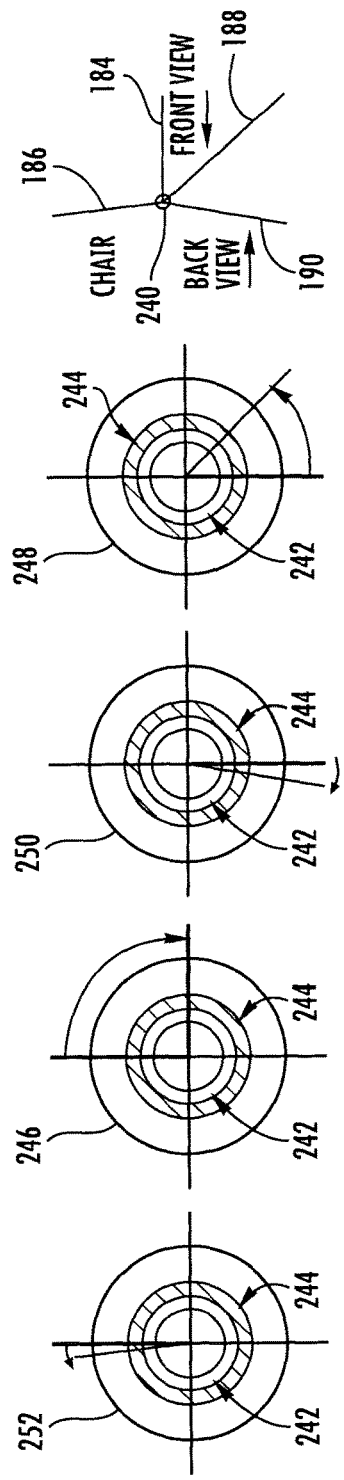
FIG. 34 illustrates exemplary rotational ranges of motion provided for each of the collars of the exemplary hinge of FIG. 33.

FIG. 34 illustrates the rotational range of motion provided for each of the collars 246, 248, 250, 252 about the central hinge axis. The backrest collar 252 may be allowed to rotate between 5-15 degrees from vertical about the hinge axis, preferably 8-12 degree from vertical. The seat base collars 246 may be allowed to rotate around 80-100 degrees from vertical about the hinge axis, preferably 85-95 degrees, and even more preferably about 90 degrees from vertical. In some embodiments, back leg collars 250 may be allowed to rotate around 5-15 degrees from vertical about the hinge axis, preferably about 8-12 degrees from vertical. In some embodiments, front leg collars 248 may be allowed to rotate around 35-65 degrees from vertical about the hinge axis, preferably around 40-50 degrees from vertical.

In many embodiments, the array of collars include pins that protrude into the hinge 240. The pins for the collars may be distributed at different angular positions to spread the load along the intermediate hinge cylinder 244. For example, the collar pins for the seat back collars 252 may be positioned on a back of the hinge 240 (e.g., left from vertical). The collar pins for the seat base collars 246 may be positioned on the front of the hinge 240 (e.g., right from vertical). The collar pins for the back leg collars 250 may be positioned on the front of hinge 240. The collar pins for the front leg collars 248 may be positioned along the back of hinge 240. Accordingly, in some embodiments, and with the collar array illustrated in FIG. 34, the collar pins may be staggered along the length of the hinge 240 thereby spreading the loads within the intermediate hinge cylinder 244 and/or the central lock cylinder 242.

Figure 35:
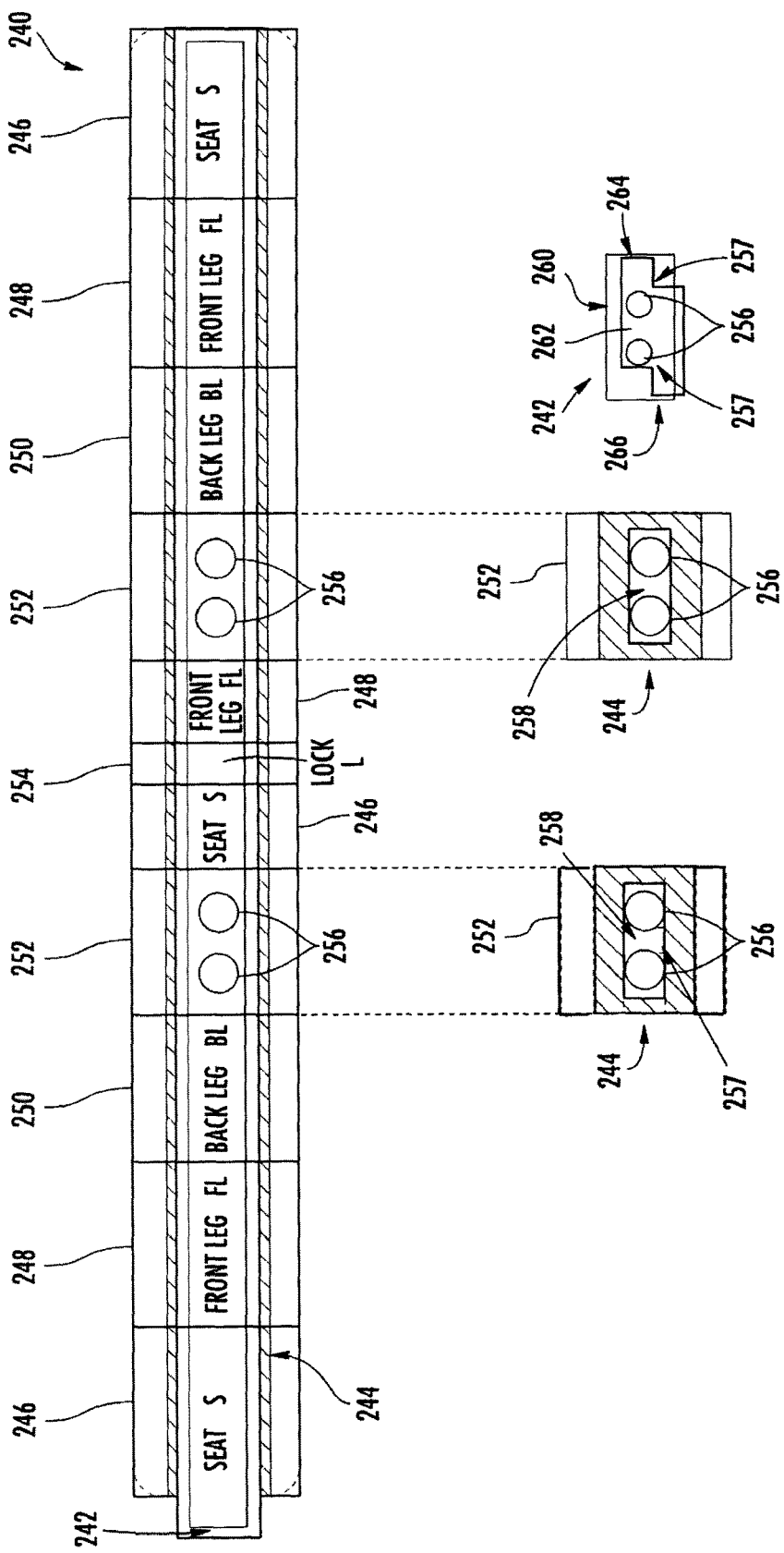
FIG. 35 illustrates exemplary details of backrest collars of the exemplary hinge of FIG. 33.

FIG. 35 illustrates exemplary details of backrest collar 252. Collars 252 may include collar pins 256 that protrude inwardly into hinge 240. In the exemplary embodiment, each collar 252 includes two collar pins 256 that are axially spaced from one another. The collar pins 256 extend through slots 258 of intermediate hinge cylinder 244. The pins 256 may rotate within the cutout section 258 to control the angle of the open/folded positions of the backrest 186. The pins 256 further extend through slots 258 of intermediate hinge cylinder 244 into channel 260 of central lock cylinder 242. Channel 260 includes a rotate channel 262, a first locking channel 264 extending therefrom, and a second locking channel 266 extending therefrom in an opposite direction from the first locking channel 264. Further, in some embodiments, edges 257 are formed between the rotate channel 262 and the locking channels 264, 266. In many embodiments, it may be advantageous to have these corners rounded to facilitate the pins sliding into and/or out of the locking channels 264, 266.

Figure 36:
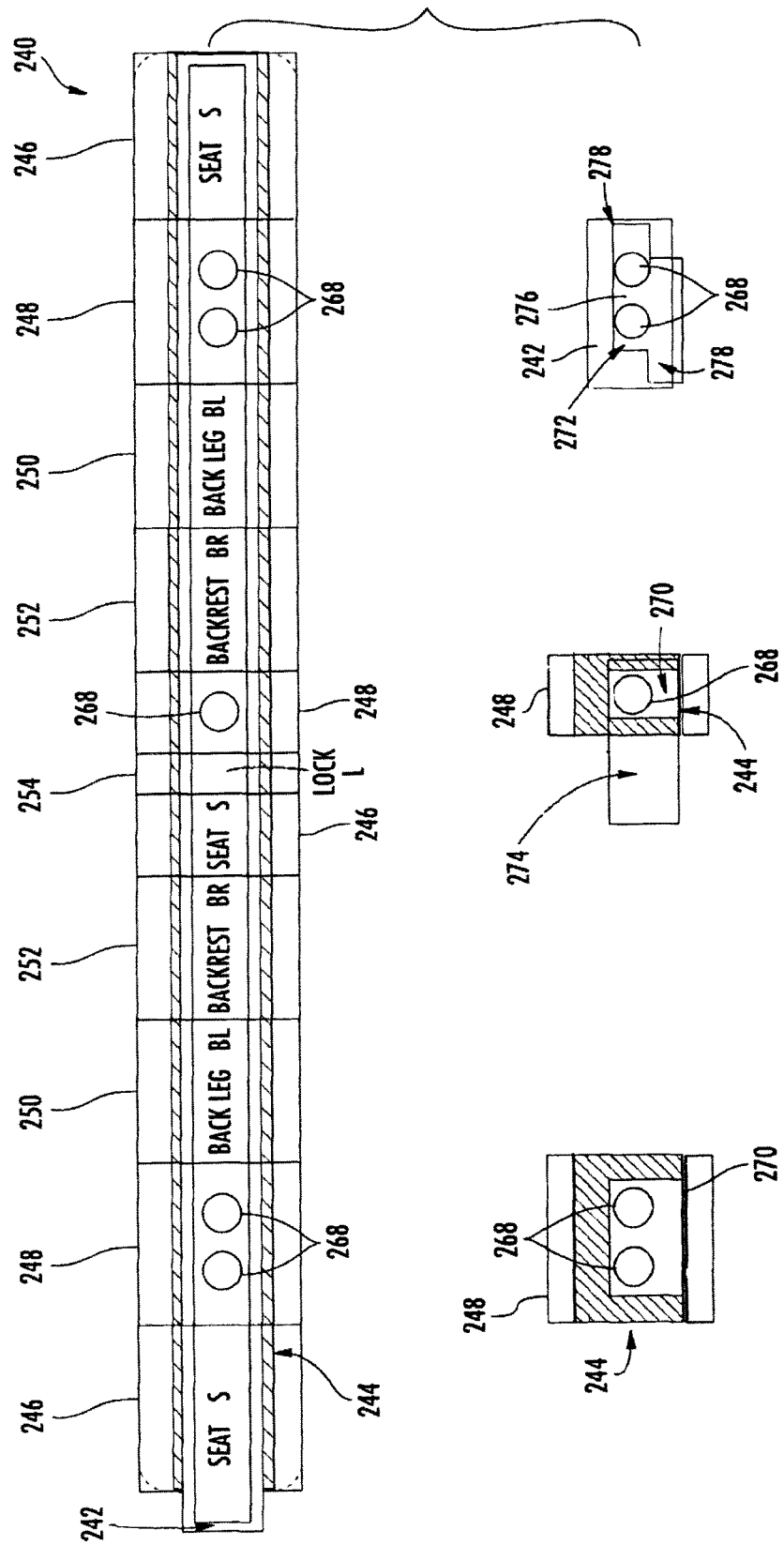
FIG. 36 illustrates exemplary details of front leg collars of the exemplary hinge of FIG. 33.

FIG. 36 illustrates exemplary details of front leg collars 248. Collars 248 may include collar pins 268 that protrude inwardly into hinge 240. In the exemplary embodiment, two of collars 248 each include two collar pins 268 that are axially spaced from one another while a third collar 248 includes a single collar pin 268. The collar pins 268 may extend through slots 270 of intermediate hinge cylinder 244. The pins 268 may rotate within the cutout section 270 to control the angle of the open/folded positions of the front leg 188. The pins 268 of the collars 248 that have two pins 268 each may further extend through slots 270 of intermediate hinge cylinder 244 into channel 272 of central lock cylinder 242. The pin 268 of the collar 248 that has a single pin 268 may extend through slot 270 of intermediate hinge cylinder 244 and into channel 274 of central lock cylinder 242. Channels 272 may include a rotate channel 276 and locking channels 278 extending therefrom. As discussed above, in many embodiments, corners or edges formed between the rotate channel 276 and the locking channels 278 may be rounded to facilitate smooth transitions from a rotate configuration and a locked configuration. Locking channels may be absent for channel 274 as the locking may be performed by the collars 248 which are wider. The channel 274 may have an axial width that is wide enough to allow full side-to-side movement.

As discussed above, in many embodiments, an angular length of a slot (e.g., slots 270) may be shorter than an angular length of an underlying channel (e.g., rotate channel 276, 274). This configuration may avoid the binding of the locking/central lock cylinder 242 due to loads from the flats attached to the collars. The same principles and processes shown in FIG. 35 and FIG. 36 may be followed with respect to the back leg collars 250 and seat collars 246. The back leg collars 250 and seat collars 246 may have different configurations of pins, angles of cutout channels (in the intermediate hinge cylinder 244) and connections to their respective furniture pieces (e.g., back leg 190, seat base 184).

Figure 37:
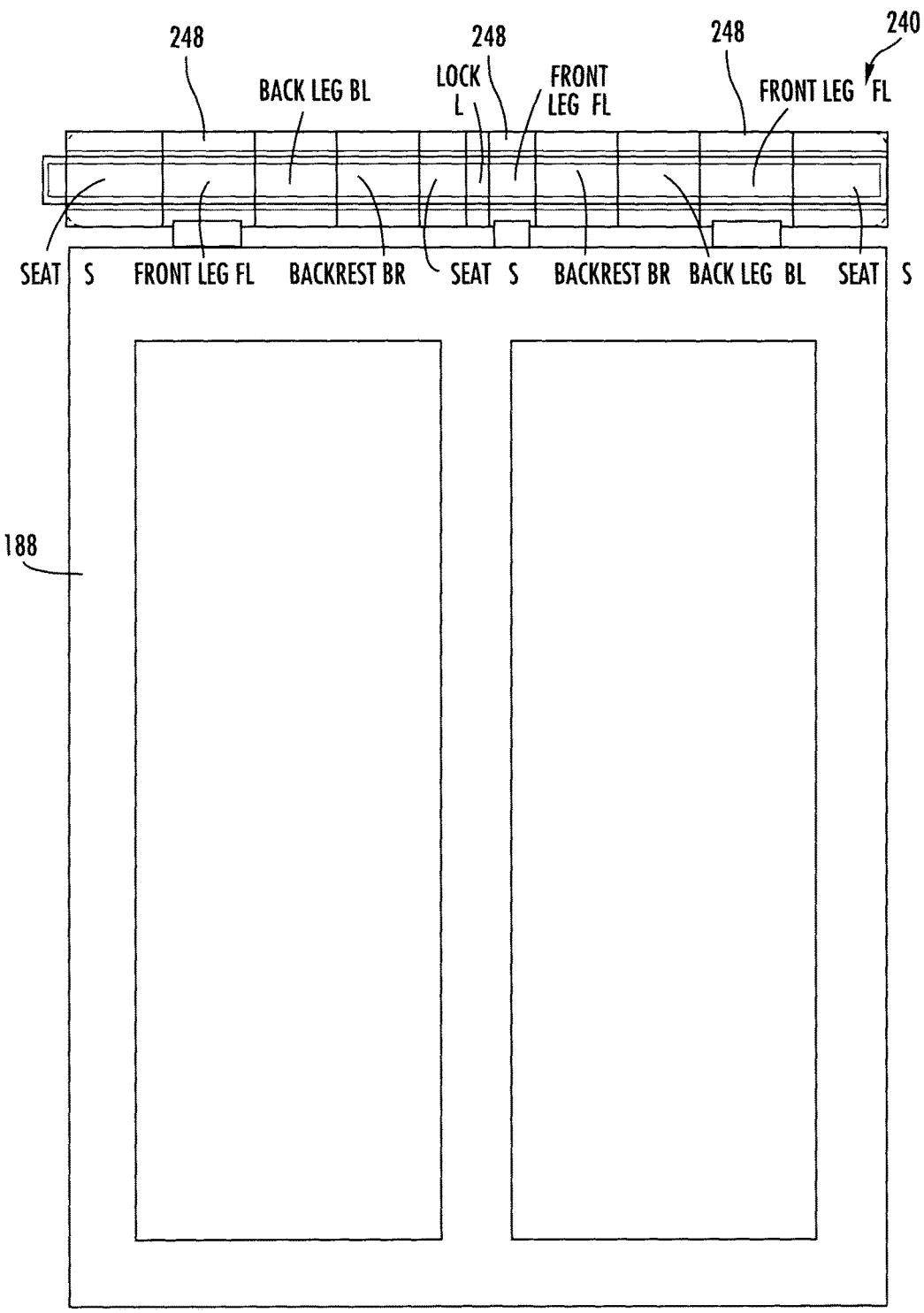
FIG. 37 illustrates an exemplary front leg flat coupled with the exemplary hinge of FIG. 33.

FIG. 37 illustrates an exemplary front leg flat 188 coupled with hinge 240. The front leg flat 188 couples to hinge 240 with intermediate connectors 280. Intermediate connectors may be integral with collars 248 or may be welded thereto. In some embodiments, the connectors 280 may be constructed from wood, plastic, laminate, composite, ceramic, metal, or the like. Connectors 280 may be used throughout or in any combination with component pieces, or not at all. In some embodiments, front leg 188 may be an integral piece generally defined by a rectangular frame. In some embodiments, a central beam may run vertically along the center of the front leg 188 from a top of the rectangular frame to a bottom of the rectangular frame.

Figure 38:
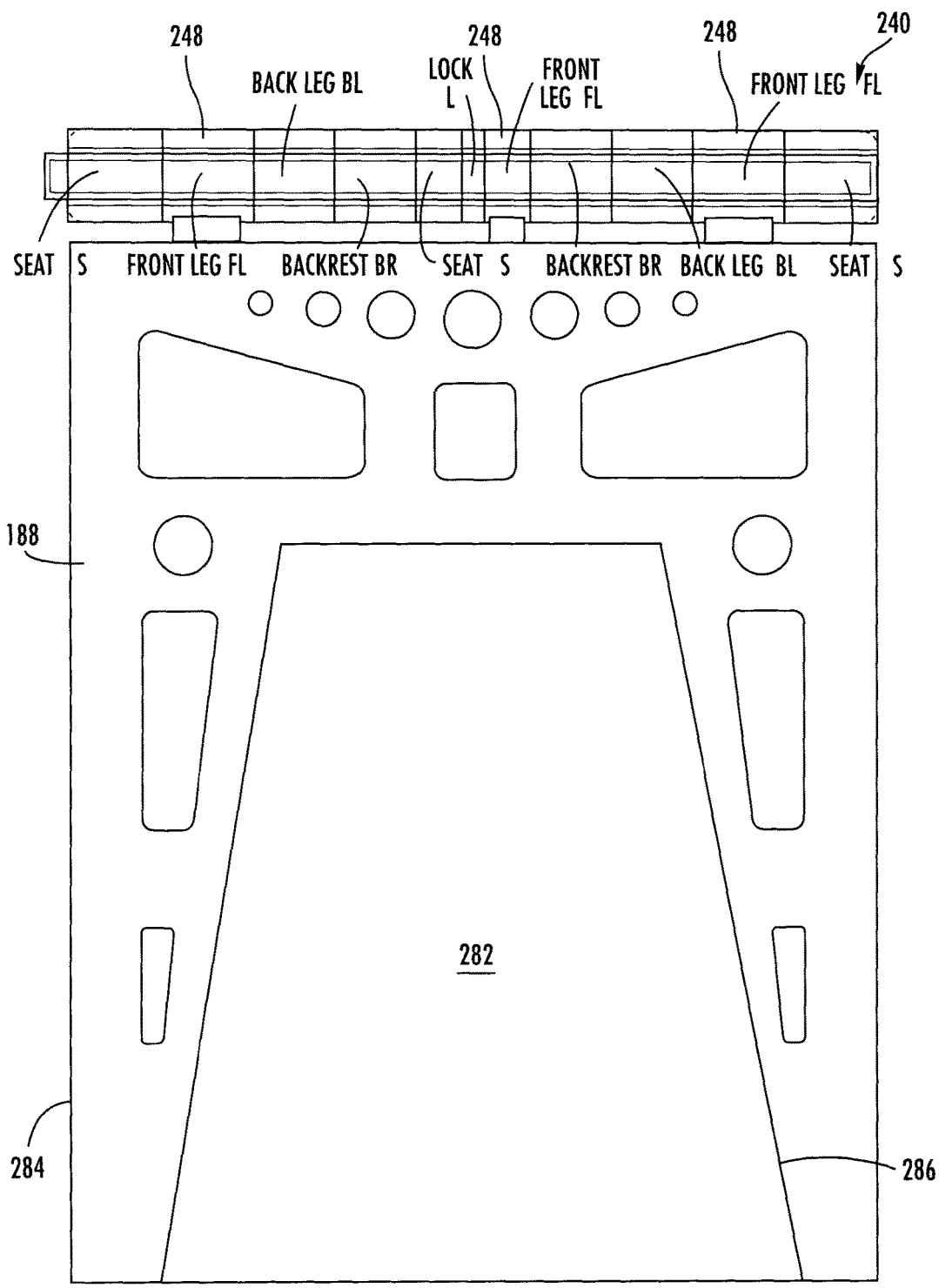
FIG. 38 illustrates another exemplary front leg coupled with the exemplary hinge of FIG. 33.

FIG. 38 illustrate another exemplary front leg 188 coupled with hinge 240. In some embodiments, front leg 188 may be an integral piece generally having a concave cutout portion 282 between a left support 284 and a right support 286 of front leg 188. In some embodiments the concave cutout portion 282 may be beneficial in accommodating a user's legs/feet when the user sits in chair 180. Further, in some embodiments, the front leg 188 may include cutout portions that may provide for material savings during manufacture or that otherwise add to the overall design of the front leg 188 and/or chair 180.

In many embodiments it may be useful to be able to lock embodiments of the hinge in an open position and/or a closed position (or intermediate positions therebetween). In many embodiments, the hinge (and/or chair, table, or other furniture unit) may be locked by constraining the axial movement of the central lock cylinder.

FIG. 39, FIG. 40, and FIG. 41 illustrate the operation of exemplary lock collar 254. Lock collar 254 may be configured to lock the central lock cylinder 242 to prevent the central lock cylinder 242 from translating in the axial direction. Lock collar 254 may include a collar pin 288 that projects inwardly from collar 254 through a slot in the intermediate hinge cylinder 244 and into a channel 290 of central lock cylinder 242. The channel 290 may include an axial translation channel 292 and one or more axial lock channels 294, 296 extending from the axial translation channel 292 in a direction transverse to the axial direction.

In many embodiments the axial lock channels 294, 296 may have an axial width that closely corresponds to the axial width of the collar pin 288. Accordingly, in many embodiments, when collar pin 288 is positioned within one of the axial lock channels 294, 296, the collar pin 288 and the axial lock channels 294, 296 may cooperate to substantially restrict axial movement between the lock collar 254/collar pin 288 and the central lock cylinder 242. Thus, when the central lock cylinder 242 is axially translated to one of its extremes, (e.g., a locked open, a locked closed, or an open position), the lock collar 254 may be rotated to move collar pin 288 into one of the axial lock channels 294 to prevent the central lock cylinder 242 to slide from its current position (e.g., a locked open, a locked closed, or an open position).

In many embodiments, when the collar pin 288 is positioned within the axial translation channel 292 as shown in FIG. 40, the central lock cylinder 242 may axially translate between different positions (e.g., a locked open, a locked closed, or an open position).

FIG. 39 shows when collar pin 288 is positioned within the axial lock channel 294 and when central lock cylinder 242 is positioned at an extreme left position relative to lock collar 254. This central lock cylinder 242 position may be a locked open, a locked closed, or an open position, for example. When collar pin 288 is positioned within the axial lock channel 294, the collar pin 288 and channel 294 prevent central lock cylinder 242 from axially translating from the illustrated position of FIG. 39.

FIG. 41 shows when collar pin 288 is positioned within the axial lock channel 296 and when central lock cylinder 242 is positioned at an extreme right position relative to lock collar 254. This central lock cylinder 242 position may be a lock open, a locked closed, or an open position, for example. When collar pin 288 is positioned within the axial lock channel 296, the collar pin 288 and channel 296 prevent central lock cylinder 242 from axially translating from the illustrated position of FIG. 41.

While the illustrated embodiments are shown with a lock collar having stud(s) protruding inwardly into axial translation and/or axial lock channels of the central lock cylinder, other embodiments of the hinge may have lock collars with axial translation and/or axial lock channels that are configured to receive a stud extending outwardly from the surface of the central lock cylinder. Accordingly, in some embodiments, features of the lock collar and central lock cylinder may be reversible and may be configured to provide similar utility (i.e., locking the axial movement between the lock collar and the central lock cylinder).

FIG. 42 shows another exemplary method and system for locking a central lock cylinder 242 of hinge 240 in an axial direction according to some embodiments. Ends of hinge 240 may have engagement features 298, 299 for engaging with a locking plate 300. When the engagement features 298, 299 are engaged with locking plate 300, the locking plate 300 may be transverse to the hinge axis of the hinge 240 and may thereby impede axial translation of the central lock cylinder 242 past the engaged locking plate 300. Accordingly, the locking plate 300 may prevent axial translation of the central lock cylinder 242 relative to the collar(s) of the hinge 240 and lock the hinge 240 in a desired configuration (e.g., open, closed, intermediate).

In some embodiments, the engagement features (e.g., engagement features 298) may be included on a separate collar 302 positioned at an end of the hinge 240 and coupled with the end collar of hinge 240. In some embodiments, the engagement features (e.g., engagement features 299) may be integral with the collar at the end of the hinge 240 (e.g., collar 246). In some embodiments, the engagement features 298, 299 may engage with corresponding engagement features 304 of locking plate 300.

As illustrated in the exemplary embodiment, the engagement features 299 may be threaded engagement features that are positioned along an internal surface of collar 246 and that are configured to receive the corresponding engagement features 304 along the axial direction. In some embodiments, the locking plate 300 may include a raised grip 306 to aid the user in screwing or unscrewing the locking plate 300.

FIG. 43 shows another view of locking plate 300. The locking plate 300 may have a generally circular footprint that corresponds to a diameter of the hinge 240. In some embodiments, once the locking plate 300 is engaged with hinge 240 to prevent axial translation of the central lock cylinder 242 by a desired amount, the locking plate 300 may be further secured to the hinge 240 by screw 308. When screw 308 is used to engage the locking plate 300 with hinge 240, the screw 308 prevents the locking plate 300 from rotating about its engagement axis and thereby prevents locking plate 300 from disengaging from hinge 240. Accordingly, screw 308 may be used to provide extra security and may be used for a more permanent locking of the hinge 240 in a locked open, closed, or intermediate position. The screw 308 may have a tamper resistant head, such as an Allen head in some embodiments.

Figure 44:
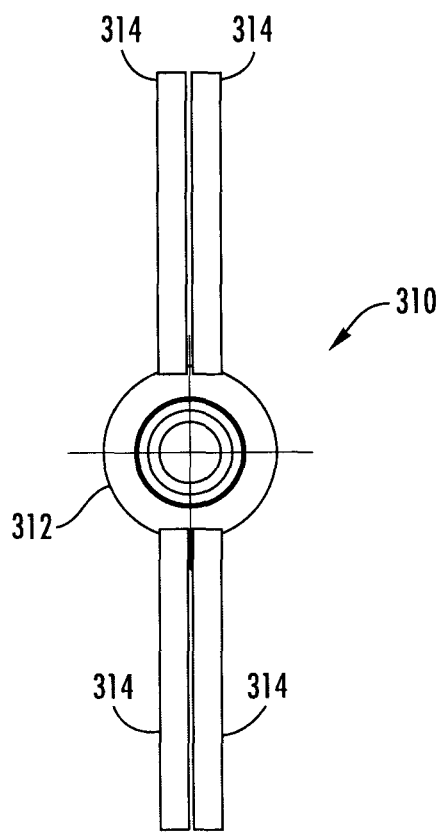
FIG. 44 shows an exemplary hinge (drawing is not to scale) with collars that are directly attached or integrally formed with flats.

FIG. 44 shows an exemplary hinge 310 (drawing is not to scale) with collars 312 that are directly attached or integrally formed with flat substantially planar members ("flats") 314. The flats 314 may form a chair for example. In some embodiments, the flats 314 may be a seat base, a seat back, a first leg, and a second leg. The collars 312 may be integrally formed with the flats (e.g., via additive manufacturing for example) or the flats 314 may be attached or affixed directly to collars 312 with engagement features, welding, chemical affixing, etc.

Figure 45:
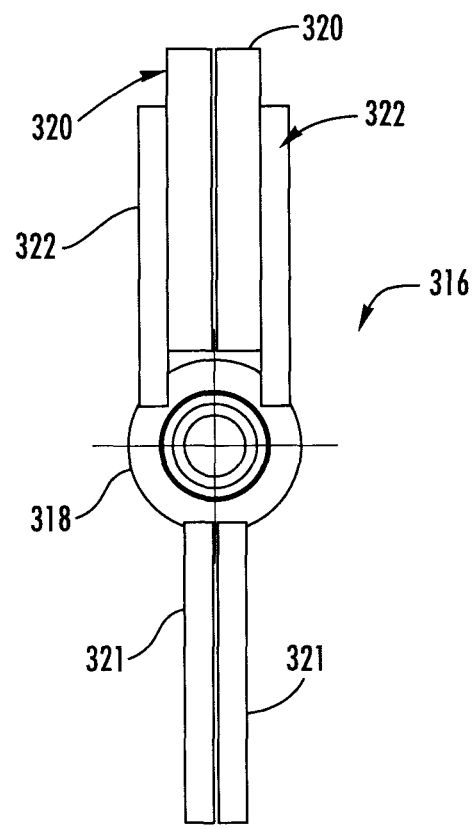
FIG. 45 shows an exemplary hinge (drawing is not to scale) with some collars that couple with separate flats via straight connectors that extend from collars and some collars that are directly attached to or integrally formed with flats.

FIG. 45 shows an exemplary hinge 316 (drawing is not to scale) with some collars 318 that couple with separate flats 320 via straight connectors 322 that extend from collars 318 and some collars 318 that are directly attached to or integrally formed with flats 321. The flats 320 may be a seat base and a seat back for example and flats 321 may be a first leg and a second leg of a chair. The flats 320 may couple with collars 318 via an intermediate connector 322. The intermediate connectors 322 may be integrally formed with collars 318 or may be direct attached or affixed with collars 318. The flats 321 may directly attach or affix to collars 318, similar to embodiments described above.

Figure 46:
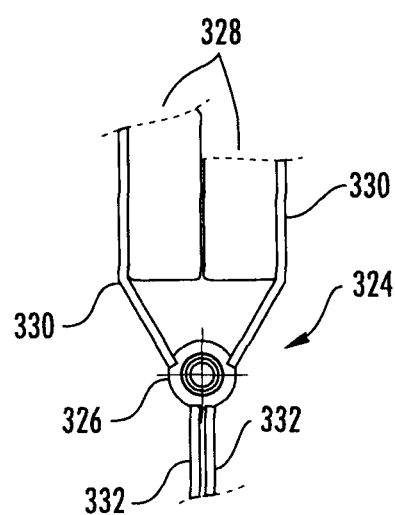
FIG. 46 shows an exemplary hinge (drawing is not to scale) with some collars that couple to separate flats via angled connectors and some collars that couple to directly to or are integrally formed with flats.

FIG. 46 shows an exemplary hinge 324 (drawing is not to scale) with some collars 326 that couple to separate flats 328 via angled connectors 330 and some collars 326 that couple to directly to or are integrally formed with flats 332. Angled connectors 330 may extend straight from collars 326 and may include a bend in the connectors 330. The angled connectors 330 may provide additional clearance for thicker flats 328. Angled connectors 330 may directly attach or affix to collars 326. The flats 332 may be legs of a chair similar to embodiments described above. The flats 332 may directly attach or affix to collars 326.

Figure 47:
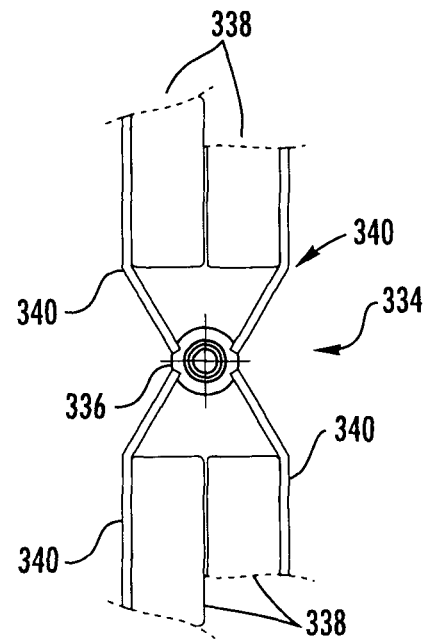
FIG. 47 shows an exemplary hinge (drawing is not to scale) where the collars couple to separate flats via angled connectors.

FIG. 47 shows an exemplary hinge 334 (drawing is not to scale) where the collars 336 couple to separate flats 338 via angled connectors 340. In some embodiments, each of the flats 338 may couple to hinge 334 via angled connectors 340.

Figure 48:
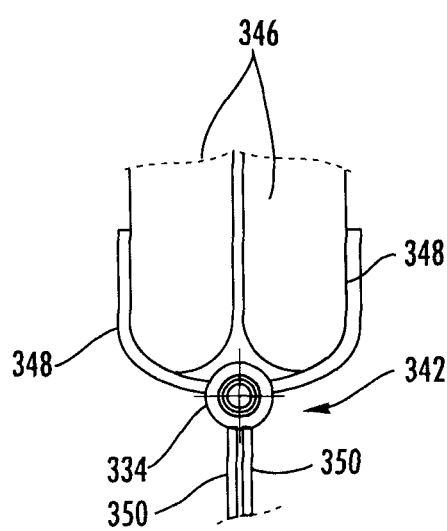
FIG. 48 shows an exemplary hinge (drawing is not to scale) with some collars that couple to separate flats via curved connectors and some collars that couple to directly to or are integrally formed with flats.
Figure 49:
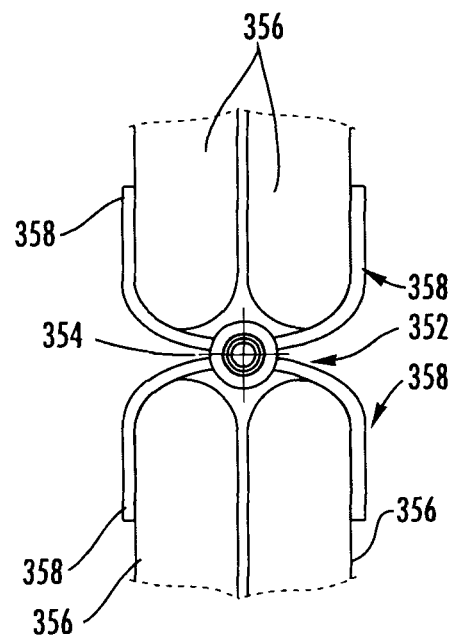
FIG. 49 shows an exemplary hinge (drawing is not to scale) where the collars couple to separate flats via curved connectors.

FIG. 48 shows an exemplary hinge 342 (drawing is not to scale) with some collars 344 that couple to separate flats 346 via curved connectors 348 and some collars 344 that couple to directly to or are integrally formed with flats 350. Curved connectors 348 may extend from collars 334 and may have a rounded bend or along the length of the curved connectors 348. Similar to the angled connectors 330, the curved connectors 348 may provide additional clearance and may provide an alternative outward appearance. FIG. 49 shows an exemplary hinge 352 (drawing is not to scale) where the collars 354 couple to separate flats 356 via curved connectors 358.

Figure 50:
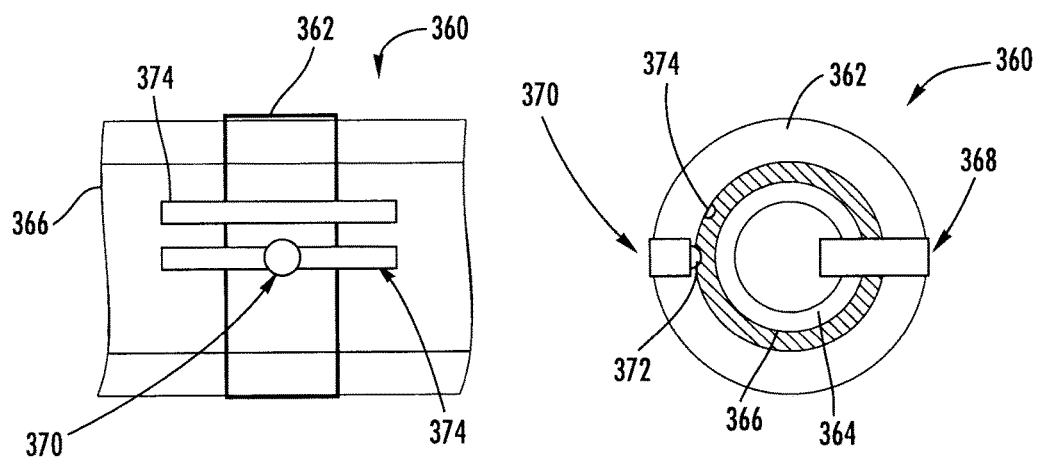
FIG. 50 shows an exemplary method and system for providing tactile feedback for a rotational position of a collar in relation to the central lock cylinder and/or the intermediate hinge cylinder.

In some embodiments, it may be desirable to provide tactile feedback to the user to provide an indication as to a rotational position of the collars in relation to the central lock cylinder and/or the intermediate hinge cylinder. FIG. 50 shows an exemplary method and system for providing tactile feedback for a rotational position of a collar in relation to the central lock cylinder and/or the intermediate hinge cylinder. In some embodiments, a hinge 360 may include a collar 362 that is rotatable about a central lock cylinder 364 and/or an intermediate hinge cylinder 366. The collar 362 may include a collar stud 368 that protrudes inwardly through a slot of the intermediate hinge cylinder 366 and into a channel of the central lock cylinder 364. The collar stud 368 may cooperate with the intermediate hinge cylinder 366 to limit a rotational range of motion of the collar 362 about the intermediate hinge cylinder 366 and the central lock cylinder 368. In some embodiments, the collar 362 may include a tactile stud 370 that protrudes inwardly and that provides tactile feedback indicating a rotation position of the collar 362 relative to the intermediate hinge cylinder 366 and/or the central lock cylinder 368. The tactile stud 370 may include a spring loaded ball bearing 372 that is biased to protrude inwardly into one or more horizontal grooves 374 along the outer surface of intermediate hinge cylinder 366. As the collar 362 rotates relative to intermediate hinge cylinder 366, the spring loaded ball bearing 372 of tactile stud 370 may click into each of the horizontal grooves 374, giving tactile feedback to the user and loosely restraining the collar 362 in each position. The tactile feedback system shown with collar 362 may be used, for example, with lock collar 254 of FIG. 39 through FIG. 40.

Figure 51:
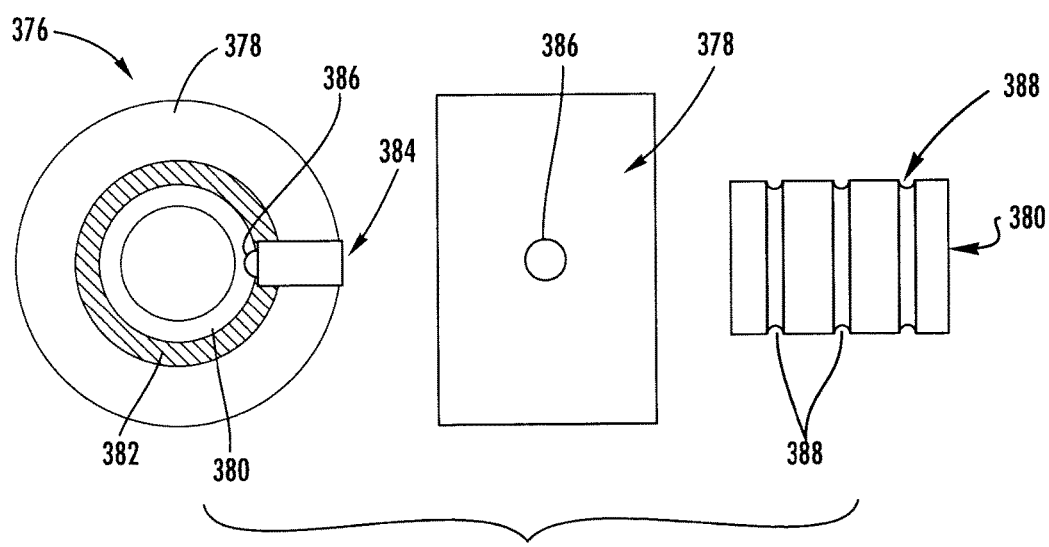
FIG. 51 illustrates an exemplary hinge that provides tactile feedback to the user as the user pushes a central lock cylinder between locked and unlocked positions.

In some embodiments, it may be desirable to provide tactile feedback to the user to provide an indication as to the axial position of the collars in relation to the central lock cylinder when the user is pushing the central lock cylinder through a lock-unlock-lock cycle. FIG. 51 illustrates an exemplary hinge 376 that provides tactile feedback to the user as the user pushes a central lock cylinder between locked and unlocked positions. The hinge 376 may include a collar 378 that is rotatable about a central lock cylinder 380. The hinge 376 may also include an intermediate hinge cylinder 382 positioned between the central lock cylinder 380 and the collar 378. In some embodiments, the collar 378 may include a tactile feedback stud 384 that protrudes inwardly to the central lock cylinder 380. The tactile feedback stud 384 may include a spring loaded ball bearing 386 that is biased to protrude inwardly into one or more vertical grooves 388 of central lock cylinder 380. The vertical grooves 388 may be axially spaced apart. Accordingly, as the central lock cylinder 380 is translated axially, the spring loaded ball bearing 386 of the tactile feedback stud 384 may click into each of the vertical grooves 388, giving tactile feedback to the user indicating a axial position relationship between the collar 378 and the central lock cylinder 380.

In some embodiments, one or more solenoids may be used to control the locking/opening/locking sequence of the internal central lock cylinder. FIG. 52 shows an exemplary hinge 390 which may use a solenoid to control the locking and unlocking of the hinge 390. The hinge 390 may include a central lock cylinder 392 positioned within one or more collars 394. An intermediate hinge cylinder 393 may be positioned between the central lock cylinder 392 and the array of collars 394. In some embodiments, the collars 394 may couple with connectors 396 that couple with hinge flats. In other embodiments, the collars 394 may couple directly with hinge flats. While illustrated with five collars/connectors, it should be understood that any number of collars, flats, and/or connectors may be used. In some embodiments, the hinge 390 may have closed ends. A solenoid 398 may be positioned at one end of the hinge 390 and may be coupled with central lock cylinder 392. The solenoid 398 may be configured to control an axial position of central lock cylinder 392. In some embodiments, a spring 400 may be positioned at an end of the hinge 390 that is opposite of solenoid 392. Spring 400 may be configured to bias the central lock cylinder 392 in a desired direction. For example, spring 400 may compress against the end of central lock cylinder 392 to bias the cylinder 392 to the right, (e.g., toward solenoid 398). In some embodiments, the spring 400 may be biased to tension the cylinder 392 toward the left (e.g., away from solenoid 398).

In some embodiments, separate solenoids may be used to control separate sections of one hinge (e.g., a hinge with two separate central lock cylinder). FIG. 53 illustrates an exemplary hinge 402. Hinge 402 includes a first array of collars 404 that are rotatable about a first central lock cylinder 406 and a second array of collars 408 that are rotatable about a second central lock cylinder 410. An intermediate hinge cylinder 412 may be positioned between the first array of collars 404 and the first central lock cylinder 406. Intermediate hinge cylinder 412 may also be positioned between the second array of collars 408 and the second central lock cylinder 410. The collars 404, 408 may include collar studs 414 that protrude inwardly through the intermediate hinge cylinder 412 and into the first and second central lock cylinder 406, 408, respectively. A first solenoid 416 may be coupled with a first end of first central lock cylinder 406. A second solenoid 418 may be coupled with a first end of second central lock cylinder 408. In some embodiments, the first solenoid 416 is positioned at an end of hinge cylinder 390. The second solenoid 418 may be positioned at an end of hinge cylinder 390 that is opposite of first solenoid 416. In some embodiments, a spring 420 may be positioned between the first central lock cylinder 406 and the second central lock cylinder 410. In some embodiments, the spring may be compressed to bias each of the central lock cylinder 406, 410 toward their respective solenoids 416, 418. In some embodiments, the spring 420 may apply tension between the first central lock cylinder 406 and the second central lock cylinder 410 to bias each of the cylinders away from their respective solenoids 416, 418.

While illustrated in this specific configuration, it should be understood that the hinge 402 is provided by way of example and is non-limiting. Many alternative configurations are possible within the scope of the present invention. For example, in some embodiments, more than two central lock cylinders may be provided in a single hinge. Further, in some embodiments, a spring may not be provided to bias central lock cylinders in an axial direction.

Accordingly, embodiments of the hinge may be used as a mechanical controller as it, internally, can lock-unlock-lock the one or more collars and thus anything connected to it (e.g., directly or via connectors 396). The hinge may be any size and as such the locking and unlocking action may be facilitated by the solenoid. For example, embodiments of the hinge may be used vertically to control the opening and closing of any number of room dividers which can fold and open to angles and positions defined by the hinge's inbuilt geometry. In some embodiments, a mechanical/electrical drive mechanism may be provided for opening and closing the hinge. The drive mechanism may be coupled with the intermediate hinge cylinder and/or the collars. Accordingly, in some embodiments, the hinge may be controlled entirely internally and may offer a compact control mechanism to control angels and to also lock/unlock flats attached thereto.

Further Variations

Additional exemplary hinge components are described in further detail below. It should be understood that the components described below may be used individually or in various combinations with any of the embodiments described above and through the specification. Further, while examples are described separately below for simplicity, it should be understood that multiple instances of each variation of components or various combinations of components may be used in a single hinge mechanism according to some embodiments of the disclosure depending on the hinge application. Accordingly, while the illustrations and the description provided below may be with reference to individual cylinders, collars, channels, collar pins, etc., it should be recognized that embodiments of the disclosure cover various combinations of the disclosed cylinders, collars, and collar pins as well, and as such, the illustrations and corresponding descriptions provided below should be viewed as exemplary and non-limiting.

Figure 54:
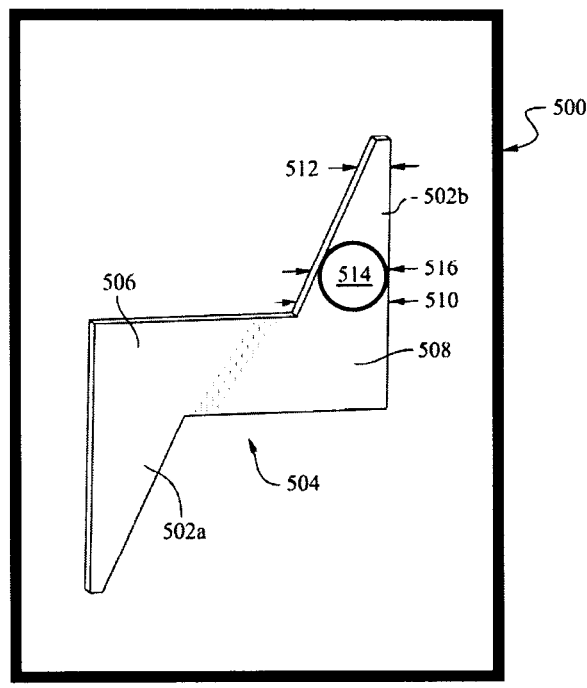
FIG. 54 illustrates an exemplary central cylinder of a hinge with a variation of a locking channel according to some embodiments.

FIG. 54 illustrates an exemplary central cylinder 500 of a hinge with an exemplary locking channels 502a, 502b according to some embodiments. The central cylinder 500 of FIG. 54 is illustrated as unwrapped about its axis for the sole purpose of simplifying explanation of the exemplary locking channels 502a, 502b. Accordingly, it should be understood that in practice, the central cylinder 500 would have a cylindrical configuration. Central cylinder 500 includes a rotate channel 504 extending transverse to an axis of central cylinder 500. Rotate channel 504 may have a first end 506 and a second end 508. A first locking channel 502a may extend from the first end 506 of the rotate channel 504 in the axial direction. A second locking channel 502b may extend from the second end 508 of the rotate channel in the axial direction. The first locking channel 502a and the second locking channel 502b may be configured with a portion that tapers in the axial direction as the portion extends away from the rotate channel 504. The tapered portion may taper from a first width 510 to a second width 512 that is less than the first width 510. In some embodiments, the second width 512 is less than a width 516 of a corresponding collar pin 514 associated with the rotate channel 504 and locking channels 502a, 502b of the central cylinder 500.

When a portion of the collar pin 514 is rotationally aligned with one of locking channel 502a, 502b, the central cylinder 500 may be moveable in the axial direction relative to the collar pin 514 and its associated collar (not shown) to transition the hinge mechanism into a locking configuration where at least a part of the collar pin 514 is positioned within one of locking channel 502a, 502b of the central cylinder 500. When a portion of the collar pin 514 is positioned within the locking channel 502a, 502b, the rotational range of motion of the collar pin 514 and associated collar (not shown) about the hinge axis relative to the central cylinder is reduced. The tapered portion of the locking channels 502a, 502b may provide a firm lock between the central cylinder 500 and a corresponding collar pin 514 and its associated collar such that the rotational range of motion of the collar and pin about the hinge axis is effectively eliminated. The wedge shaped locking slot may tighten against any loose tolerances of the overall hinge assembly and may provide a friction fit engagement between the central cylinder 500 and the collar pin 514 and its associated collar. Additionally, the tapered profile of locking channels 502a, 502b may enable fitting engagement between the locking channels 502a, 502b and collar pin tips which provide modular widths depending on how the collar pin engages with its associated collar. Such collar pins are described in further detail below.

As illustrated, the first locking channel 502a and the second locking channel 502b may extend from the rotate channel 504 in opposite axial directions. While illustrated as such, it should be understood that in other embodiments, the locking channels 502a, 502b may extend from the rotate channel 504 in the same axial direction. Further, while illustrated as including two locking channels 502a, 502b it should be understood that one tapered locking channel may be provided in some hinge embodiments. Similarly, in other embodiments, three or more tapered locking channels may be provided depending on the design of the hinge.

Figure 55:
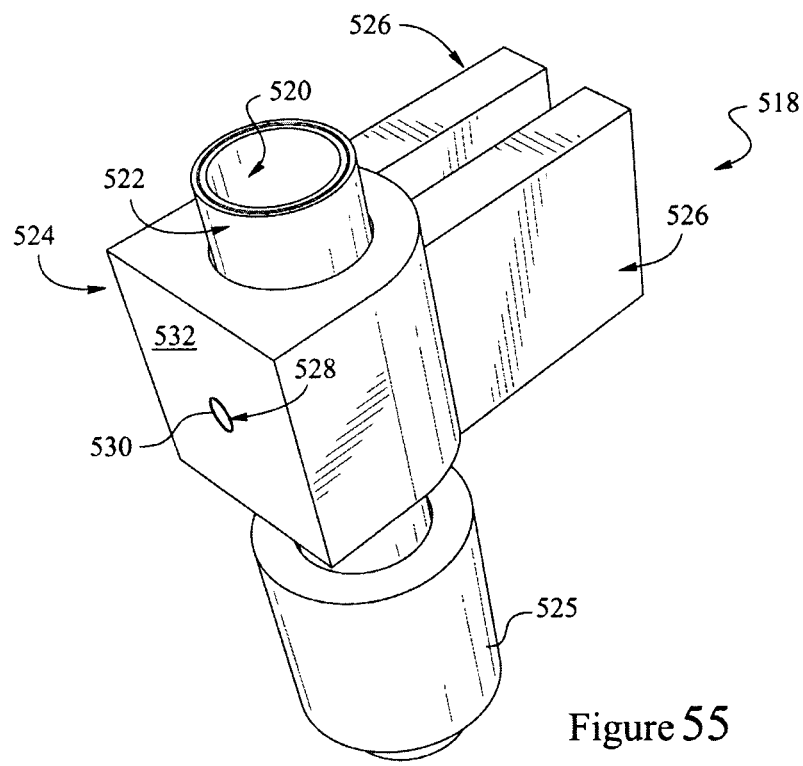
FIG. 55 illustrates an exemplary hinge with a variation of a collar according to some embodiments.

FIG. 55 illustrates an exemplary hinge 518 with a variation of a collar according to some embodiments. The hinge 518 includes a central cylinder 520, an intermediate cylinder 522 disposed about central cylinder 520, and a collar 524 disposed about the intermediate cylinder 522. The central cylinder 520 and the intermediate cylinder 522 may have configurations described above. The collar 524 may include a two or more blades 526 extending from the collar 524. The two or more blades 526 may extend from the collar 524 parallel to one another. The blades 526 may be integrally formed with collar 524 or may be separate components from collar 524 that are attached to collar 524 mechanically (e.g., welding, engagement features, fasteners or the like) or chemically (e.g., adhesives). A flat (not shown) may be inserted between the blades 526 and may be secured to the blades 526 by fasteners (bolts) or other means (e.g., welding, adhesives, integrated engagement features, or the like).

The collar 524 may further include an aperture 528 for receiving a collar pin 530 therethrough. Optionally, a portion 532 of the outer surface of the collar 524 may be flat. The aperture 528 may extend from the outer surface of portion 532 to an inner surface of collar 524. The portion 532 of collar 524 may provide a stronger and more secure fixing of the collar pin 530 to the collar 524. Additionally, a collar pin 530 may be provided with a collar pin head for fixing the collar pin 530 to the collar 524 via an outer surface of collar 524 which will be described in greater detail below. Further hinge mechanism 518 may be used with a standard collar 525 having a cylindrical configuration depending on the hinge application.

Figure 56:
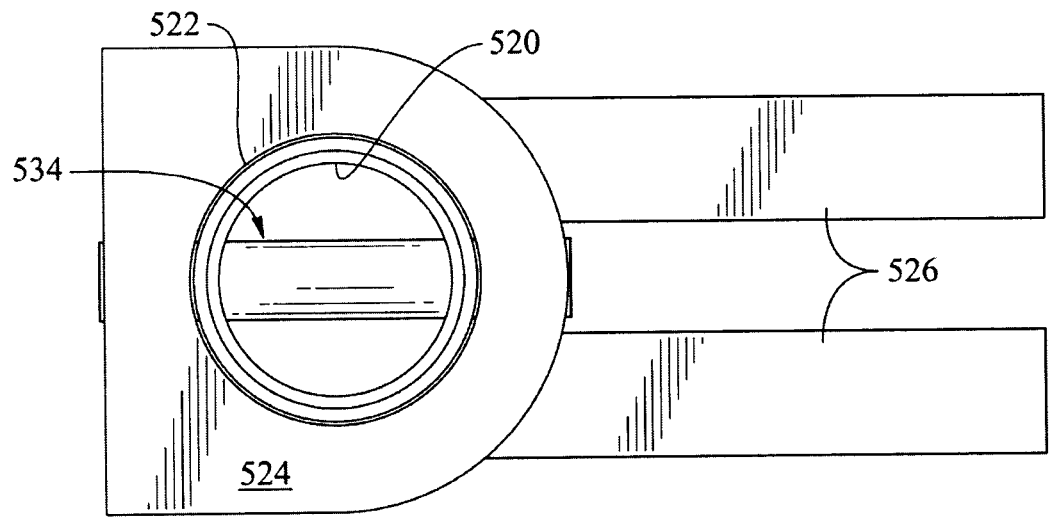
FIG. 56 illustrates the exemplary hinge of FIG. 55 with a variation of the collar pin according to some embodiments.

FIG. 56 illustrates a side view of the exemplary hinge of FIG. 55 with a variation of the collar pin according to some embodiments. Collar pin 534 is configured to protrude inwardly from the collar 524 from two sides through the central cylinder 520 and the intermediate cylinder 522. In such embodiments, collar pin 534 may be attached to collar 524 at diametrically opposite sides of the collar 524. Additionally, central cylinder 520 and intermediate cylinder 522 each have two rotate channels associated with the collar pin 534 as can be seen in FIG. 57 and FIG. 58.

Figure 57:
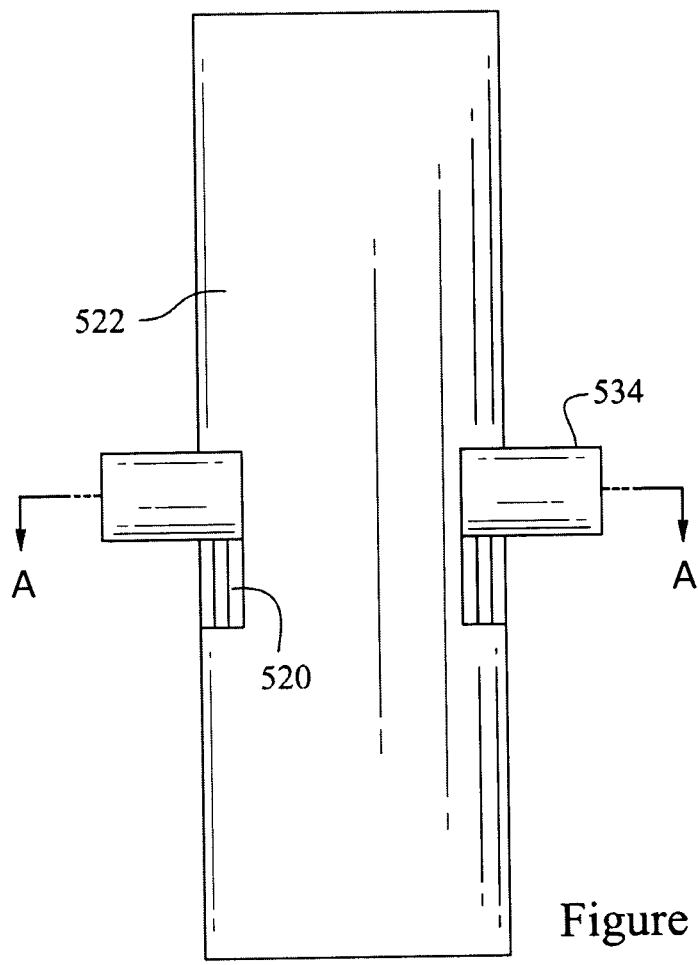
FIG. 57 illustrates a side view of the central cylinder and the collar pin of the exemplary hinge of FIG. 56.
Figure 58:
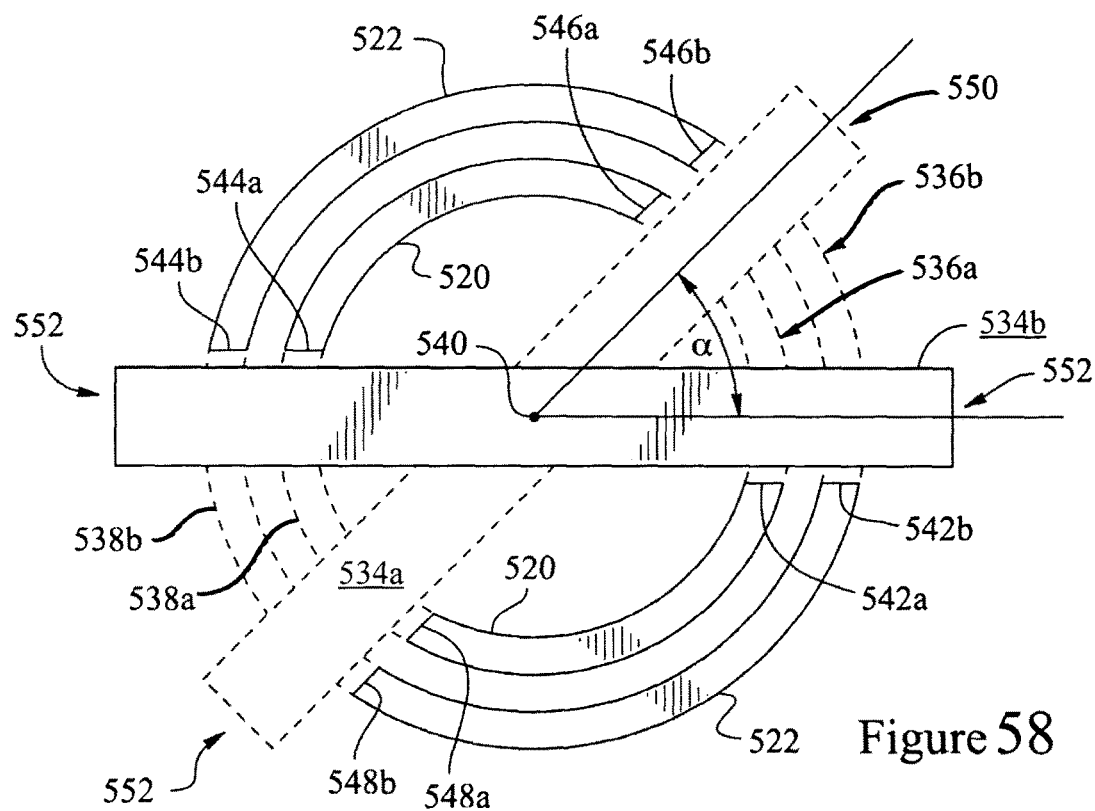
FIG. 58 illustrates a cross-sectional view of the central cylinder and the collar pin shown in FIG. 57.

FIG. 57 illustrates a side view of the central cylinder 520 and the intermediate cylinder 522 and the collar pin 534 of the exemplary hinge of FIG. 56. In FIG. 57 the collar 524 is not illustrated to better show the first and second rotate channels associated with the collar pin 534. FIG. 58 illustrates a cross-sectional view of the central cylinder 520, intermediate cylinder 522, and the collar pin 534 along A-A shown in FIG. 57. As can be seen, the central cylinder 520 and the intermediate cylinder 524 each have two rotate channels 536, 538 disposed on opposite sides of each respective cylinder 520, 522 to accommodate collar pin 534 therethrough.

As illustrated, central cylinder 520 includes a slot opening 536a that is transverse to the hinge axis 540. The slot opening 536a of the central cylinder 520 acts as a first rotate channel. Additionally, central cylinder 520 includes a slot opening 538a that is transverse to the hinge axis 540. The slot opening 538a of the central cylinder 520 acts as a second rotate channel. While not necessarily required, in many embodiments, the rotate channel 536a is on an opposite side of the cylinder 520 than the rotate channel 538a such that a first end 542a of the first rotate channel 536a is on an opposite side of the central cylinder 520 from the first end 544a of the second rotate channel 538a and such that the second end 546a of the first rotate channel 536a is on an opposite side of the central cylinder 520 from the second end 548a of the second rotate channel 538a.

Intermediate cylinder 522 includes a slot opening 536b that is transverse to the hinge axis 540. The slot opening 536b of the intermediate cylinder 522 acts as a first rotate channel. Additionally, intermediate cylinder 522 includes a slot opening 538b that is transverse to the hinge axis 540. The slot opening 538b of the intermediate cylinder 522 acts as a second rotate channel. While not necessarily required, in many embodiments, the rotate channel 536b is on an opposite side of the intermediate cylinder 522 than the rotate channel 538b such that a first end 542b of the first rotate channel 536b is on an opposite side of the intermediate cylinder 522 from the first end 544b of the second rotate channel 538b and such that the second end 546b of the first rotate channel 536b is on an opposite side of the central cylinder 520 from the second end 548b of the second rotate channel 538b.

As illustrated in FIG. 58, collar pin 534 may be configured to extend from the collar 524 (see FIG. 56) through the central cylinder 520 and the intermediate cylinder 522 by extending through the first rotate channel 536a and the second rotate channel 538a of the central cylinder 520 and the first rotate channel 536b and the second rotate channel 538b of the intermediate cylinder 522. The collar pin 534 may cooperate with the first rotate channel and the second rotate channels to limit an axial range of movement between the collar 524 and the central cylinder 520 and/or the intermediate cylinder 522 in an axial direction. The collar 524 may have a rotational range of motion about the hinge axis 540 relative to the central cylinder 520 or the intermediate cylinder 522 when the collar pin 534 is positioned within the first and second rotate channels 536a, 538a, 536b, 538b, depending on the hinge configuration.

Accordingly, in some embodiments, the hinge mechanism may include at least a first configuration and a second configuration. The first configuration (illustrated with collar pin 534 at position 534b) may be defined by the collar 524 rotated to a position relative to the intermediate cylinder 522 where a first portion 550 of the collar pin 534 is proximal to the first end 546b of the first rotate channel 536b and where a second portion 552 of the collar pin 534 that is opposite the first portion 550 of the collar pin 534 is proximal to the first end 548b of the second rotate channel 538b. The second configuration (illustrated with collar pin 534 at position 534a) may be defined by the collar 524 rotated to a position relative to the intermediate cylinder 522 where the first portion 550 of the collar pin 534 is proximal the second end 542b of the first rotate channel 536b and where the second portion 552 of the collar pin 534 is proximal to the second end 544b of the second rotate channel 538b.

The rotate channels may allow the pin 534 and an associated collar to rotate an angle α about the hinge axis. In some embodiments α may be 90° or less. In other embodiments, α may be 45° or less. Put in another way, an angle subtended by the first rotate channel and the second rotate channel when a vertex of the angle is the hinge axis may be 90 degrees or less. In some embodiments, the angle subtended by the first rotate channel and the second rotate channel when the vertex of the angle is the hinge axis may be 45 degrees or less (e.g., 30 degrees or less, 25 degrees or less, 15 degrees or less, etc.).

While hinge 518 is illustrated and described as including intermediate cylinder 522, it should be understood that this is exemplary and non-limiting. In some embodiments of the hinges described herein, the hinge system may not require intermediate cylinder 522. In such embodiments, the rotate channels of the central cylinder (e.g., rotate channel 536a and 538a) may limit an axial range of movement between the collar 524 and the central cylinder 520. Accordingly the first and second configurations may be defined by the collar 524 rotated to a position relative to the central cylinder 520 where a first portion 550 of the collar pin 534 is proximal to the first end 546a of the first rotate channel 536a and where a second portion 552 of the collar pin 534 that is opposite the first portion 550 of the collar pin 534 is proximal to the first end 548a of the second rotate channel 538a. The second configuration (illustrated with collar pin 534 at position 534a) may be defined by the collar 524 rotated to a position relative to the central cylinder 522 where the first portion 550 of the collar pin 534 is proximal the second end 542a of the first rotate channel 536a and where the second portion 552 of the collar pin 534 is proximal to the second end 544a of the second rotate channel 538a.

Additionally, the hinge mechanism 518 may further include one or more locking channels described above that extend in an axial direction from the rotate channels of the central cylinder 520. Such locking channels may allow the hinge mechanism to transition into one or more locking configurations configured lock the hinge in the first and/or second configuration, as desired. Optionally, the locking channel may have a tapered portion that provides a friction engagement as described above.

Figure 59:
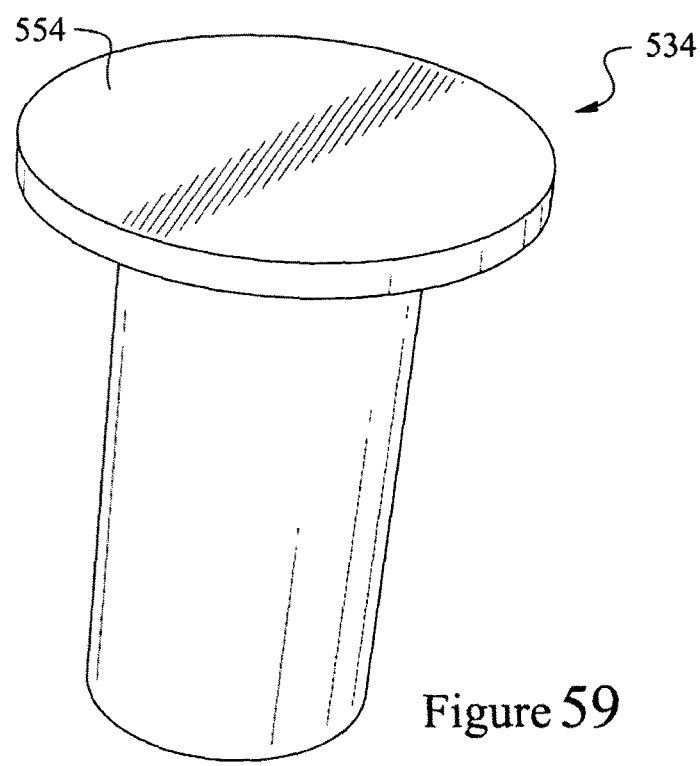
FIG. 59 illustrates an exemplary variation of the exemplary collar pin of FIG. 56 including a collar pin head according to some embodiments.
Figure 60:
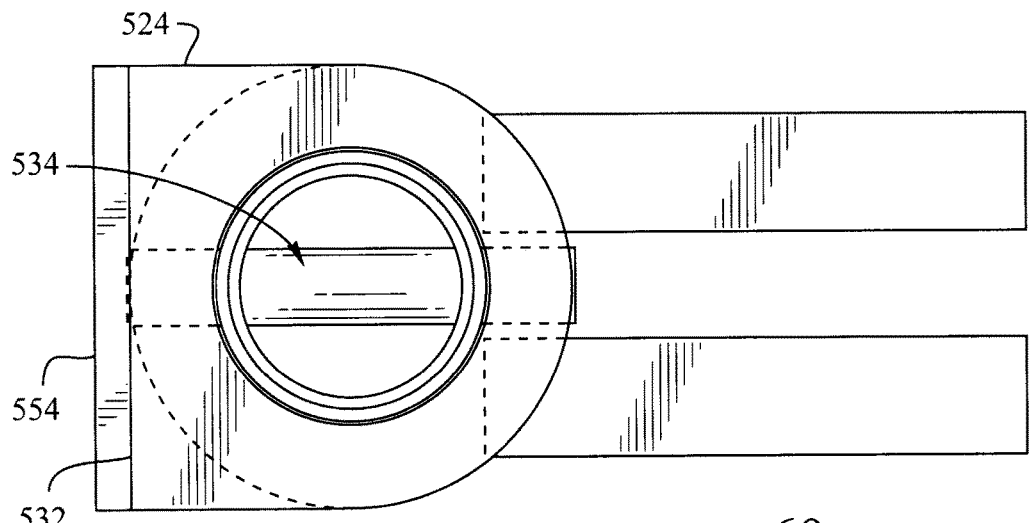
FIG. 60 illustrates an engagement of the exemplary collar pin of FIG. 59 with an exemplary collar of a hinge.

FIG. 59 illustrates an exemplary variation of the exemplary collar pin 534 of FIG. 56 including a collar pin head according to some embodiments. As mentioned above, in some embodiments collar pin 534 may further comprise a collar pin head 554. The collar pin head 554 may fix the collar pin 534 to the collar 524 of the hinge. For example, FIG. 60 illustrates an engagement of the exemplary collar pin 534 of FIG. 59 with an exemplary collar 524 of a hinge. As illustrated, the collar pin 524 may be inserted through a collar pin aperture of the collar 524. Once inserted, the pin 534 may completely span the internal cylinders and may be embedded into the two facing sidewalls of the collar 524, thereby providing greater strength of the collar pin 534. After insertion, the collar pin head 554 may engage with the flat outer surface 532 of the collar 524. Thereafter, the collar pin head 554 may be fixed to the collar 524 (e.g., via welding, adhesives, bolts, screws, other fasteners, engagement features or the like). For example, in some embodiments, the collar pin head 554 may be slotted or otherwise have holes for receiving a fastener therethrough to mechanically fix the collar pin head 554 with the collar 524. While the collar pin head 554 is illustrated as flat and configured to couple with a flat outer surface 532 of the collar 524, it should be understood that other configurations are possible. For example, in some embodiments where collar 524 is cylindrical or does not include a flat outer surface 532, a collar pin head 554 may be configured to have an appropriate configuration such that the collar pin head 554 fittingly mates with the outer surface of collar 524. For example, if collar 524 were configured with a cylindrical outer surface, collar pin head 554 may have a curved surfaces as needed such that the inner surface of the collar pin head 554 mates with the outer surface of the collar 524. Additionally, while illustrated with a collar pin 534 configured to completely span the inner cylinders of the hinge mechanism, it should be understood that a collar pin head 554 may be provided with a collar pin 534 that is not configured to completely span the inner cylinders of the hinge mechanism. Moreover, while collar pin 534 is illustrated with a circular cross-section, other configurations are possible and may be desired in other hinge configurations.

Figures 61, 62:
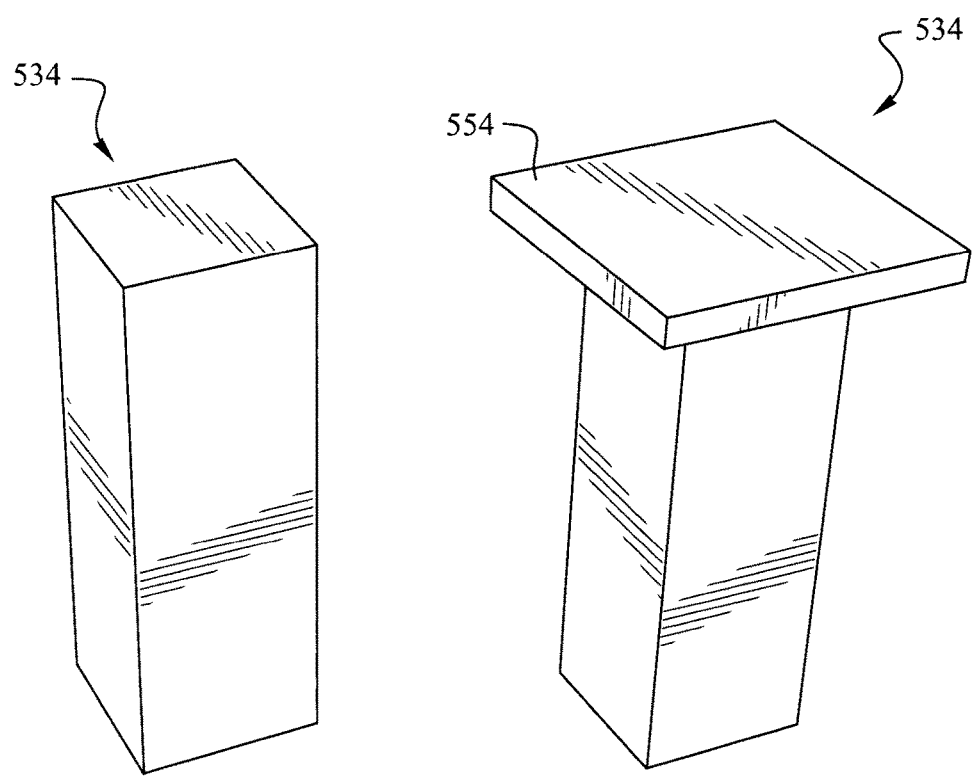
FIG. 61 illustrates yet another variation of the exemplary collar pin of FIG. 56 with a rectangular cross-section.
FIG. 62 illustrates an exemplary variation of the exemplary collar pin of FIG. 61 including a collar pin head according to some embodiments.
Figure 63:
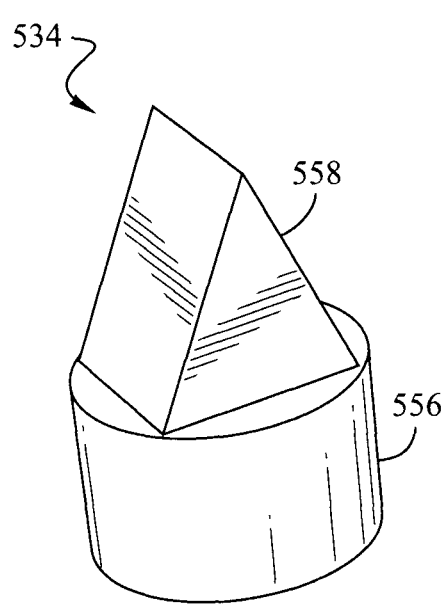
FIG. 63 illustrates yet another variation of the exemplary collar pin including a triangle profile or wedge shape collar pin tip according to some embodiments.

FIG. 61 illustrates yet another variation of the exemplary collar pin 534 of FIG. 56 with a rectangular cross-section. As illustrated, the collar pin 534 of FIG. 61 may have a rectangular cross-section and optionally a square cross-section. Also, FIG. 62 illustrates an exemplary variation of the exemplary collar pin 534 of FIG. 61 including a collar pin head 554 according to some embodiments. While the collar pins 534 of FIG. 61 and FIG. 62 are illustrated as being configured to completely span the inner cylinders of an associated hinge mechanism, it should be understood that the collar pin 534 may be modified in some embodiments such that it does not completely span the inner cylinders of the associated hinge. Furthermore, FIG. 63 illustrates yet another variation of the exemplary collar pin 534 including a triangle profile or wedge shape collar pin tip 558 according to some embodiments. As illustrated, the collar pin 534 of FIG. 63 includes a collar pin body 556 and a collar pin tip 558. The collar pin body 556 may be configured to engage with the collar 524 (e.g., the outer surface of collar pin body 556 may engage with the side walls of the collar 524 that define the collar pin aperture of the collar 524). In the exemplary embodiment of FIG. 63, the collar pin body 556 has a cylindrical configuration. In some embodiments, the collar pin body 556 may have a square or rectangular profile as desired. Optionally, the collar pin body 556 may be splined or have other engagement or alignment features configured to position the collar pin 534 correctly in the aperture of the corresponding collar 524. The collar pin tip 558 of FIG. 63 is wedge shape with a triangle profile. The wedge profile may be configured to engage with the ends of the rotational slots of the tube(s). In some embodiments, the wedge shape collar pin tip 558 may be strong (shear strength) and may help spread the load across its flat profile.

Figure 64:
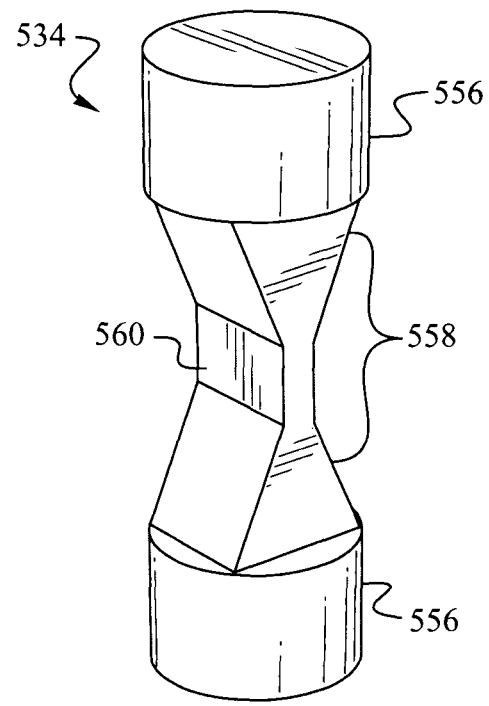
FIG. 64 illustrates an exemplary variation of the exemplary collar pin of FIG. 63 configured to span the intermediate cylinder and/or central cylinder according to some embodiments.

FIG. 64 illustrates an exemplary variation of the exemplary collar pin 534 of FIG. 63 configured to span the intermediate cylinder and/or central cylinder according to some embodiments. The exemplary collar pin 534 of FIG. 64 is similar to that of FIG. 63, but may be extended to completely span the tube slots and may include two oppositely disposed collar pin bodies 556 that are configured to be embedded into the two facing sidewalls of the collar to provide greater strength to the collar pin 534. A connector portion 560 may connect the oppositely disposed wedge shaped collar pin tips 558. The top wedge shaped collar pin tip 558 may be configured to cooperate with a first rotate and/or lock channel of the hinge cylinder(s) and the bottom wedge shaped collar pin tip 558 may be configured to cooperate with a second rotate and/or lock channel of the hinge cylinder(s).

Figure 65:
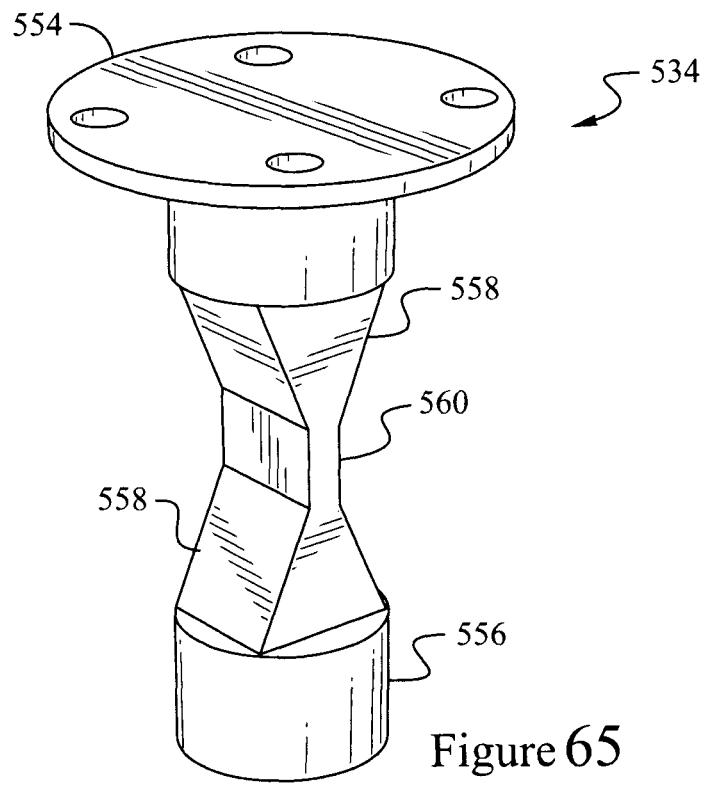
FIG. 65 illustrates an exemplary variation of the exemplary collar pin of FIG. 64 including a collar pin head according to some embodiments.

FIG. 65 illustrates an exemplary variation of the exemplary collar pin 534 of FIG. 64 including a collar pin head 554 according to some embodiments. The collar pin head 554 is illustrated with a plurality of slots for receiving a screw therethrough for securing the collar pin 534 of FIG. 65 to a corresponding collar 524. While illustrated with four slots, it should be understood that this number of slots is exemplary and non-limiting. For example, in other embodiments, the collar pin head 554 may include no slots (see FIG. 59 and FIG. 62), one, two, three, or more slots as desired. Additionally, similar to the collar pin heads 554 described above, while the illustrated embodiment is configured to engage with a flat outer surface of the collar 524, it should be understood that in some embodiments, the inner surface of collar pin head 554 may be curved or otherwise configured to fittingly mate with the outer surface of a corresponding collar. 524. Additionally, it should be understood that the head 554 may be circular or rectangular or any shape. The head 554 may optionally be attached at both ends of the collar pin 534.

FIG. 66 illustrates yet another variation of an exemplary collar pin 534 including an offset collar pin tip 558 according to some embodiments. In the illustrated embodiment of FIG. 66, the collar pin 534 has a cylindrical collar pin body 556. The collar pin body 556 may optionally be configured to engage with the collar 524 (e.g., the outer surface of collar pin body 556 may engage with the side walls of the collar 524 that define the collar pin aperture of the collar 524). In the exemplary embodiment of FIG. 66, the collar pin body 556 has a cylindrical configuration. In some embodiments, the collar pin body 556 may have a square or rectangular profile as desired. Optionally, the collar pin body 556 may be splined or have other engagement (e.g., threaded, dovetail, etc.) or alignment features configured to position the collar pin 534 correctly in the aperture of the corresponding collar 524. The exemplary collar pin 534 of FIG. 66 has a cylindrical collar pin tip 558. The cylindrical collar pin tip 558 is offset laterally relative to a central axis 557 of the corresponding collar pin body 556. Optionally, the collar pin 534 may be rotated to different positions about axis 557 relative to an associated aperture of collar 524. As the collar pin 534 is rotated to different positions about 557 relative to the associated aperture of collar 524, the axially offset cylindrical collar pin tip 558 may vary an axial position of the collar relative to the rotate channel of the hinge mechanism. Accordingly, the axially offset cylindrical collar pin tip 558 may engage with the rotate channel of the hinge mechanism to set a position of the arc of the collar 524. Turning the body 556 may then vary the position of the arc of the attached collar relative to the central tube around which the associated collar 524 rotates.

In some embodiments, collar pin body 556 may include an engagement feature on a surface opposite a surface where the collar pin tip 558 extends. The engagement feature may be a screw drive (e.g., slot, Phillips, Pozidriv, square, Robertson, hex, 12-point flange, hex socket, double square, triple square, or the like) that is configured to couple with a corresponding tool (e.g., screw driver, allen key, etc.) so that the tool may apply torque to the collar pin 534 to adjust a position of the collar pin 534 within the aperture of the associated collar 524, and may thereby adjust a position of the arc of the attached collar relative to the central tube around which the associated collar rotates in the manner described above.

FIG. 67 illustrates an exemplary variation of the exemplary collar pin 534 of FIG. 66 that is configured to span the central cylinder and/or intermediate cylinder according to some embodiments. The collar pin 534 of FIG. 67 includes two spaced apart collar pin bodies 556 that share a similar axis 557. A collar pin tip 558 is disposed between the two collar pin bodies 556. Similar to the embodiment illustrated in FIG. 66, the collar pin tip 558 of FIG. 67 is offset laterally relative to the axis 557 of collar pin bodies 556. Accordingly, the offset cylinder collar pin tip 558 may be revolved to move an axial position of the arc of the collar 524 relative to the cylinder(s) of the hinge mechanism. While illustrated with a single collar pin tip 558, it should be understood that this is exemplary and non-limiting. In some embodiments, each collar pin body 556 may have a separate collar pin tip 558. The collar pin tips 558 may then be coupled via a connector, similar to connector 560 of FIG. 64 and FIG. 65.

Figure 69:
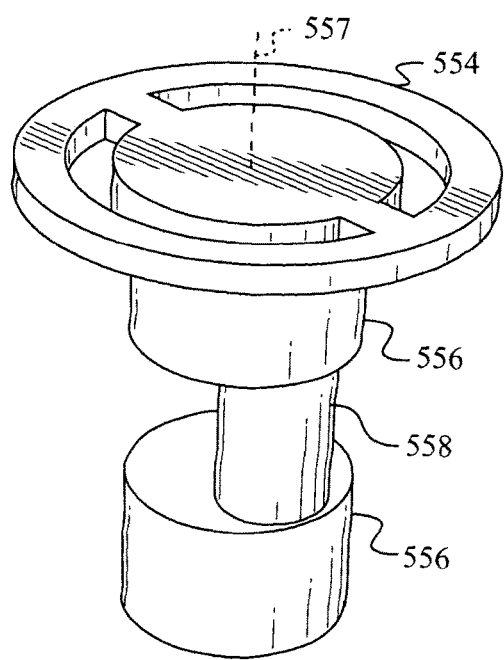
FIG. 69 illustrates an exemplary variation of a collar pin head according to some embodiments.

FIG. 68 illustrates an exemplary variation of the exemplary collar pin 534 of FIG. 67 including a collar pin head 554 according to some embodiments. Collar pin head 554 includes four arcuate slots about the perimeter of head 554. While four arcuate slots are illustrated, it should be understood that this particular slot configuration and number of slots is exemplary and non-limiting. There may be one, two, three, five or more slots as desired. Additionally, the slots may be simple through holes having circular cross sections (see e.g., FIG. 65). For example, FIG. 69 illustrates an exemplary variation of a collar pin head 554 that may be used with any of the collar pins 534 of FIGS. 66-68 and other collar pins 534 that are described herein, according to some embodiments. The collar pin head 554 of FIG. 69 includes two arcuate slots. Further, as set forth above, while inner surface of head 554 is illustrated as flat (e.g., to cooperate with a flat outer surface of collar 524), it should be understood that other inner surface configurations are possible to allow head 554 to mate with an outer surface of collar 524 have any other configuration (e.g., cylindrical or the like).

Figure 70:
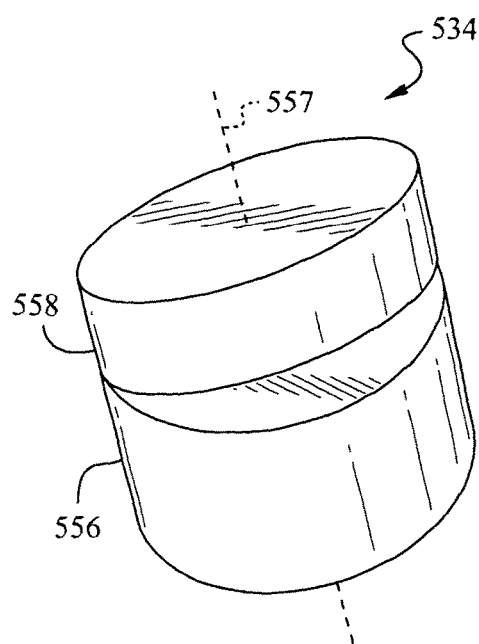
FIG. 70 illustrates yet another variation of an exemplary collar pin including an elliptical collar pin tip according to some embodiments.

FIG. 70 illustrates yet another variation of an exemplary collar pin 534 including an elliptical collar pin tip 558 according to some embodiments. Collar pin 534 also includes collar pin body 556. Collar pin body 556 while illustrated as cylindrical, it should be understood that any of the configurations described herein and engagement and/or alignment features may be provided in other embodiments. Collar pin tip 558 of FIG. 70 has an elliptical cross-section and extends from collar pin body 556 along axis 557 of collar pin body 556. The elliptical cross-section collar pin tip 558 may engage with the rotate channel of the cylinder(s) of the hinge mechanism. Revolving the stud 534 of FIG. 70 about the axis 557 will vary the total angle of movement possible of an attached collar 524. For example, the associated collar 524 will have a first rotational range of motion about the hinge axis when the elliptical collar pin tip 558 is disposed within a corresponding rotate channel with the minor axis extending transverse to the hinge axis and the associated collar 524 will have a second rotational range of motion about the hinge axis when the elliptical collar pin tip 558 is disposed within a corresponding rotate channel with the major axis extending transverse to the hinge axis—the first rotational range of motion will be greater than the second rotational range of motion. Additionally, the collar pin 534 of FIG. 70 may be rotated about axis 557 to different positions relative to an aperture of an associated collar 524 to provide any rotational range of motion that is between the first rotational range of motion and the second rotational range of motion.

Figure 71:
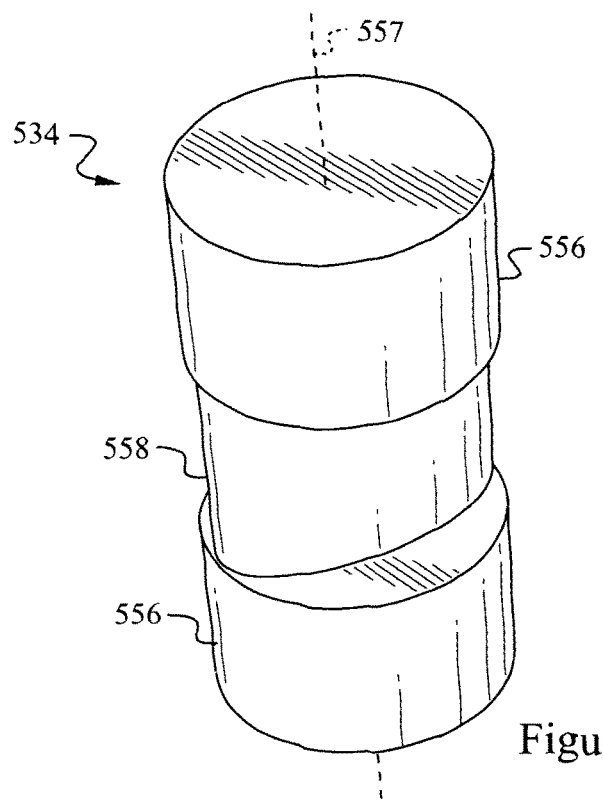
FIG. 71 illustrates an exemplary variation of the exemplary collar pin of FIG. 70 configured to span the central cylinder according to some embodiments.

FIG. 71 illustrates an exemplary variation of the exemplary collar pin 534 of FIG. 70 configured to span the central cylinder and/or intermediate cylinder according to some embodiments. The collar pin 534 of FIG. 71 includes two collar pin bodies 556 and a collar pin tip 558 disposed between the two collar pin bodies 556. While illustrated with a single collar pin tip 558, it should be understood that this is exemplary and non-limiting. In some embodiments, each collar pin body 556 may have a separate collar pin tip 558. The collar pin tips 558 may then be coupled via a connector, similar to connector 560 of FIG. 64 and FIG. 65. Further collar pin bodies 556 are illustrated as cylindrical, however it should be understood that any of the collar pin body configurations described herein and engagement and/or alignment features may be provided in other embodiments.

Figure 72:
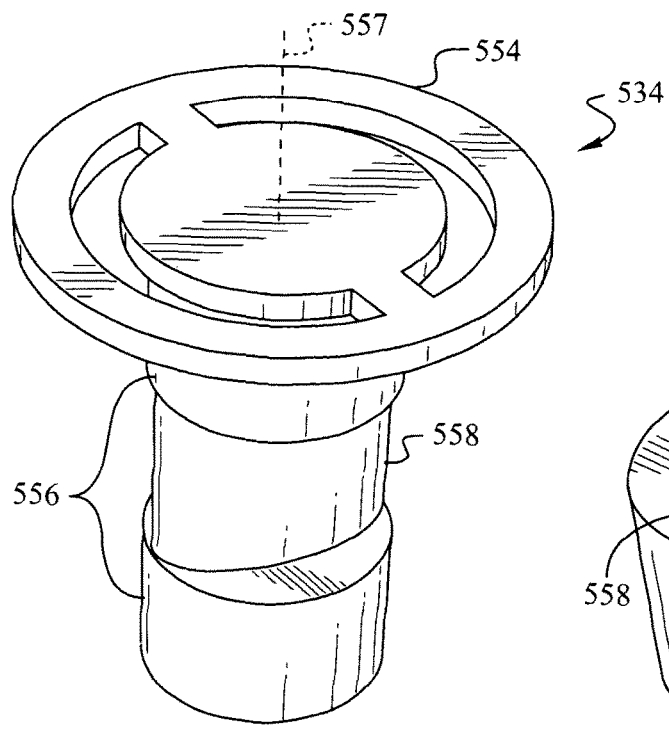
FIG. 72 illustrates an exemplary variation of the exemplary collar pin of FIG. 71 including a collar pin head according to some embodiments.

FIG. 72 illustrates an exemplary variation of the exemplary collar pin 534 of FIG. 71 including a collar pin head 554 according to some embodiments. Collar pin head 554 of FIG. 72 is similar to collar pin head 554 of FIG. 69. While illustrated with two arcuate slots, it should be understood that any other collar pin head configuration may be used with the embodiments of FIG. 70-72.

Figure 73:
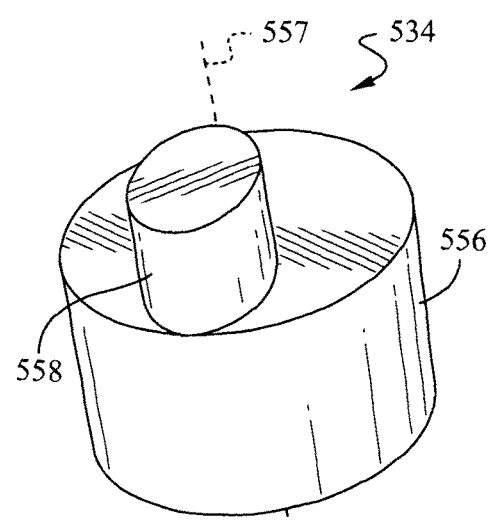
FIG. 73 illustrates a yet another variation of an exemplary collar pin including an offset elliptical collar pin tip according to some embodiments.

FIG. 73 illustrates a yet another variation of an exemplary collar pin 534 including an offset elliptical collar pin tip 558 according to some embodiments. Collar pin 534 of FIG. 73 also includes collar pin body 556. Collar pin body 556 is illustrated as cylindrical, however it should be understood that any of the collar pin body 556 configurations described herein and engagement and/or alignment features may be provided in other embodiments. Collar pin tip 558 of FIG. 73 has an elliptical cross-section and extends from collar pin body 556 and is offset laterally from axis 557 of collar pin body 556. The offset elliptical cross-section collar pin tip 558 may engage with the rotate channel of the cylinder(s) of the hinge mechanism. Revolving the collar pin 534 of FIG. 73 about the axis 557 will vary the total angle of movement possible of an attached collar 524 along with an axial position of the collar relative to the associated hinge cylinders. The collar pin 534 of FIG. 73 may provide the functionality of the embodiments described in FIGS. 66-69 in combination with the functionality of the embodiments described in FIGS. 70-72. While offset elliptical collar pin tip 558 is illustrated with an elliptical cross-section with a major axis aligned with a radius of collar pin body 556 it should be understood that the elliptical cross-section of collar pin tip 558 may be arranged in other configurations relative to collar pin body 556. For example, in some embodiments, a minor axis of the offset elliptical collar pin tip 558 may be aligned with the radius of collar pin body 556, as desired.

Figure 74:
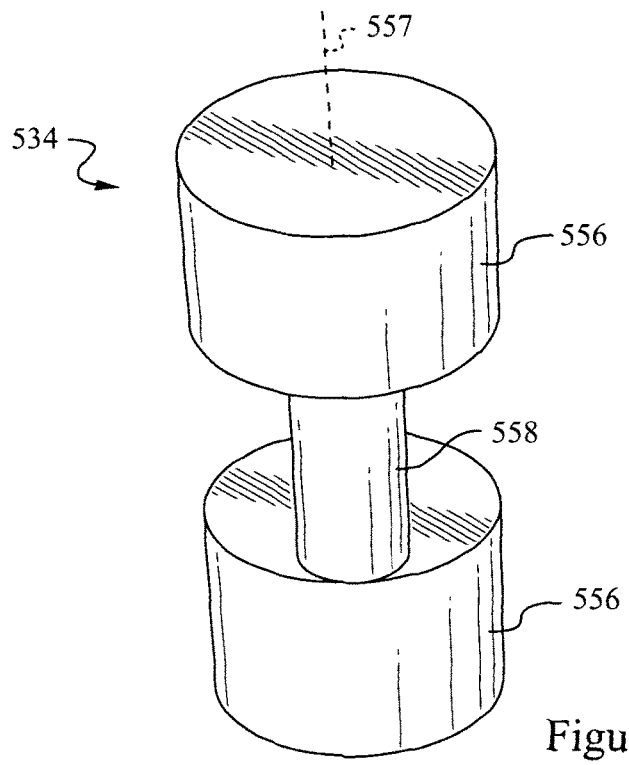
FIG. 74 illustrates an exemplary variation of the exemplary collar pin of FIG. 73 configured to span the central cylinder according to some embodiments.

FIG. 74 illustrates an exemplary variation of the exemplary collar pin 534 of FIG. 73 configured to span the central cylinder and/or intermediate according to some embodiments. The collar pin 534 of FIG. 74 includes two collar pin bodies 556 and a collar pin tip 558 disposed between the two collar pin bodies 556. While illustrated with a single collar pin tip 558, it should be understood that this is exemplary and non-limiting. In some embodiments, each collar pin body 556 may have a separate collar pin tip 558. The collar pin tips 558 may then be coupled via a connector, similar to connector 560 of FIG. 64 and FIG. 65. Further collar pin bodies 556 are illustrated as cylindrical, however it should be understood that any of the collar pin body configurations described herein and engagement and/or alignment features may be provided in other embodiments.

FIG. 75 illustrates yet another variation of an exemplary collar pin 534 including a rectangular collar pin tip 558 according to some embodiments. Collar pin 534 includes collar pin body 556. Collar pin body 556 has a rectangular body. In some embodiments, the rectangular collar pin body 556 has a square cross-section when viewed along axis 557. While collar pin body 556 is illustrated as rectangular, it should be understood that any of the configurations described herein and engagement and/or alignment features may be provided with collar pin body 556 in other embodiments. Collar pin tip 558 of FIG. 75 has an rectangular body as well. In some embodiments, the collar pin tip 558 is offset laterally relative to axis 557 of collar pin body 556. In some embodiments collar pin tip 558 has a rectangular cross-section, when viewed along axis 557, where a length L is greater than a width W. The collar pin tip 558 may engage with the rotate channel of the cylinder(s) of the hinge mechanism. In some embodiments, the collar pin 534 of FIG. 57 may turned 90 degrees relative to an aperture of a corresponding collar 524 to vary an angle of opening of the corresponding collar 524. For example, revolving the collar pin 534 of FIG. 75 about the axis 557 by 90 degrees will vary the total angle of movement possible of an attached collar 524 relative to a rotate channel of the hinge mechanism. Accordingly, in some embodiments, the associated collar 524 will have a first rotational range of motion about the hinge axis when the collar pin tip 558 is disposed within a corresponding rotate channel with the length L of the collar pin tip 558 extending transverse to the hinge axis, and the associated collar 524 will have a second rotational range of motion about the hinge axis when the collar pin tip 558 is disposed within the rotate channel with the width W extending transverse to the hinge axis—the second rotational range of motion will be greater than the first rotational range of motion. FIG. 76 illustrates the exemplary collar pin 534 of FIG. 75 rotated to a second configuration which changes an angle of opening between the collar 524 and intermediate cylinder or central cylinder according to some embodiments.

FIG. 77 illustrates an exemplary variation of the exemplary collar pin 534 shown in FIG. 75 and FIG. 76 with an extended collar tip 558 configured to span the diameter of the central cylinder according to some embodiments. As illustrated, collar pin 534 may include a single collar body 556 but may still be configured to span the diameter of the central cylinder with an elongated collar pin tip 558. Accordingly, in some embodiments, a collar pin 534 disclosed herein may be configured to span the central cylinder, but may have a single collar pin body 556. Such aspects are equally applicable to other embodiments disclosed above and further below that are configured to span the cylinder(s) of their associated hinge mechanisms. Accordingly, while many embodiments that span the tubes of the hinge mechanism include two opposed and spaced apart collar bodies 556, it should be understood that this is exemplary and non-limiting. Other embodiments, such as the collar pin 534 of FIG. 77, may span the tubes of the hinge without two opposed and spaced apart collar bodies.

FIG. 78 illustrates an exemplary variation of the exemplary collar pin 534 shown in FIG. 77 including two collar pin bodies 556 and a collar pin head 554 according to some embodiments. The two collar pin bodies 556 may be configured to engage with opposite sides of a collar 524 (e.g., walls of the collar 524 that define the apertures for receiving the collar pin 534). The head 554 may be configured to engage with the outer surface of collar 524. The head 554 includes apertures therethrough for receiving fasteners for fastening the collar pin 534 to collar 524. The inner surface of head 554 may be flat to engage with a flat outer surface of collar 524 or may have any other configuration (e.g., curved) so as to mate with the outer surface of collar 524.

Figure 79:
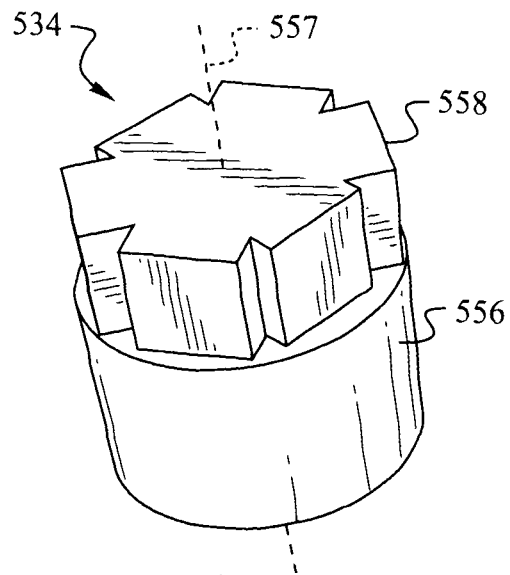
FIG. 79 illustrates yet another variation of an exemplary collar pin including a staggered rectangles collar pin tip according to some embodiments.
Figure 80:
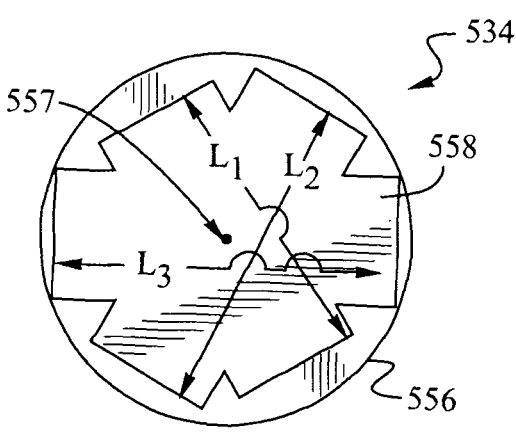
FIG. 80 illustrates a top view of the exemplary collar pin of FIG. 79.

FIG. 79 illustrates yet another variation of an exemplary collar pin 534 including a staggered rectangles collar pin tip 558 according to some embodiments. FIG. 80 illustrates a top view of the exemplary collar pin 537 of FIG. 79. The collar pin 534 includes collar pin body 556. Collar pin body 556 is illustrated as cylindrical, however it should be understood that any of the collar pin body 556 configurations described herein and engagement and/or alignment features may be provided in other embodiments. For example, in some embodiments, collar pin body 556 may have a hexagonal configuration, where the collar pin body 556 has a hexagonal cross-section when viewed along collar pin body axis 557. Collar pin tip 558 has a staggered rectangle body configuration. As can be seen in FIG. 80, the staggered rectangle body collar pin tip 558 has a cross-section when viewed along 557 comprised of three overlaid rectangles. In some embodiments, each of the overlaid rectangles share the same center and the shared center may be at axis 557. In some embodiments, each of the overlaid rectangles have a different length $L_1$, $L_2$, $L_3$ such that the staggered rectangle body collar pin tip 558 may be revolved about axis 557 to different positions relative to aperture of collar 524 which will change the angle of the opening of the collar 524 relative to the hinge axis depending on which length $L_1$, $L_2$, $L_3$ of rectangle is aligned with the rotate channel. When the longest length $L_3$ rectangle is aligned with the rotate channel, the associated collar will have the smallest rotational range of motion relative to the rotate channel. When the shortest length $L_1$ rectangle is aligned with the rotate channel, the associated collar will have the largest rotational range of motion relative to the rotate channel. And when the intermediate length $L_2$ rectangle is aligned with the rotate channel, the associated collar will have a rotational range of motion that is between the smallest and the largest rotational range of motion relative to the rotate channel.

Figure 81:
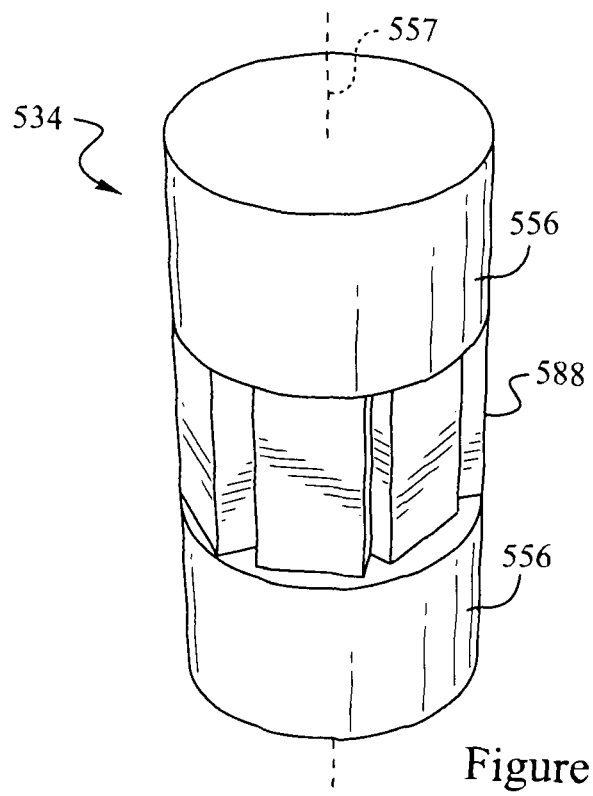
FIG. 81 illustrates an exemplary variation of the exemplary collar pin shown in FIG. 79 configured to span the central cylinder according to some embodiments.

FIG. 81 illustrates an exemplary variation of the exemplary collar pin 534 shown in FIG. 79 configured to span the central cylinder and/or intermediate cylinder according to some embodiments. The collar pin 534 of FIG. 81 includes two collar pin bodies 556 and an elongated staggered rectangle collar pin tip 558 disposed between the two collar pin bodies 556. It should be understood that collar pin 534 of FIG. 79 and/or FIG. 81 may be provided with a collar pin head 554 as described herein.

In some embodiments, a rectangular or wedge profile collar pin tip 558 may avoid point contacts between the collar pin tip 558 and the slots of the cylinder(s) of the hinge mechanism, which may occur if the ends of the slots of the cylinder(s) are flat while the collar pin tip 558 has a circular or elliptical cross-section. Alternatively, in some embodiments, the ends (and/or corners) of the slots of the cylinder(s) may be semicircular when the collar pin tip 558 has a circular cross-section. Such a combination of features may also avoid point contacts between the ends of the rotate and/or locking channels of the cylinder(s) and the collar pin 534 during use, thereby limiting wear on the parts due to loads applied to the hinge.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:
1. A hinge mechanism comprising:
a central cylinder having an elongate length defining a hinge axis, the central cylinder including:
a first rotate channel transverse to the hinge axis, the first rotate channel including a first end and a second end;
a locking channel extending from the first end of the first rotate channel in an axial direction, the locking channel including a tapered portion that tapers in the axial direction away from the first rotate channel from a first width to a second width that is less than the first width;
a collar configured to be disposed about the central cylinder;

a collar pin configured to extend inwardly from the collar and into the first rotate channel or the locking channel of the central cylinder;

wherein the collar pin cooperates with the first rotate channel to limit an axial range of movement between the collar and the central cylinder in an axial direction;

wherein the collar has a rotational range of motion about the hinge axis relative to the central cylinder when the collar pin is positioned within the first rotate channel of the central cylinder;

wherein the hinge mechanism further comprises a first configuration and a second configuration;

the first configuration defined by the collar rotated to a position relative to the central cylinder where the collar pin is proximal to the first end of the first rotate channel;

the second configuration defined by the collar rotated to a position relative to the central cylinder where the collar pin is proximal the second end of the first rotate channel; and wherein, when the collar pin is rotationally aligned with the locking channel, the central cylinder is moveable in the axial direction relative to the collar to transition the hinge mechanism into a locking configuration where at least a portion of the collar pin is positioned within the locking channel of the central cylinder; and wherein, when at least a portion of the collar pin is positioned within the locking channel, the rotational range of motion of the collar about the hinge axis relative to the central cylinder is reduced.

2. The hinge mechanism of claim 1, wherein the second width of the locking channel is less than a width of the collar pin to provide a friction fit engagement between the collar pin and the locking channel when the hinge mechanism is transitioned into the locking configuration.

3. The hinge mechanism of claim 1, wherein the collar includes an aperture for receiving the collar pin therethrough; wherein the aperture defines a collar pin insertion axis; and wherein the collar pin is repositionable to a plurality of positions relative to the collar about the collar pin insertion axis; and wherein collar pin repositioning about the collar pin insertion axis varies an axial position of the collar relative to the central cylinder, a rotational range of motion of the collar about the central cylinder, or both the axial position of the collar relative to the central cylinder and the rotational range of motion of the collar about the central cylinder.

4. The hinge mechanism of claim 3, wherein the aperture has a circular cross-section when viewed along the collar pin insertion axis.

5. The hinge mechanism of claim 3, wherein the aperture has a non-circular cross-section when viewed along the collar pin insertion axis.

6. The hinge mechanism of claim 3, wherein the collar pin comprises a collar pin body configured to engage with walls of the collar defining the aperture and a collar pin tip configured to engage with the first rotate channel of the central cylinder.

7. The hinge mechanism of claim 6, wherein an axis of the collar pin tip is laterally offset from the collar pin insertion axis when the collar pin is received through the aperture.

8. The hinge mechanism of claim 6, wherein the collar pin tip has an elliptical cross-section when viewed along an axis of the collar pin tip.

9. The hinge mechanism of claim 6, wherein the collar pin tip has a rectangular cross-section with a length greater than a width when viewed along an axis of the collar pin tip.

10. The hinge mechanism of claim 3, wherein the collar pin includes a head configured to engage with an outer surface of the collar.

11. The hinge mechanism of claim 10, wherein an inner surface of the head is curved to match a curvature of the outer surface of the collar.

12. The hinge mechanism of claim 10, wherein an inner surface of the head is flat to match a flat portion of the outer surface of the collar which the head of the collar pin engages with.

* * * * *